US010116712B2

(12) United States Patent
Ma et al.

(10) Patent No.: US 10,116,712 B2
(45) Date of Patent: Oct. 30, 2018

(54) QUALITY OF EXPERIENCE BASED QUEUE MANAGEMENT FOR ROUTERS FOR REAL-TIME VIDEO APPLICATIONS

(71) Applicant: VID SCALE, INC., Wilmington, DE (US)

(72) Inventors: Liangping Ma, San Diego, CA (US); Dimitrios Karampatsis, Ruislip (GB); Gregory S. Sternberg, Mt. Laurel, NJ (US); Samian Kaur, Plymouth Meeting, PA (US); Ghyslain Pelletier, Montréal (CA); Anantharaman Balasubramanian, San Diego, CA (US); Robert A. DiFazio, Greenlawn, NY (US); Ralph Neff, San Diego, CA (US); Louis Kerofsky, San Diego, CA (US); Weimin Liu, Chatham, NJ (US)

(73) Assignee: VID SCALE, INC, Wilmington, DE (US)

( * ) Notice: Subject to any disclaimer, the term of this patent is extended or adjusted under 35 U.S.C. 154(b) by 181 days.

(21) Appl. No.: 14/917,003

(22) PCT Filed: Sep. 5, 2014

(86) PCT No.: PCT/US2014/054385
§ 371 (c)(1),
(2) Date: Mar. 5, 2016

(87) PCT Pub. No.: WO2015/035232
PCT Pub. Date: Mar. 12, 2015

(65) Prior Publication Data
US 2016/0219088 A1    Jul. 28, 2016

Related U.S. Application Data

(60) Provisional application No. 61/874,712, filed on Sep. 6, 2013, provisional application No. 61/880,806, filed
(Continued)

(51) Int. Cl.
G06F 15/16 (2006.01)
H04L 29/06 (2006.01)
H04L 12/823 (2013.01)

(52) U.S. Cl.
CPC .......... *H04L 65/4069* (2013.01); *H04L 47/32* (2013.01); *H04L 65/604* (2013.01);
(Continued)

(58) Field of Classification Search
CPC . H04L 65/4069; H04L 65/604; H04L 65/605; H04L 65/80
(Continued)

(56) References Cited

U.S. PATENT DOCUMENTS

2001/0048662 A1    12/2001  Suzuki et al.
2004/0148423 A1     7/2004  Key et al.
(Continued)

FOREIGN PATENT DOCUMENTS

JP    2001-345847 A    12/2001
JP    2004-236316 A     8/2004
(Continued)

OTHER PUBLICATIONS

3rd Generation Partnership Project, S2-131494, "Prioritization of IP Flows Mapped to the Same QCI", Telecom Italia, AT&T, Deutsche Telekom, Huawei, Hisilicon, Broadcom Corporation, SA WG2 Meeting #96, San Diego, USA, Apr. 8-12, 2013, pp. 1-5.
(Continued)

Primary Examiner — Philip B Tran
(74) Attorney, Agent, or Firm — Condo Roccia Koptiw LLP

(57) ABSTRACT

Systems, methods, and instrumentalities are disclosed for managing real-time traffic video flows. A node may comprise a processor configured to receive a first real-time video traffic flow. A state variable may be associated with the first
(Continued)

real-time video traffic flow at the node and a state variable may be associated with the second real-time video traffic flow at the node. The first real-time video traffic flow may comprises plurality of packets and each packet may comprise a lost packet indicator. The node may be configured to drop a first packet in the first real-time video traffic flow, update the state variable associated with the first real-time video traffic flow at the node to indicate the dropped packet, and update the lost packet indicator for a second packet in the first real-time video traffic flow based on the dropped packet.

21 Claims, 30 Drawing Sheets

Related U.S. Application Data on Sep. 20, 2013, provisional application No. 61/975,499, filed on Apr. 4, 2014, provisional application No. 62/029,239, filed on Jul. 25, 2014.

(52) U.S. Cl.
CPC ............ *H04L 65/605* (2013.01); *H04L 65/80* (2013.01); *H04L 69/22* (2013.01)

(58) Field of Classification Search
USPC ................................................ 709/219, 224
See application file for complete search history.

(56) References Cited

U.S. PATENT DOCUMENTS

| | | | |
|---|---|---|---|
| 2005/0089043 A1 | 4/2005 | Seckin et al. | |
| 2008/0310303 A1 | 12/2008 | Wang et al. | |
| 2009/0124387 A1* | 5/2009 | Perlman | A63F 13/12 463/42 |
| 2009/0271512 A1 | 10/2009 | Jorgensen | |
| 2011/0058554 A1* | 3/2011 | Jain | H04L 45/00 370/392 |
| 2011/0273995 A1 | 11/2011 | Ahn et al. | |
| 2012/0047279 A1* | 2/2012 | Zhu | H04L 47/11 709/231 |

FOREIGN PATENT DOCUMENTS

| | | |
|---|---|---|
| JP | 2009-049530 A | 3/2009 |
| JP | 2013-153474 A | 8/2013 |
| KR | 10-2007-0021098 A | 2/2007 |
| KR | 10-2009-0110371 A | 10/2009 |
| KR | 10-2010-0073885 A | 7/2010 |
| WO | WO 2013/120074 A1 | 8/2013 |
| WO | WO 2015/035232 A2 | 3/2015 |

OTHER PUBLICATIONS

3rd Generation Partnership Project, TS 23.401 V10.3.0, "Technical Specification Group Services and System Aspects, General Packet Radio Service (GPRS) Enhancements for Evolved Universal Terrestrial Radio Access Network (E-UTRAN) Access (Release 10)", Mar. 2011, 278 pages.

3rd Generation Partnership Project, TS 36.323 V10.1.0, "Technical Specification Group Radio Access Network, Evolved Universal Terrestrial Radio Access (E-UTRA), Packet Data Convergence Protocol (PDCP) Specification (Release 10)", Mar. 2011, 26 pages.

Babiarz et al., "Configuration Guidelines for DiffServ Service Classes", Network Working Group, Request for Comments: 4594, Category: Informational, Aug. 2006, pp. 1-57.

Baugher et al., "The Secure Real-time Transport Protocol (SRTP)", Network Working Group, Request for Comments: 3711, Category: Standards Track, Mar. 2004, 50 pages.

Gettys et al., "Bufferbloat: Dark Buffers in the Internet", Queue—Virtualization, vol. 9, No. 11, Nov. 2011, pp. 1-15.

Jiang et al., "Passive Estimation of TCP Round-Trip Times", ACM Sigcomm Computer Communication Review, vol. 32, No. 3, Jul. 2002, pp. 75-88.

Liu, "Early Packet Loss Feedback for Improved Video Delivery Over 802.11 Wireless Channels", InterDigital Communications, LLC, USA, 2013, 5 pages.

Ma et al., "Model-Based QoE Prediction to Enable Better User Experience for Video Teleconferencing", IEEE International Conference on Acoustics, Speech and Signal Processing (ICASSP), May 26-31, 2013, 5 pages.

Nichols et al., "Controlling Queue Delay", Communication of the ACM, vol. 55, No. 7, Jul. 2012, pp. 42-50.

Rosen et al., "Multiprotocol Label Switching Architecture", Network Working Group, Request for Comments: 3031, Category: Standards Track, Jan. 2001, pp. 1-61.

Singer et al., "A General Mechanism for RTP Header Extensions", Network Working Group, Request for Comments: 5285, Category: Standards Track, Jul. 2008, pp. 1-17.

* cited by examiner

US 10,116,712 B2

QUALITY OF EXPERIENCE BASED QUEUE MANAGEMENT FOR ROUTERS FOR REAL-TIME VIDEO APPLICATIONS

This application is the National Stage Entry under 35 U.S.C. § 371 of Patent Cooperation Treaty Application No. PCT/US2014/054385, filed Sep. 5, 20114, which claims the benefit of U.S. Provisional Patent Application No. 61/874,712 filed Sep. 6, 2013, U.S. Provisional Patent Application No. 61/880,806, filed Sep. 20, 2013, U.S. Provisional Patent Application No. 61/975,499, filed Apr. 4, 2014, and U.S. Provisional Patent Application No. 62/029,239, filed Jul. 25, 2014, the contents of which are each hereby incorporated by reference herein in their entirety.

BACKGROUND

Video telephony is a growing segment of the traffic carried over wireless networks. The flow of data packets generated by various video telephony applications (e.g., teleconferencing applications) may be controlled using various queue management techniques. The design of queue management may consider Quality of Service (QoS) performance.

SUMMARY

Systems, methods, and instrumentalities are disclosed for managing real-time traffic video flows. A node may comprise a processor configured to receive a first real-time video traffic flow. A state variable may be associated with the first real-time video traffic flow at the node. The first real-time video traffic flow may comprise a plurality of packets. Each packet may comprise a lost packet indicator. A node may be configured to receive a second real-time video traffic flow. A state variable may be associated with the second real-time video traffic flow at the node. The second real-time video traffic flow may comprise a plurality of packets and each packet may comprise a lost packet indicator. A node may be configured to drop a first packet in the first real-time video traffic flow. A node may be configured to update the state variable associated with the first real-time video traffic flow at the node to indicate the dropped packet. A node may be configured to update the lost packet indicator for a second packet in the first real-time video traffic flow based on the dropped packet.

A node may comprise a processor configured to compare the state variable of the first real-time video traffic flow with the state variable of the second real-time video traffic flow. The state variable of the second real-time video traffic flow may not indicate a dropped packet. The node may be configured to determine to drop a packet of the first real-time traffic flow (e.g., as opposed to dropping a packet of the second real-time traffic flow) based on the state variable of the first real-time video traffic flow indicating the dropped packet.

A node may comprise a processor configured to determine that a third packet of the first real-time video traffic flow comprises a refresh frame. The node may comprise a processor configured to update the state variable associated with the first real-time video traffic flow at the node based on determining that the third packet of the first real-time video traffic flow comprises a refresh frame. The node may comprise a processor configured to update the lost packet indicator for the third packet of the first real-time video traffic flow based on determining that the third packet of the first real-time video traffic flow comprises a refresh frame.

The node may comprise a processor configured to determine that the third packet of the first real-time video traffic flow comprises a refresh frame comprising the processor configured to determine a bit in a packet header of the third packet indicates that the third packet comprises a refresh frame and determine that the third packet of the first real-time video traffic flow comprises a refresh frame. The refresh frame may comprise a partial refresh frame. The third packet may comprise an I-frame.

The node may comprise a processor configured to send the second packet of the first real-time video traffic flow to a second node. The lost packet indicator may instruct the second node to update a state variable associated with the first real-time video traffic flow at the second node.

The node may be configured to use the state variable to concentrate packet losses on a degraded packet stream. A flow priority indicator (FPI) may comprise a lost packet indicator.

The node may comprise a processor configured to update the lost packet indicator for a second packet in the real-time video traffic flow based on the dropped packet comprises determine that the second packet does not comprise a refresh frame. The node may comprise a processor configured to update the lost packet indicator for the second packet in the real-time video traffic flow based on the dropped packet and the determination that the second packet does not comprise a refresh frame. The lost packet indicator may comprise a bit in a packet header of the packet.

The node may comprise a processor configured to update the state variable based on a preconfigured set of conditions. The node may comprise a processor configured to select a condition from the prefigured set of conditions, compare the selected condition against a preconfigured threshold, determine if the selected condition exceeds the preconfigured threshold, and upon determining that the selected condition exceeds the preconfigured threshold, update the state variable. The node may comprise a processor configured to determine to drop the first packet of the first real-time video traffic flow according to a preconfigured set of rules.

The node may be a router, wireless transmit/receive unit (WTRU) or evolved Node B (eNB).

A node may comprise a processor configured to receive a first real-time video traffic flow. A state variable may be associated with the first real-time video traffic flow at the node. The state variable may indicate packet loss. The node may comprise a processor configured to receive a second real-time video traffic flow, wherein a state variable is associated with the second real-time video traffic flow at the node, and wherein the state variable indicates no packet loss. The node may comprise a processor configured to determine to drop a packet of the first real-time video traffic flow or a packet of the second real-time video traffic flow. The node may comprise a processor configured to compare the state variable of the first real-time video traffic flow with the state variable of the second real-time video traffic flow. The node may comprise a processor configured to determine to drop the packet of the first real-time traffic flow based on the state variable of the first real-time video traffic flow indicating packet loss. The node may comprise a processor configured to mark one or more packets subsequent to the dropped packet in the first real-time video traffic flow to indicate the packet was dropped.

A node may comprise a processor configured to receive a plurality of real-time video traffic flows. A state variable may be associated with each real-time video traffic flow at the node. Each real-time video traffic flow may comprise a plurality of packets. Each packet may comprise a lost packet indicator. The node may comprise a processor configured to determine that a lost packet indicator of a first packet of a real-time video traffic flow of the plurality of real-time video traffic flows indicates packet loss. The node may comprise a processor configured to update the state variable associated with the real-time video traffic flow at the node based on the lost packet indicator of the first packet to indicate packet loss. The node may comprise a processor configured to direct a subsequent packet loss to the real-time video traffic flow based on the state variable associated with the real-time video traffic flow indicating packet loss. The node may comprise a processor configured to determine that a third packet comprises a refresh frame. The node may comprise a processor configured to update the state variable based on determining that the third packet comprises a refresh frame. The node may comprise a processor configured to determine that the lost packet indicator of a second packet does not indicate packet loss.

A node may comprise a processor configured to receive a real-time video traffic flow comprising a plurality of RTP packets. A state variable may be associated with the real-time video traffic flow at the node. The node may comprise a processor configured to determine a sequence number of a first RTP packet of the real-time video traffic flow. The node may comprise a processor configured to determine a sequence number of a second RTP packet of the real-time video traffic flow. The node may comprise a processor configured to detect a gap in sequence numbers between the first RTP packet and second RTP packet. The node may comprise a processor configured to update the state variable associated with the real-time video traffic flow based on the detection of the gap. The node may comprise a processor configured to send a report to the sender of the real-time video traffic flow. The report may indicate a gap in sequence numbers between the first RTP packet and second RTP packet of the real-time video traffic flow.

A node may comprise a processor configured to receive a real-time video traffic flow. A state variable may be associated with the real-time video traffic flow at the node. The state variable may indicate a loss state for the real-time video traffic flow at the node. The node may comprise a processor configured to determine a round trip time (RTT) of the real-time video traffic flow. The node may comprise a processor configured to change the state variable associated with the real-time video traffic flow to indicate a no loss state based on the RTT. The RTT may be a predetermined value. The RTT may be estimated based on a transmission control protocol (TCP) connection between a source and a destination of the real-time video traffic flow. The RTT may be determined by constructing a lower bound of the RTT using a queueing delay.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
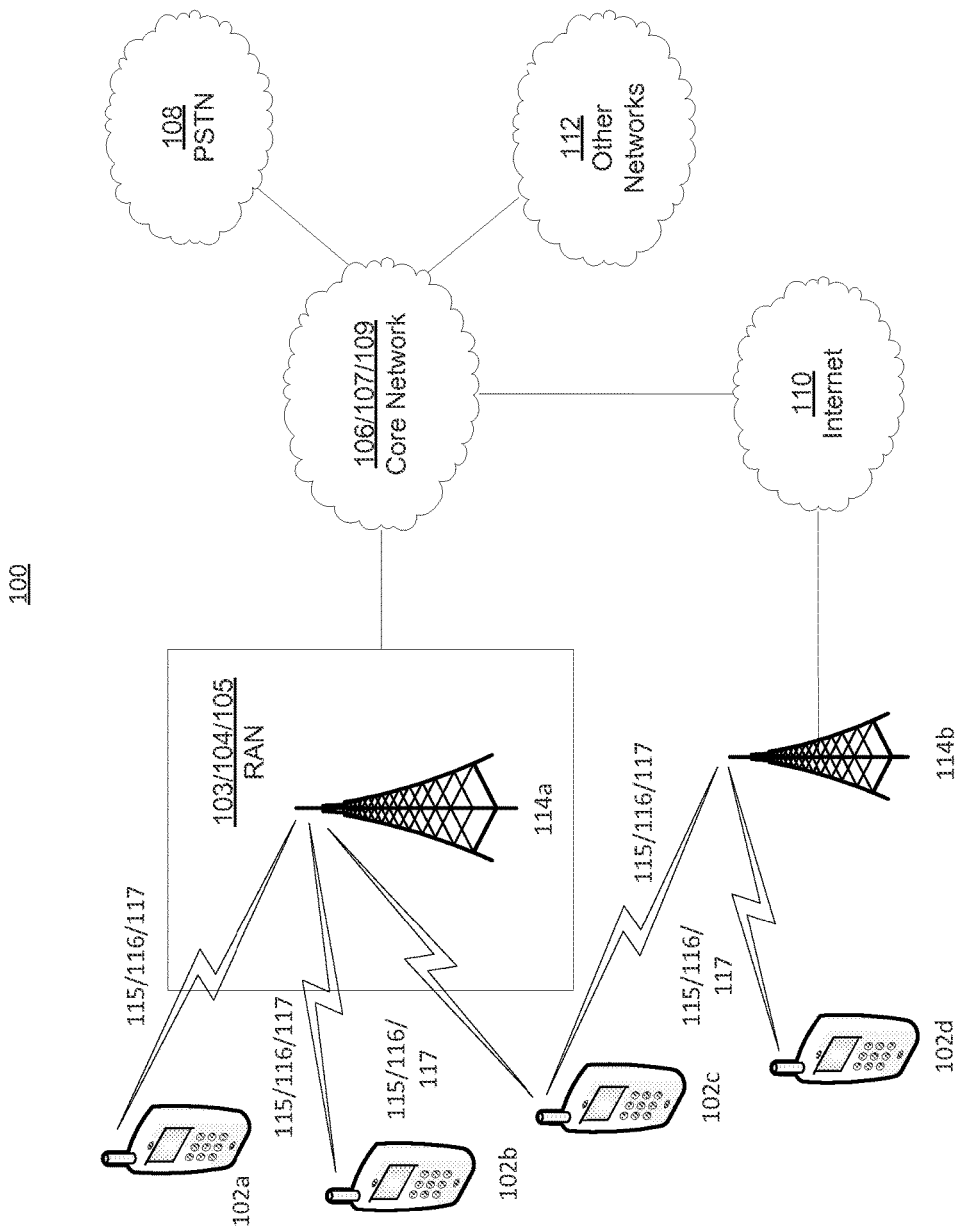
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000). Interim Standard 95 (IS-95), Interim Standard 856 (IS-856), Global System for Mobile communications (GSM). Enhanced Data rates for GSM Evolution (EDGE), GSM EDGE (GERAN), and the like.

The base station 114b in FIG. 1A may be a wireless router, Home Node B. Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 14b and the WTRUs 102c. 102d may utilize a cellular-based RAT (e.g., WCDMA, CDMA2000. GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a. 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
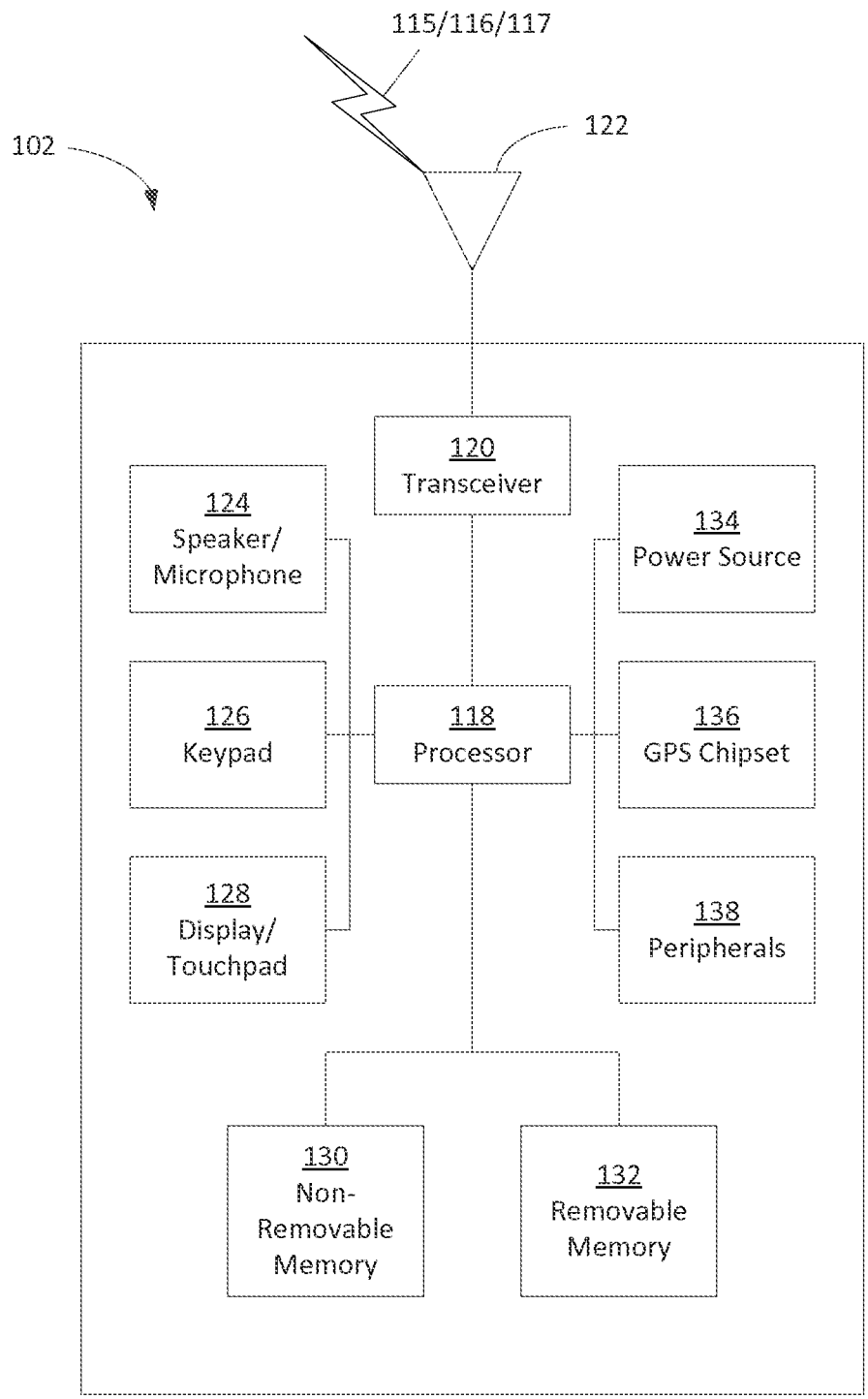
FIG. 1B is a system diagram of an example wireless transmit/receive unit (WTRU) that may be used within the communications system illustrated in FIG. 1A.

FIG. 1B is a system diagram of an example WTRU 102. As shown in FIG. B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs). Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
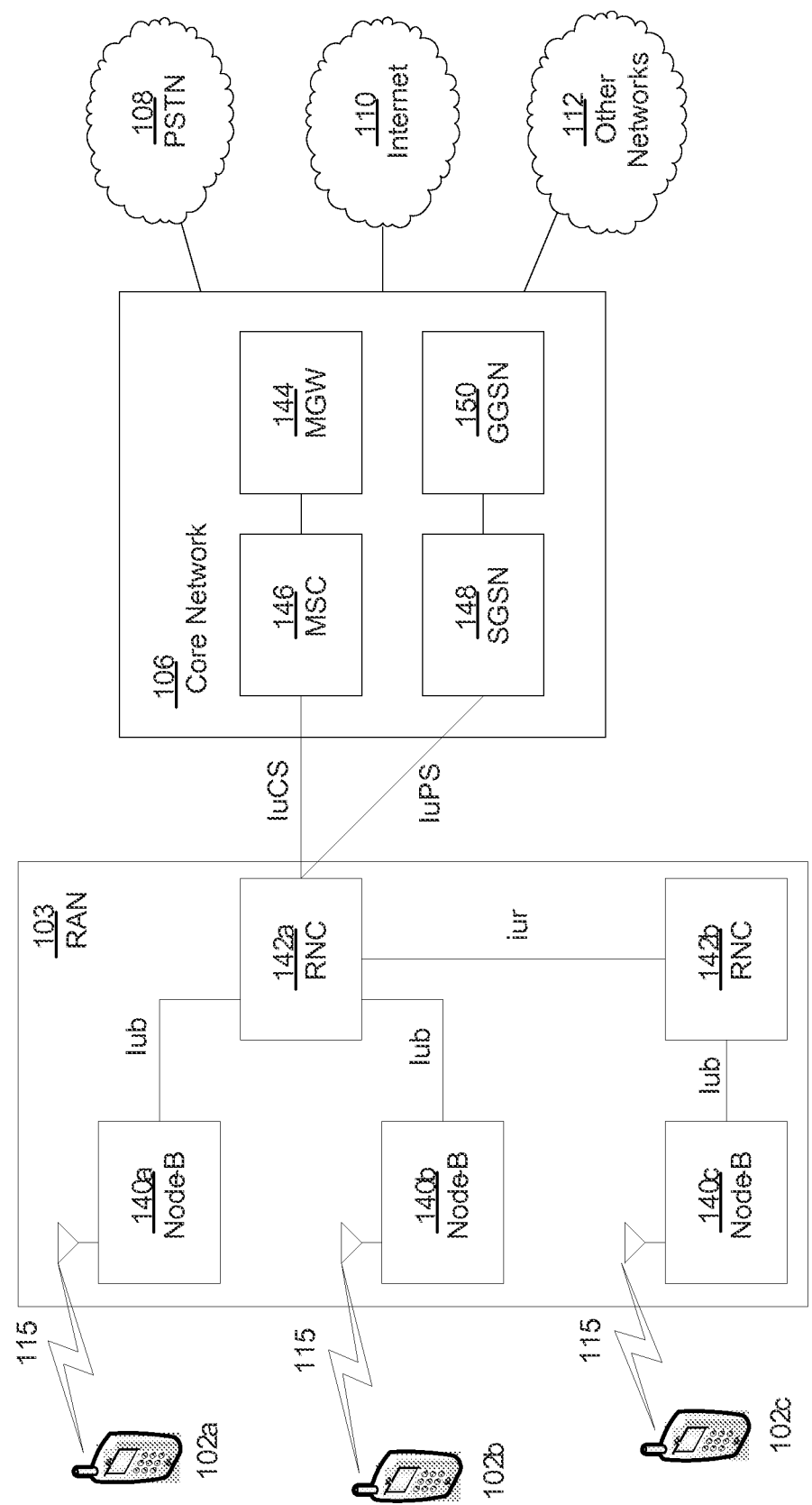
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
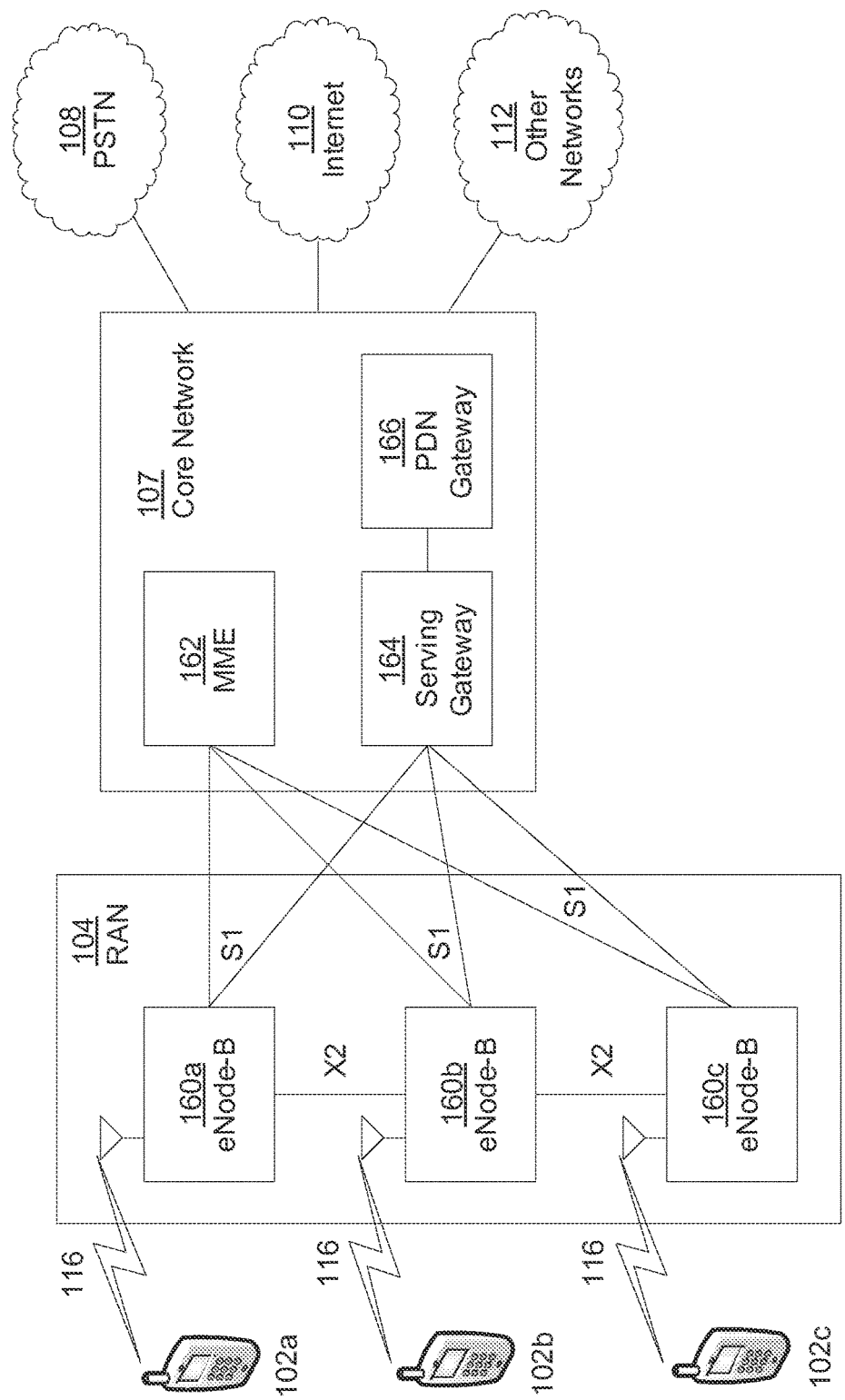
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b. 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a. 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
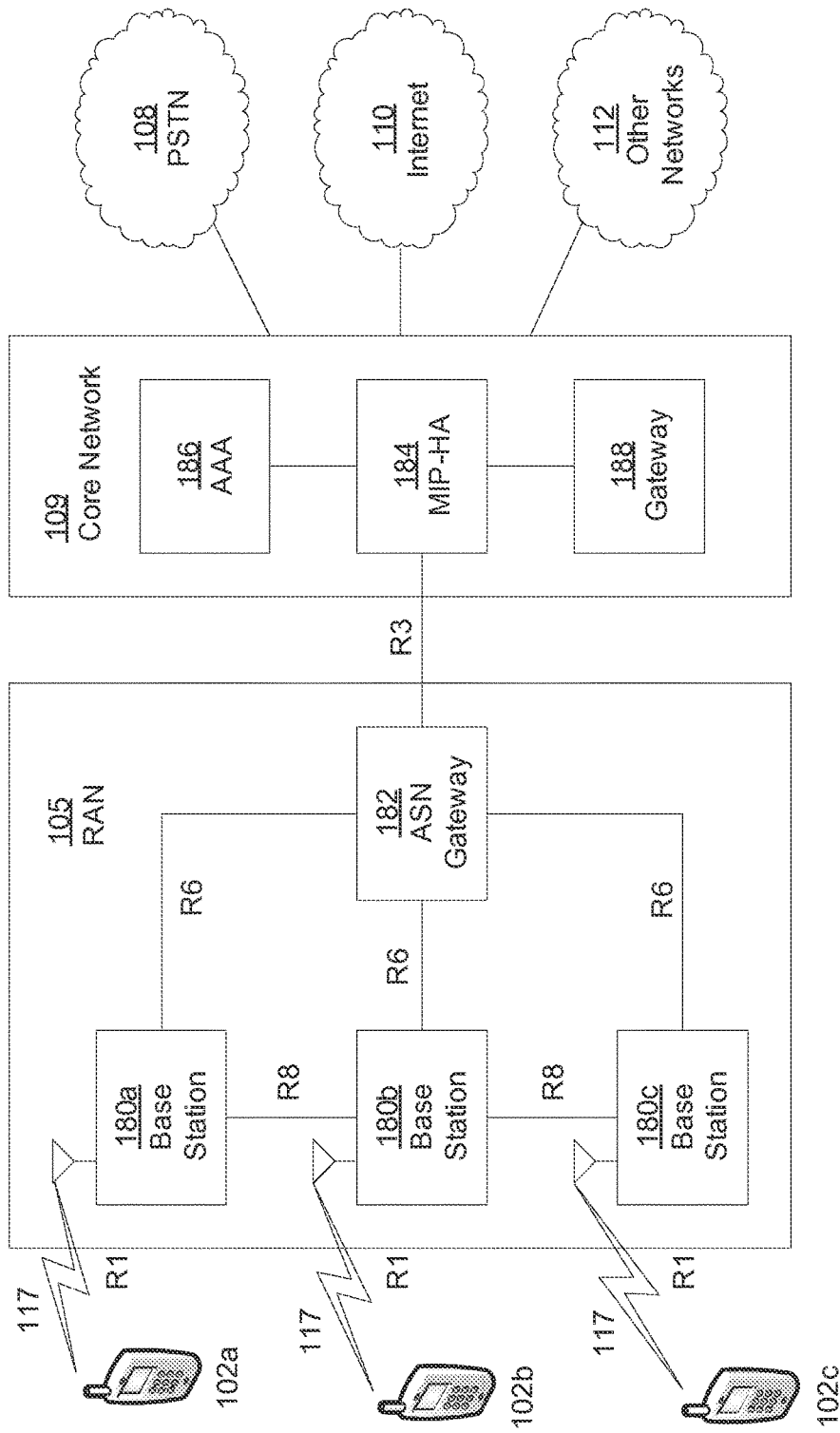
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Although described with reference to a router, the embodiments described herein may be application to any node, such as but not limited to, a base station, a WTRU, a network entity node, an Access Point (AP) in a Wi-Fi network, and/or the like. Although described with reference to Long Term Evolution (LTE) technology, the embodiments described herein may be applicable to other wireless communication technologies (e.g., HSPA). Although described with reference to IP flows and IP packets, the embodiments described herein may be applicable to any data flows that comprise one or more packets of data. A non-endpoint node may be, for example, a router, a base station, an Access Point (AP) in a Wi-Fi network, or a network entity node.

Real-time video traffic may be utilized to optimize the quality of experience (QoE) of the video, such as in the event of network congestion. Real-time video traffic may be utilized to optimize the QoE of the video via video-aware resource allocation for a cellular uplink/downlink. QoE optimization may use mechanisms for cooperation between a cellular network and a router on the Internet. A node may utilize QoE optimization mechanisms for cooperation between a cellular network and a router on the Internet. Uplink congestion at an eNB may be inferred. For example, a node may infer uplink congestion at the eNB. A node, such as a WTRU, may signal an eNB for handling uplink congestion. Packets may carry video frames that are indicated as important. Video frames may be indicated as important via the use of a priority indicator (e.g., a Flow Priority Indicator). A node may be configured to send congestion information and/or packet importance information to a PDCP, a RLC, and/or a MAC sub-layer for video-aware resource allocation. Delivery of real-time video application traffic over cellular networks may be facilitated by exploiting the characteristics of real-time video traffic.

A network (e.g., a cellular network) may identify network congestion. Network congestion may occur and/or impact wireless uplink, wireless downlink, the routers, etc. The network (e.g., a cellular network) may identify a packet carrying an important video frame. The network may notify a resource allocation entity (e.g., eNB, PDN, GW, or the like) of network congestion and/or packets carrying an important video frame. The network notifying the resource allocation entity may allow the resource allocation entity to be video-aware. The video-aware resource allocation entity may improve the QoE of a real-time video application. For example, the network or video-aware resource allocation entity may concentrate packet losses (e.g., at the network layer, MAC layer, or the like) to a small fraction of the real-time video traffic flows.

Figure 2:
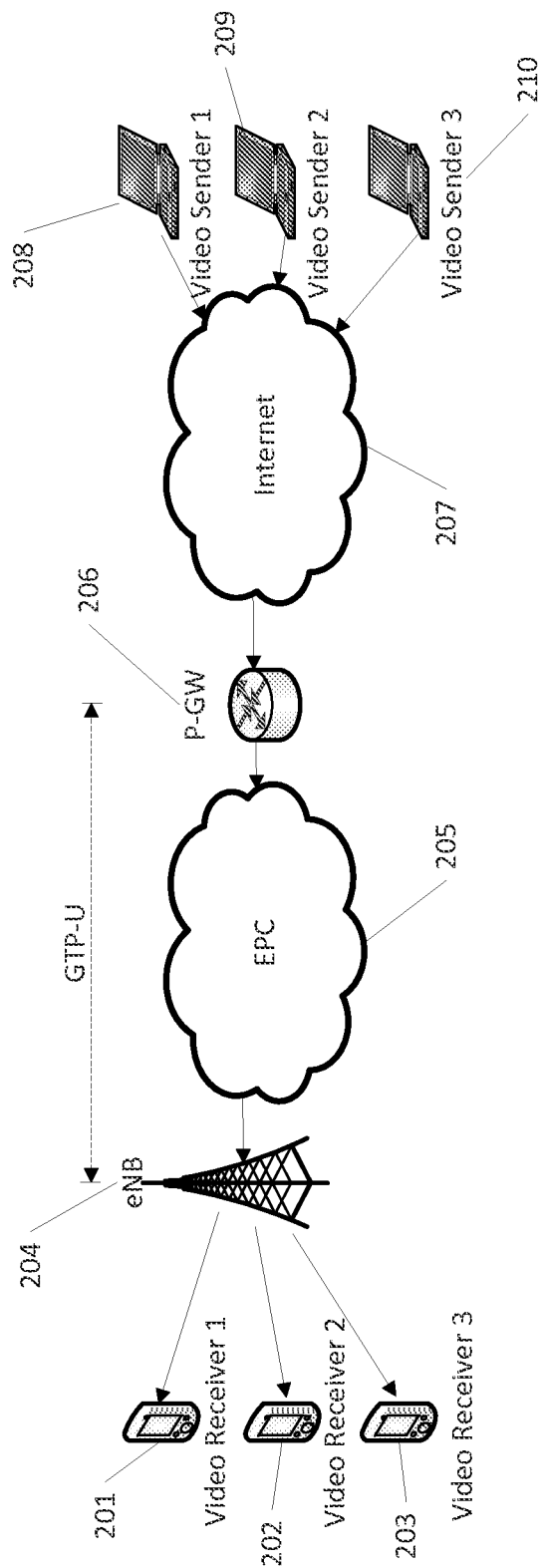
FIG. 2 is a diagram illustrating an example downlink use case for QoE resource allocation.

A real-time video application may refer to a video telephony application (e.g., video conferencing), video gaming (e.g., a direct communication between two gamers, via a cloud, or the like), etc. FIG. 2 is a diagram illustrating an example downlink use case for QoE resource allocation. In FIG. 2, video senders 208, 209, 210 may send signals to the Internet 207. The Internet 207 may send signals to the P-GW 206. The P-GW 206 may send signals to the Evolved Packet Core (EPC) 205. The EPC 205 may send signals to the eNB 204. The General Packet Radio System (GPRS) Tunneling Protocol User Plane (GTP-U) may comprise the eNB 204, the EPC 205, and/or the P-GW 206. The eNB 204 may send signals to the video receivers 201, 202, 203.

Figure 3:
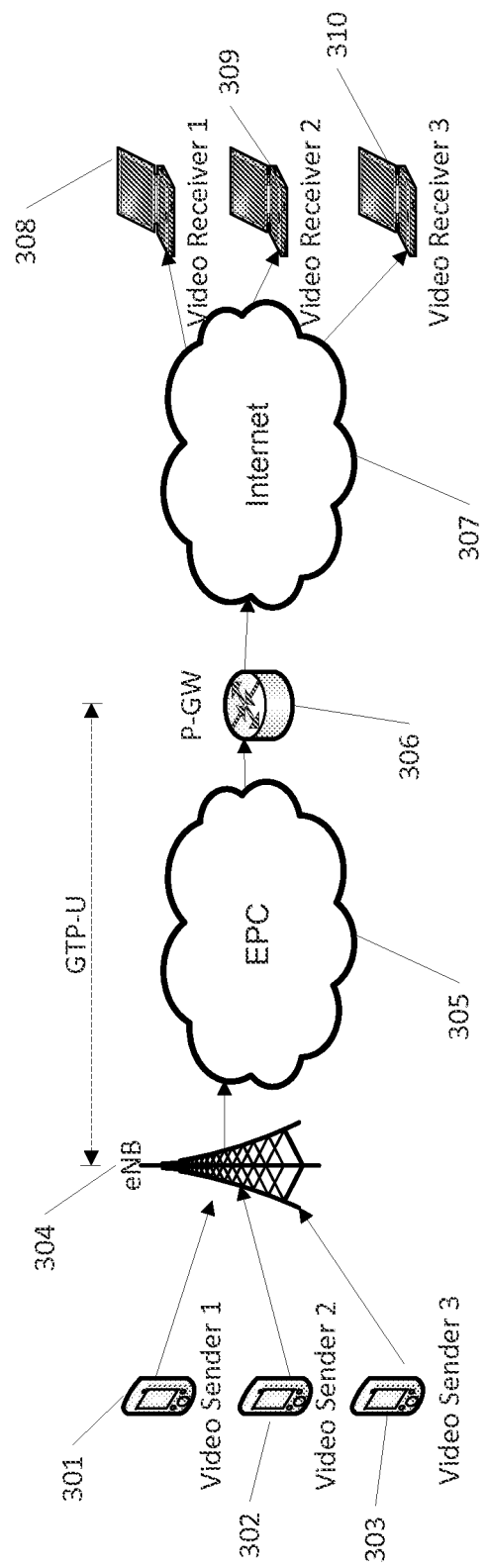
FIG. 3 is a diagram illustrating an example uplink use case for QoE resource allocation.

FIG. 3 is a diagram illustrating an example uplink use case for QoE resource allocation. In FIG. 3, video senders 301, 302, 303 may send signals to the eNB 304. The eNB 304 may send signals to the EPC 305. The EPC 305 may send signals to the P-GW 306. The General Packet Radio System (GPRS) Tunneling Protocol User Plane (GTP-U) may comprise the eNB 304, the EPC 305, and/or the P-GW 306. The P-GW 306 may send signals to the Internet 307. The Internet 307 may send signals to the video receivers 308, 309, 310.

In the downlink, such as in FIG. 2, congestion may occur in the Internet, in the Evolved Packet Core (EPC), and/or at the wireless downlink. If congestion occurs in the Internet, the video sender and/or a router that is in the Internet may provide QoE resource allocation, for example, as described herein. Congestion may occur in the EPC core network, in the RAN, and/or at the wireless link.

Network congestion may cause packet losses. Network congestion may comprise congestion in the SGW and/or P-GW. RAN congestion may cause packet losses. RAN congestion may be congestion at the eNB. Channel errors may cause packet losses. Channel errors may be due to the unreliability of the wireless channel. An LTE/LTE-A system may employ adaptive Modulation and Coding Scheme (MCS) selection. Channel errors may be maintained at a target value, for example, regardless of the channel state information. Mechanisms at the RLC, LLC, and/or PDCP may be used to ensure that channel errors are kept reasonably low. Packet loss may induce congestion.

Figure 4:
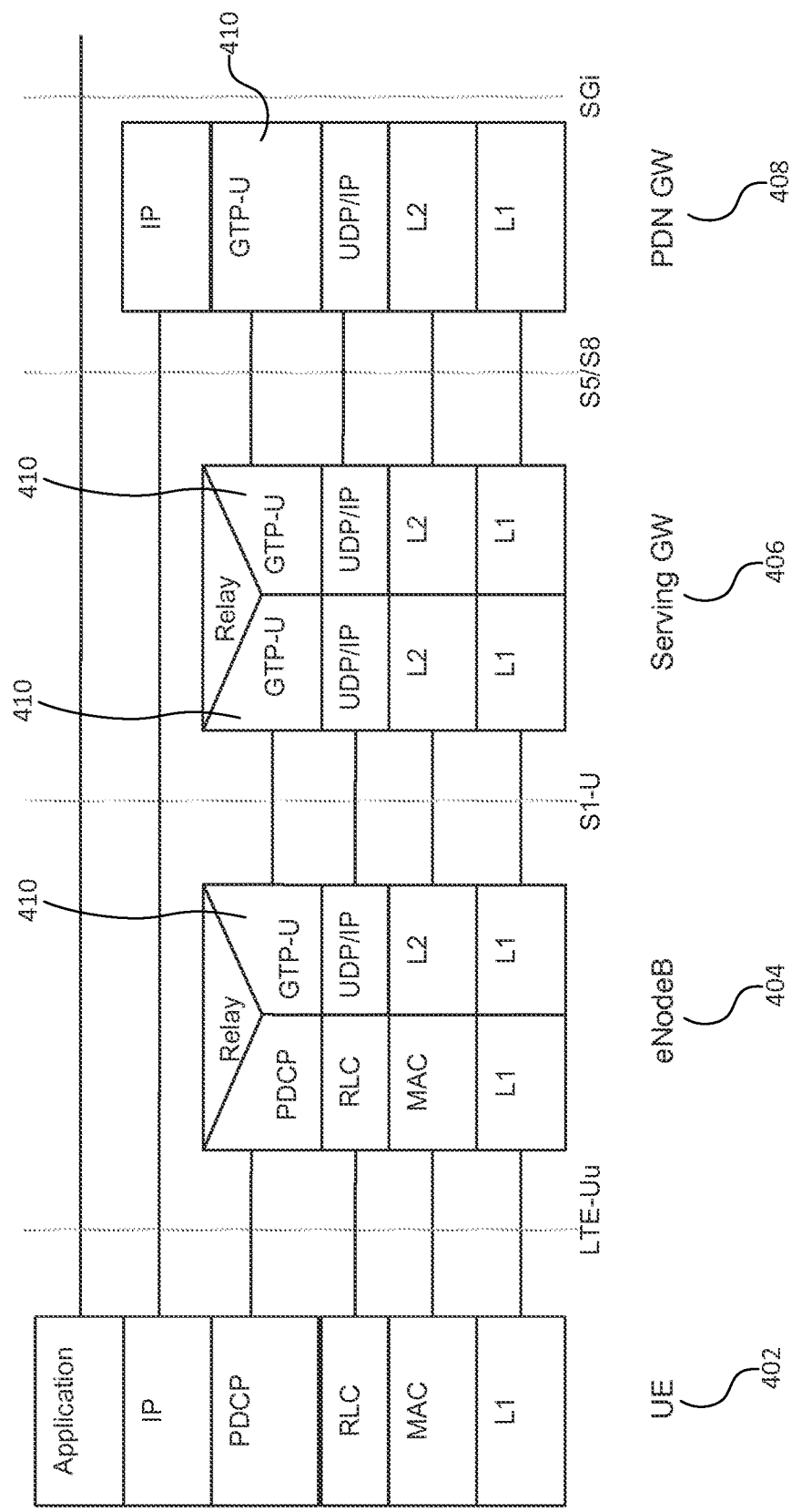
FIG. 4 illustrates an example location of a GTP-U in a protocol stack in the user plane.

FIG. 4 illustrates an example location of a GPRS Tunneling Protocol User plane (GTP-U) in a protocol stack in the user plane. In the EPC, a Policy Control Rule Function (PCRF) may send rules to the P-GW 408, which for example, may map the IP packet header marking to a GPRS Tunneling Protocol User plane (GTP-U) packet header marking 410. The GTP-U packet header marking 410 may be in the form of extending the priority indicator (e.g., FPI). The priority indicator may be on a per IP flow basis. For example, packets belonging to the same IP flow may have the same value for the priority indicator field. The priority indicator values may be different among packets that belong to the same or a similar IP flow. The priority indicator value may be assigned and/or updated dynamically, for example, based on events happening in the network and/or action taken by a video sender. The marking in the GTP-U packet header 410 may be accessible by an eNB 404, for example, when a packet arrives at the eNB 404. The eNB 404 may update the state of the corresponding flow. The eNB 404 may send information indicating whether the packet carries an Instantaneous Decoder Refresh (IDR) frame or a frame and/or packet that is characterized by a greater importance to video quality to the protocol stack for the wireless link. A frame or packet that is characterized by a greater importance to video quality may be a portion of an IDR frame, a more important P frame, a portion of a more important P frame, an intra-coded video frame, etc. For example, an IP flow may be a bitstream that includes two or more IP packets, such as a video flow, a real-time video flow, a sequence of packets carrying File Transfer Protocol (FTP) data, and/or the like. The video quality importance may relate to usage of a frame for prediction of other frames of the IP flow.

Figure 5:
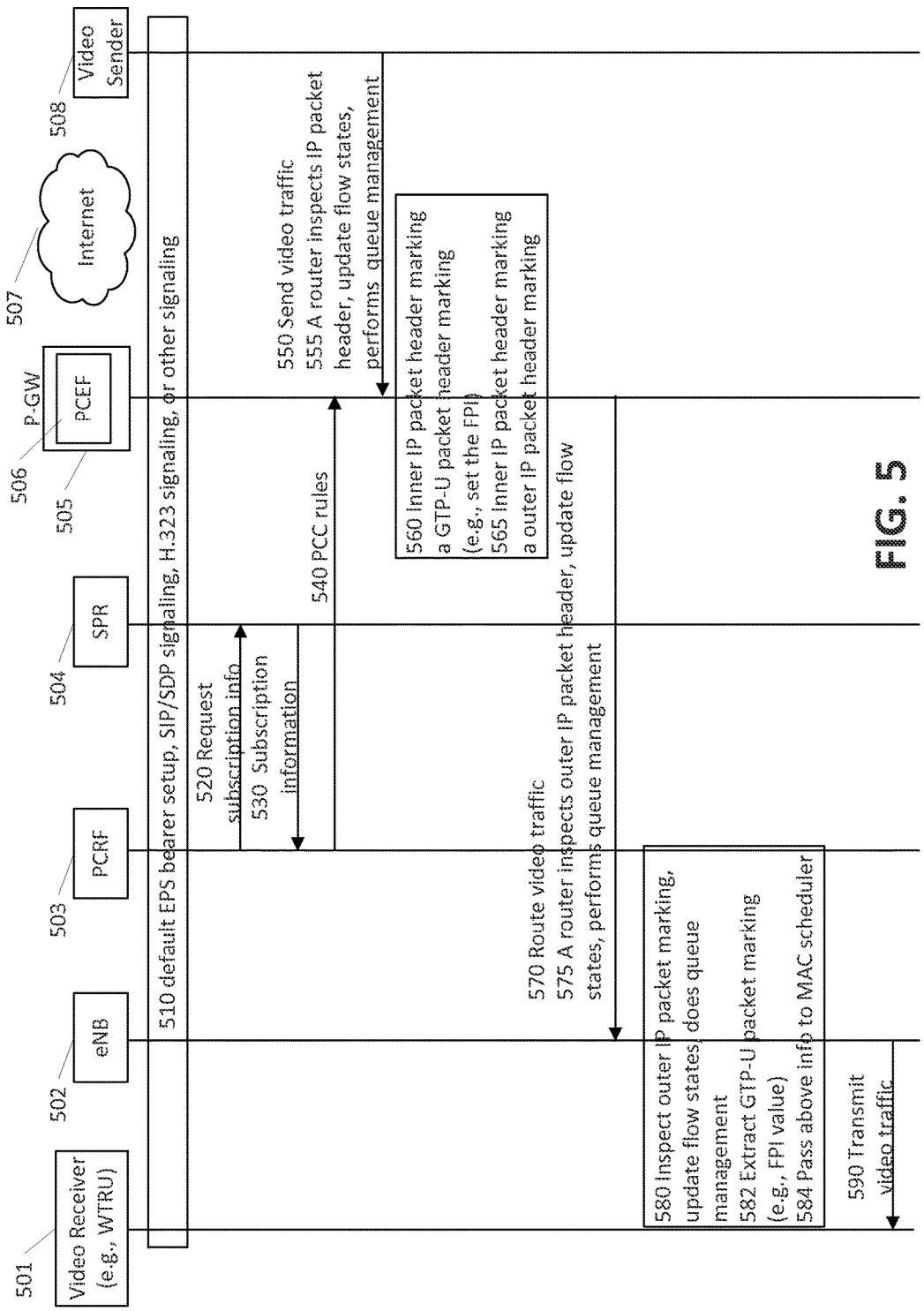
FIG. 5 is a flow diagram illustrating an example of downlink video QoE aware resource allocation.

FIG. 5 is a flow diagram illustrating an example downlink QoE aware resource allocation for a video application. In 510, a default EPS bearer may be established. In 510, a video sender 508 and/or a video receiver 501 may determine parameters for a video session, for example, via protocols such as SIP/SDP or H.323. Policy Control Rule Function (PCRF) 503 may receive information about the ensuing data traffic flow via the Rx interface. For example, the information may include the IP 5-tuples, whether the data traffic flow is video streaming, video telephony, video gaming, etc.

In 520, the PCRF 503 may send a request to a Subscription Profile Repository (SPR) 504 to obtain subscription information for the user.

In 530, the SPR 504 may send the subscription information of the user to the PCRF 503. For example, the information may include the subscription level of the user. The PCRF 503 may use the information to generate PCC rules.

Figure 7:
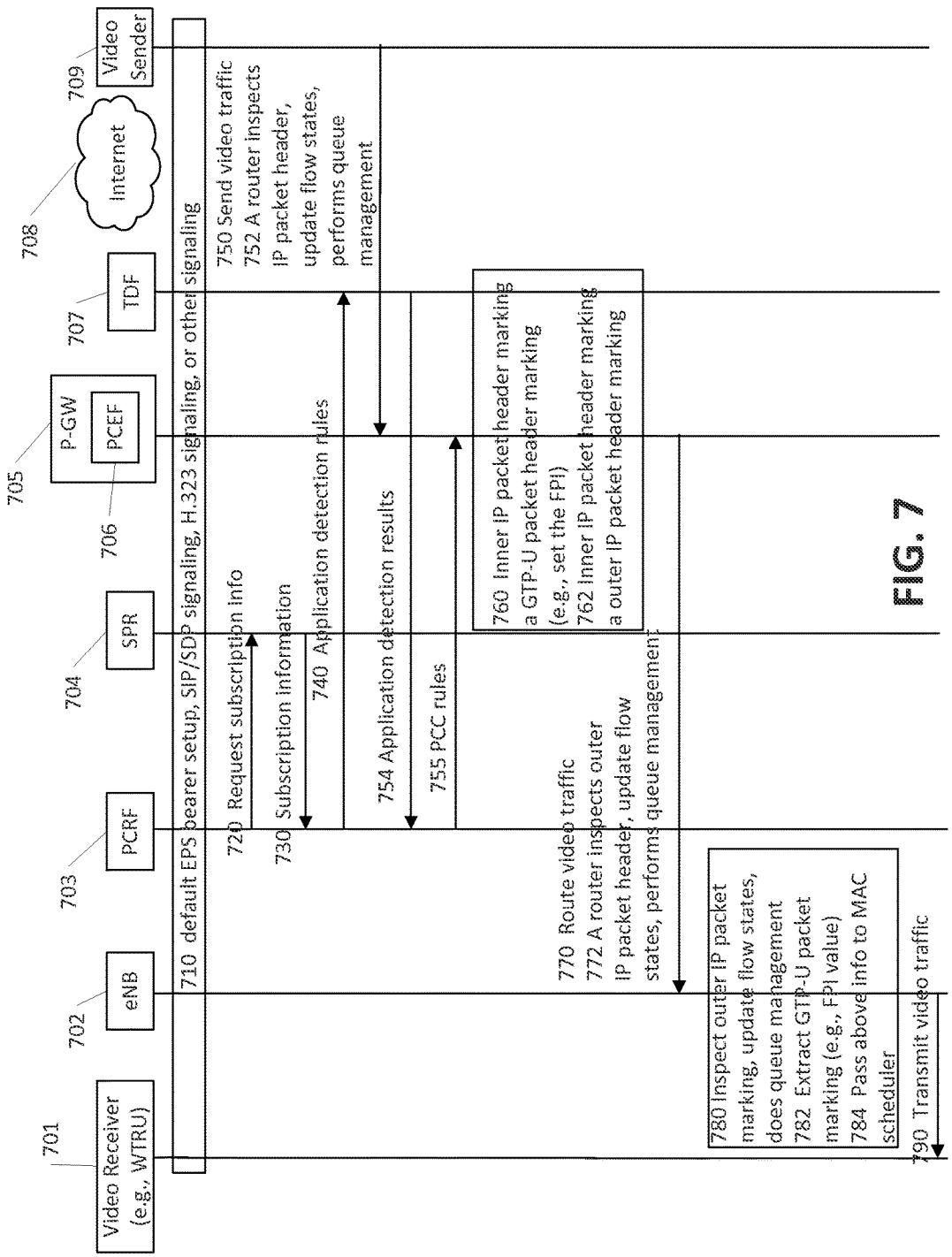
FIG. 7 is a flow diagram illustrating an example of downlink video QoE aware resource allocation with stand-alone TDF.

In 540, the PCRF 503 may send the PCC rules to the P-GW 505. The PCC rules may be used to determine how to map an IP packet header marking (e.g., received from the Internet 507) to the GTP-U packet header marking. The GTP-U packet header marking may be in the form of a priority indicator (e.g., FPI). The IP packet may be referred to as an inner IP packet. For example, the IP packet may be encapsulated as the payload of a GTP-U packet (e.g., as shown in FIG. 7). The marking in the inner IP packet header may include information on the state of a traffic flow.

In 550, the video sender may send video traffic. One or more routers in the Internet 507 may coordinate with the video sender 508. A plurality of bits (e.g., three bits a, b, and c) may be used for router coordination. A router may maintain a state variable for a real-time video traffic flow. In 555, a router may update the state of a flow upon a packet arrival, dropping of a packet, etc. In 555, the router may perform queue management based on the network congestion and/or the states of the real-time video traffic flows. The IP packet header may include a plurality of bits (e.g., bit a, bit b, and bit c). A router may use a bit (e.g., bit a) to indicate to downstream routers that a packet loss has occurred to a flow. For example, a bit (e.g., bit a) used to indicate to downstream routers that a packet loss has occurred to a flow may be referred to as a lost packet indicator. A router may use a bit (e.g., bit b) to indicate to downstream routers that error propagation has been stopped. For example, the router may use a bit (e.g., bit b) to reset a state of an IP flow in one or more routers through which the IP flow travels, for example, in multi-path routing. A video traffic flow may traverse multiple routes, for example, when load balancing is utilized in the network. A router may use a bit (e.g., bit c) to indicate whether a packet carries an intra-coded video frame.

A plurality of bits (e.g., three bits) may be used for router coordination. A bit (e.g., bit a) may be a congestion indicator. A router may control the bit a. The bit a may convey information relating to whether an IP flow has experienced packet losses. The bit a may be set to 1 to indicate the IP flow has experienced packet loss. The bit a may be set to 0 to indicate the IP flow has not experienced packet loss (e.g., has not recently experienced packet loss, or has not experienced packet loss since the most recent refresh frame). The bit a may be used to carry IP flow specific information.

A router may use a bit (e.g., bit b) to determine whether the video encoding adaptation has been performed. A bit b may be set to 1 to indicate the video encoding adaptation has been performed. A bit b may be set to 0 to indicate the video encoding adaptation has not been performed (e.g., has not been performed recently, or has not been performed after a packet loss). The video encoding adaptation may comprise generation of an IDR frame, Reference Picture Selection (RPS), etc.

A router may use a bit (e.g., bit c) to determine whether the packet is carrying an important frame. An important frame may comprise an IDR frame, a P frame with significant impact on error propagation, and/or the like. A bit c may be set to 1 to indicate the packet is carrying an important frame. A bit c may be set to 0 to indicate the packet is not carrying an important frame. The bit c may be used to carry IP packet specific information.

A router may maintain a state variable for one or more IP flows. For example, a state variable, State_k may be used for an IP flow k. The router may set one or more bits (e.g., bit a, bit b, and bit c) for an IP flow. The bits may be used to update the state variable (e.g., State_k), for example, at another router. The router may not route a packet successfully. To determine which packet(s) to drop, a node may be configured to select a video traffic flow (e.g., a low priority video traffic flow). A node may select a low priority packet within the selected video traffic flow to drop (e.g., a packet that may not carry an important video frame, such as an intra-coded video frame). For example, a packet that may not carry an important video frame may be a packet in which the bit c is equal to 0. For example, a router may perform the following when receiving a packet of an IP flow that comprises one or more bits (e.g., bit a, bit b, and bit c):

At a router:

```
if a=0 in an incoming packet n
    if it decides to drop packet n
        State_k = loss
    else if b=1
        State_k=no_loss
        routes packet n
    else if State_k=loss
        sets a=1 for packet n and routes it
    end
else //a=1 in an incoming packet n
    State_k=loss
    routes packet n
end
```

A router may concentrate packet losses to one or more degraded traffic flows. If the state variable State_k=loss, the router may set the IP flow k to a low priority in the queue management. For example, the router may concentrate the packet losses to flow k. For example, setting the state variable at the video sender may be performed according to the example algorithm provided herein.

At a video sender:

```
sets a=0 for outgoing packets
if receives an RTCP packet indicating a prior packet loss
    trigger video encoding adaptation (e.g., generation of an IDR frame,
Reference Picture Selection, etc.)
    start a timer T
    sets b=1 in the next packets to be sent before the timer expires
    sets c=1 for packets among the next packets above that carry the IDR
frame and/or an important video frame
    after the timer expires, set b=0 for the next packets
end
```

A video receiver may perform the following according to the example algorithm provided herein.

At a video receiver:

```
if it detects a gap in the RTP sequence number
    sends an RTCP packet loss report back to the video sender
end
```

A router may utilize bit a, bit b, and/or bit c where a traffic flow goes through multiple paths in the network. Bit c may be associated with an IP packet that carries an IDR frame. A router may use bit c to reset a state of one or more routers on a branch of a path, for example, in multi-path routing. A router may not use bit c to reset routers on the other branches. A router may send non-IDR frames that carry a signaling bit (e.g., bit b), for example, to the routers on the branches that do not receive bit c. A router may use bit c when a router drops an IP packet. An IP packet with bit c conveying 1 may be given higher priority. A router may update a state variable. A router may determine how to update a state variable according to one or more bits (e.g., bit a). For example, a router may determine how to update a state variable based on one or more algorithms described herein.

A packet may get lost in a real-time video traffic flow. The real-time video traffic flow may have a successive temporal prediction video coding structure, such as an IPPP structure or the temporal layer 0 of the Hierarchical P video coding structure. When a packet gets lost in a real-time video traffic flow, the performance degradation due to additional packet losses (e.g., in the successive temporal prediction video coding structure) may be less than that due to the first packet loss. The overall QoE of multiple real-time video traffic flows may be optimized, for example, when a packet gets lost in a real-time video traffic flow. A network entity (e.g., a router, an eNB, or the like) may concentrate the packet losses to a small fraction of real-time video application traffic flows, for example, in the event of network congestion. The network entity may maintain the QoE of real-time video applications which may not have lost packets. The network entity may minimally degrade the QoE of real-time video applications that have already lost a packet, for example, by concentrating the packet losses to a small fraction of real-time video applications. For example, the network entity may use additional bits (e.g., bit a, bit b, and/or bit c). The additional bits may enable a loss concentration type of resource allocation, for example, when multiple routers on the path of a real-time video traffic flow and/or where there may be multiple paths between the video sender and the video receiver.

The router may be configured to determine one of more characteristics associated with one or more flows in the router's queues. Characteristics may include a type of traffic, an associated application, a type of QoS, and/or a rate, such as a peak, moving average, instant, total amount of buffer occupancy, etc. The router may be configured to determine one of more characteristics related to the sender and/or the receiver. For example, the router may be configured to determine one of more characteristics associated with one or more flows in the router's queues or characteristics related to the sender and/or receiver when a router determines that one or more packets may be initially dropped from one of its queues. The router may be configured to determine one of more characteristics associated with one or more flows in the router's queues or characteristics related to the sender and/or receiver in the event of network congestion. Network congestion may be a result of queue levels, queue occupancy reaching a certain threshold, and/or the like.

The router may select one or more flow(s) from which to drop one or more packet(s). The router dropping one or more packets may comprise the router marking one or more packets for congestion, for example, using ECN marking. For example, the router may select a real-time video traffic flow that has not experienced any packet losses. The router may select the flow to drop packets at random and/or by following one or more rules. The rules may be designed to enforce certain fairness criteria. For example, the router may drop packets of a video traffic flow with excessively high data rate. The rules may be based on user subscription information. For example, the router may drop packets from the flow of a user with premium subscription service after the router drops packets from the flows of users of lower subscription services. A hybrid approach may be utilized. For example, a higher data rate threshold may be set for a user of premium subscription service. If the data rate of a user of premium subscription service exceeds its threshold, the router may drop packets from the user of premium subscription service before the router drops a packet from a user with a lower subscription service. The router may concentrate subsequent packet drops to the selected flows if the state of congestion remains.

In 560, when a P-GW 505 receives an IP packet from the Internet 507, the P-GW 505 may inspect the marking in the IP packet header (e.g., which may be in clear text). In 560, the P-GW 505 may map the marking to the GTP-U packet header. The TDF may be collocated with the P-GW 505. The marking in the GTP-U packet may correspond to a bit (e.g., bit c), which for example, may indicate whether the GTP-U packet carries all or part of an IDR video frame. This IP packet may be referred to as an inner IP packet, for example, as described herein with reference to FIG. 6. In 565, the P-GW 505 may translate the inner IP packet header marking into a marking of the outer IP packet header, for example, so that the routers in the EPC may directly access the bits (e.g., the bit a, bit b, and/or bit c as described with reference to FIG. 6) without deep packet inspection for potential queue management. A standalone TDF may perform the flow detection. FIG. 7 flow diagram illustrating an example for downlink QoE video-resource allocation with standalone TDF.

The P-GW may map the inner IP packet header marking to the FPI values in the GTP-U packet header. The P-GW may map the FPI values in the GTP-U packet header to the outer IP packet header marking. The IP packet header marking may carry IP flow specific information and/or packet specific information. The FPI may comprise IP flow specific information and/or packet specific information. For example, IP flow specific information may comprise a lost packet indicator (e.g., the bit a as described herein). For example, packet specific information may comprise the bit c as described herein. For example, the FPI may comprise bit b as described herein.

In 570, a router in the EPC network may route the outer IP packets carrying the GTP-U packets. The GTP-U packets may include inner IP packets. At 575, the router may inspect the outer IP packet. The marking in the outer IP packet header may be used for intelligent network resource allocation. For example, an outer IP packet with a marking corresponding to the bit c=1 in the inner IP packet header (e.g., as described with reference to FIG. 6) may be given higher priority in the event of network congestion. Service subscription level may be used in selecting which flow to drop packets from. For example, service subscription level may be based on the QCI values associated with a traffic flow. At 575, the router may update state variables. At 575, the router may perform queue management.

At 580, an eNB 502 may receive an outer IP packet from the EPC network. At 580, the eNB may record the outer IP packet marking, update the state of traffic flows, and/or perform queue management at the Network layer. At 582, the eNB 502 may extract the GTP-U packet and/or recover the GTP-U packet marking. The GTP-U packet markings may indicate to the eNB 502 how to serve this GTP-U packet. For example, if the FPI field in the GTP-U packet indicates that this GTP-U packet carries IDR traffic, the eNB 502 may give higher priority to this GTP-U packet in resource allocation. At 584, the eNB 502 may send the GTP-U packet markings to the PDCP, RLC, and/or MAC layer in the RAN part of the eNB. The eNB 502 sending the GTP-U packet markings may enable packet prioritization at the PDCP, RLC, and/or MAC layer. The prioritization at the MAC layer may be part of the MAC packet scheduling. For example, the eNB 502 may perform identification of packets carrying an IDR frame by tracking the packet segmentation and aggregation using a table lookup. The eNB 502 may not mark outgoing packets, for example, because the eNB 502 may be the last node that may drop packets. The WTRU 501 may not be expected to drop packets once the WTRU 501 receives packets.

At 590, the eNB 502 may transmit the video traffic. The WTRU 501 may send the RTCP packet loss feedback.

The MAC packet scheduler may be adjusted, for example, to support features such as priority indication (e.g., via FPI). Packet scheduling may be on a logical-channel basis. One-to-one mapping between EPS bearers and logical channels may be utilized. The priority indication information may be sent and/or sub-logical channels may be created at the MAC layer. For example, a logical channel may be split into multiple sub-logical channels. Different sub-logical channels may carry traffic to be prioritized differently. The total resource allocation for the sub-logical channels as a whole may remain the same.

Figure 6:
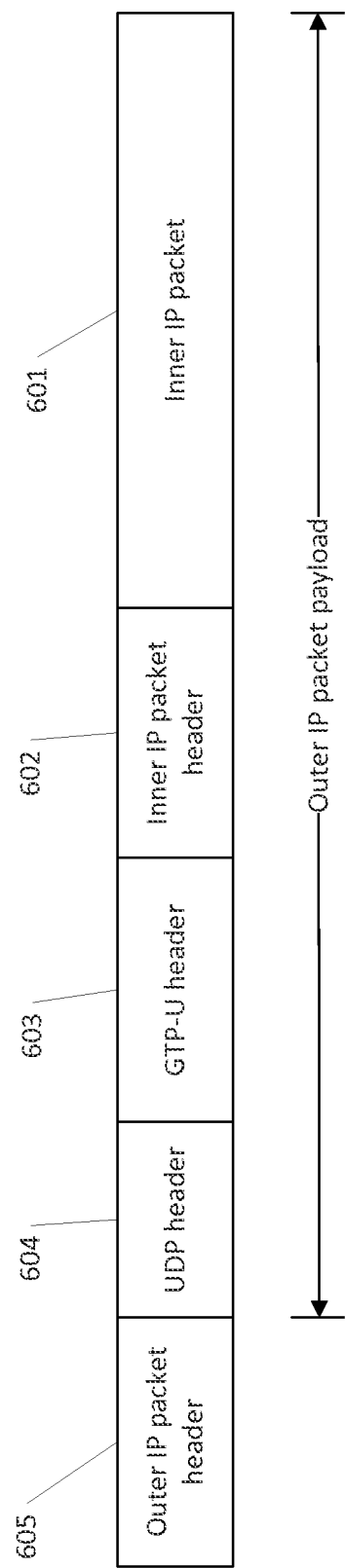
FIG. 6 is a diagram illustrating an example packet format for GTP-U tunneling.

FIG. 6 is a diagram illustrating an example packet format for GTP-U tunneling. An IP packet may be referred to as an inner IP packet 601. The IP packet may be encapsulated as the payload of a GTP-U packet. The marking in the inner IP packet header 602 may include information on the state of a traffic flow. The P-GW may translate the inner IP packet header 602 marking into a marking of the outer IP packet header 605, for example, so that the routers in the EPC may directly access the bits (e.g., the bit a, bit b, and/or bit c).

FIG. 7 is a flow diagram illustrating an example for downlink QoE video-resource allocation with standalone TDF. Downlink QoE video-resource allocation with standalone TDF may be similar to FIG. 5, which is an example downlink QoE aware resource allocation for a video application such as where the TDF is collocated at the PCEF. In 710, a default EPS bearer may be established. In 710, a video sender 709 and/or a video receiver 701 may determine parameters for a video session, for example, via protocols such as SIP/SDP or H.323. A Policy Control Rule Function (PCRF) 703 may receive information about the ensuing data traffic flow via the Rx interface. For example, the information may include the IP 5-tuples, whether the data traffic flow is video streaming, video telephony, video gaming, or the like, etc.

In 720, the PCRF 703 may inquire a Subscription Profile Repository (SPR) 704 to obtain subscription information for the user.

In 730, the SPR 704 may reply to the PCRF 703 with the subscription information of the user. For example, the information may include the subscription level of the user.

In 740, the PCRF 703 may send the application detection rules. In comparison, FIG. 5, at 540, the PCRF 503 may send PCC rules. PCC rules may be more general than application detection rules. In 750, the video sender 709 may send video traffic to the TDF 707. In 752, the router may inspect the IP packet header. In 752, the state variable may be updated at the TDF 707 and/or the P-GW 705. In 752, queue management may be performed at the TDF 707 and/or the P-GW 705. In 754, the TDF 707 may report the traffic detection results. 740 and 754 may be performed on the Sd interface.

In 760, when a P-GW 705 receives an IP packet from the Internet 708, the P-GW 705 may inspect the marking in the IP packet header (e.g., which may be in clear text). In 760, the P-GW may map the marking to the GTP-U packet header. The marking in the GTP-U packet may correspond to a bit (e.g., bit c), which for example, may indicate whether the GTP-U packet carries all or part of an IDR video frame. This IP packet may be referred to as an inner IP packet, for example, as described herein with reference to FIG. 6. In 762, the P-GW 705 may translate the inner IP packet header marking into a marking of the outer IP packet header, for example, so that the routers in the EPC may directly access the bits (e.g., the bit a, bit b, and/or bit c as described with reference to FIG. 6) without deep packet inspection for potential queue management.

In 770, a router in the EPC network may route the outer IP packets carrying the GTP-U packets. The GTP-U packets may include inner IP packets. At 772, the router may inspect the outer IP packet. The marking in the outer IP packet header may be used for intelligent network resource allocation. For example, an outer IP packet with a marking corresponding to the bit c=1 in the inner IP packet header (e.g., as described with reference to FIG. 6) may be given higher priority in the event of network congestion. Service subscription level may be used in selecting which flow to drop packets from. For example, this may be based on the QCI values associated with a traffic flow. At 772, the router may update state variables. At 772, the router may perform queue management.

At 780, an eNB 702 may receive an outer IP packet from the EPC network. At 780, the eNB may record the outer IP packet marking, update the state of traffic flows, and/or perform queue management at the Network layer. At 782, the eNB 702 may extract the GTP-U packet and/or recover the GTP-U packet marking. The GTP-U packet markings may indicate to the eNB 702 how to serve this GTP-U packet. For example, if the FPI field in the GTP-U packet indicates that this GTP-U packet carries IDR traffic, the eNB 702 may give higher priority to this GTP-U packet in resource allocation. At 784, the eNB 702 may send the GTP-U packet markings to the PDCP, RLC, and/or MAC layer in the RAN part of the eNB. The eNB 702 sending the GTP-U packet markings may enable packet prioritization at the PDCP, RLC, and/or MAC layer. The prioritization at the MAC layer may be part of the MAC packet scheduling. For example, the eNB 702 may perform identification of packets carrying an IDR frame by tracking the packet segmentation and aggregation using a table lookup. The eNB 702 may not mark outgoing packets, for example, because the eNB 702 may be the last node that may drop packets. The WTRU 701 may not be expected to drop packets once the WTRU 701 receives packets.

At 790, the eNB 702 may transmit the video traffic. The WTRU 701 may send the RTCP packet loss feedback.

Figure 8:
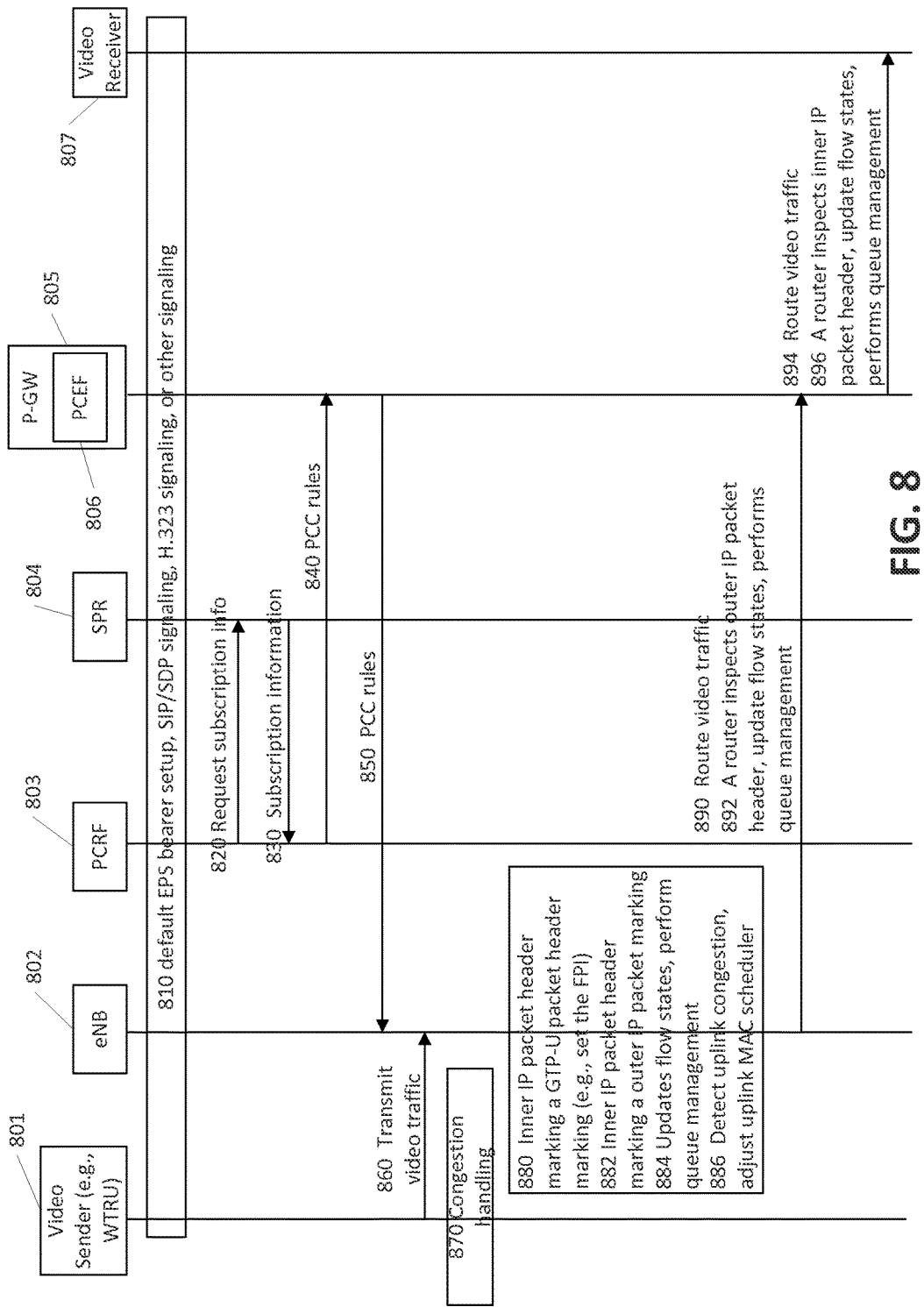
FIG. 8 is a diagram illustrating an example of uplink QoE aware resource allocation for video applications

FIG. 8 is a diagram illustrating an example for uplink QoE aware resource allocation for video applications. Congestion may occur at the wireless link, in the EPC, and/or in the Internet, for example, in the uplink. Uplink video-aware resource allocation may be similar to the downlink video aware resource allocation.

In 810, a default EPS bearer may be established. In 810, a video sender 807 and/or a video receiver 801 may determine parameters for a video session, for example, via protocols such as SIP/SDP or H.323. A Policy Control Rule Function (PCRF) 803 may receive information about the ensuing data traffic flow via the Rx interface. For example, the information may include the IP 5-tuples, whether the data traffic flow is video streaming, video telephony, video gaming, or the like, etc.

In 820, the PCRF 803 may inquire a Subscription Profile Repository (SPR) 804 to obtain subscription information for the user.

In 830, the SPR 804 may reply to the PCRF 803 with the subscription information of the user. For example, the information may include the subscription level of the user. The PCRF 803 may use the information to generate PCC rules.

In 840, the PCRF 803 may provide the PCC rules to the P-GW 805. The PCC rules may be used to determine how to map an IP packet header marking (e.g., received from the Internet 807) to the GTP-U packet header marking, which for example, may be in the form of an FPI. The IP packet may be referred to as an inner IP packet. For example, the IP packet may be encapsulated as the payload of a GTP-U packet (e.g., as shown in FIG. 7). The marking in the inner IP packet header may include information on the state of a traffic flow.

In 850, the P-GW 805 may send the PCC rules to the eNB 802. In 860, the WTRU video sender 801 may transmit video traffic to the eNB. In 870, the WTRU 801 may handle congestion.

In 880, when an eNB 803 receives an IP packet from the WTRU 801, the eNB 801 may inspect the marking in the IP packet header (e.g., which may be in clear text). In 880, the eNB may map the marking to the GTP-U packet header. The marking in the GTP-U packet may correspond to a bit (e.g., bit c), which for example, may indicate whether the GTP-U packet carries all or part of an IDR video frame. This IP packet may be referred to as an inner IP packet, for example, as described herein with reference to FIG. 6. In 882, the eNB 802 may translate the inner IP packet header marking into a marking of the outer IP packet header, for example, so that the routers in the EPC may directly access the bits (e.g., the bit a, bit b, and/or bit c as described with reference to FIG. 6) without deep packet inspection for potential queue management. In 884, the eNB 802 may update state variables. In 884, the eNB 802 may perform queue management. In 886, the eNB 802 may detect uplink congestion. At 886, the eNB may adjust uplink MAC scheduler.

In 890, the eNB 802 may route the outer IP packets carrying the GTP-U packets. The GTP-U packets may include inner IP packets. The eNB 802 may mark packets. At 892, the router (e.g., PGW) may inspect the outer IP packet. The marking in the outer IP packet header may be used for intelligent network resource allocation. For example, an outer IP packet with a marking corresponding to the bit c=1 in the inner IP packet header (e.g., as described with reference to FIG. 6) may be given higher priority in the event of network congestion. Service subscription level may be used in selecting which flow to drop packets from. For example, this may be based on the QCI values associated with a traffic flow. At 892, a router may update state variables. One or more routers may be present between an eNB and a P-GW. All routers along the path from the eNB to the P-GW may update state variables. An eNB 802 may update state variables. At 892, the router may perform queue management.

At 894, the P-GW 805 may route video traffic to the video receiver 807. For example, the P-GW 805 may route video traffic through one or more routers to the video receiver 807. For example, the P-GW 805 may route video traffic directly to the video receiver 807. At 896, a router (e.g., the P-GW, or a router between the P-GW and the video receiver) may inspect inner IP packet headers. At 896, the router may update flow statistics. At 898, a router may perform queue management.

The GTP-U packet header marking may be performed by an eNB 802 in the uplink video-aware resource allocation. The FPI may be used for the downlink video-aware resource allocation and/or the uplink video-aware resource allocation. For example, in the uplink video-aware resource allocation, the P-GW 805 may send the PCC rule to the eNB 802. Alternatively, the eNB 802 may be pre-configured with the PCC rules. The PCC rules may not be changed on a short time scale. A reference point may be defined between the core network and the RAN (e.g., the PCRF to eNB, PCEF to eNB, MME to eNB, or the like), for example, where an operator may configure (e.g., dynamically configure) the eNB 802 with FPI policies for the uplink video-aware resource allocation.

A WTRU 801 may handle congestion 870, for example, at the wireless link. The congestion may be detected, for example, by noticing overflow in the MAC queue. Upon detecting congestion, the WTRU 801 may insert an IDR frame into the video bitstream. Upon detecting congestion, the WTRU 801 may encode a dropped video packet with a lower resolution (e.g., lower bit rate) to avoid congestion. A WTRU 801 may be configured to insert an IDR frame into the video bitstream, such as similar to an RTCP packet loss feedback based approach in the downlink as described herein. The feedback delay in the uplink may be negligible compared to a delay of about an RTT in the downlink case.

The eNB 802 may not observe uplink congestion. The eNB 802 may infer uplink congestion, for example, by analyzing the PDCP sequence numbers. The eNB 802 may select (e.g., dynamically select) the MCS to adapt to the varying channel conditions, for example, to achieve a target packet loss rate at the MAC, RLC, and/or PDCP layer.

The eNB 802 may infer an occurrence of uplink congestion via the use of PDCP PDU sequence numbers. The eNB 802 may determine uplink congestion by inspecting the PDCP PDU sequence number. For example, the eNB 802 may determine uplink congestion if the number of missing PDCP PDUs is a percentage of the total PDCP PDUs and/or if the number of missing PDCP PDUs exceeds a threshold. For example, the threshold may be slightly larger than the percentage corresponding to the target MCS. The eNB 802 may use information regarding uplink congestion for future uplink scheduling, for example, by giving a smaller share of the uplink resources to a user that has experienced congestion.

At the WTRU 801, a 12-bit long PDCP sequence number (e.g., Next_PDCP_TX_SN) may be assigned to a PDCP SDU. The 12-bit long PDCP sequence number (e.g., Next_PDCP_TX_SN) may be increased by 1 for the next PDCP SDU, for example, that may come from an upper layer. A discardTimer may be associated with a received PDCP SDU. The WTRU 801 may be configured to associate a discardTimer with a received PDCP SDU. If the discardTimer expires, the associated PDCP SDU and/or PDCP PDU may be discarded. The WTRU 801 may send a discard signal to a lower layer, for example, if the PDCP PDU has been submitted to the lower layer. The discardTimer may expire due to bad channel quality (e.g., a particular bad realization of the random channel) and/or congestion.

An eNB 802 may determine that uplink congestion has occurred, for example, if the MCS for the uplink is configured to meet a target packet loss rate T. An eNB 802 may determine that uplink congestion has occurred, for example, if the observed packet loss rate is higher than the target value. The eNB 802 may inspect PDCP sequence numbers (e.g., which may be set by the WTRU 801). The eNB 802 may record gaps in the sequence numbers. The eNB 802 may calculate the number of missing PDCP PDUs as a percentage of the total PDCP PDUs. The number of missing PDCP PDUs as a percentage of the total PDCP PDUs may be referred to as p. The eNB 802 may determine that uplink congestion has occurred, for example, if $p \geq \min(T+d, 1)$, where for example, $d \geq 0$ may be a margin and/or min standards for the operation of taking the minimum of two operands. The eNB 802 may analyze the PDCP sequence numbers for more than one WTRU 801. The eNB 802 may combine the uplink congestion results (e.g., by using majority voting) to form a more reliable inference on uplink congestion. The eNB 802 may send the detection of uplink congestion to the MAC layer of the eNB 802, such as for optimized uplink scheduling.

The WTRU 801 may be configured by control signaling from the network, for example, such that the PDCP may allocate a PDCP SN to IP packets associated with a given bearer. The WTRU 801 configuration may apply to a PDCP instance. The PDCP instance may be associated with a bearer that may carry traffic. A bearer that may carry traffic may benefit from detection in the eNB 802 of a dropped packet by the WTRU 801. For example, a dropping event (e.g., a dropped packet) may result from a congestion event. A WTRU 801 may create a gap in the PDCP Sequence Numbering. The WTRU 801 may create a gap in the PDCP Sequence Numbering when a dropping event occurs. The PDCP Sequencing Numbering may include dropped packet(s) that would otherwise allocate a PDCP SN for a PDCP PDU that may be converted in a PDCP SDU for transmission once resources for transmission are available (e.g., granted, configured, or the like).

The eNB 802 may determine network congestion by utilizing signaling between the WTRU 801 and the eNB 802. For example, the WTRU 801 may deal with the packet loss at the application layer by means of cross-layer interaction, such as when a video packet (e.g., a real-time video packet) destined for the uplink is lost locally at the WTRU 801. The WTRU 801 may notify the eNB 802 of the logical channel(s) that carry video traffic (e.g., real-time video traffic). The WTRU 801 may notify the eNB 802 of the logical channel(s) that carry video traffic (e.g., real-time video traffic) to enable the eNB 802 to allocate uplink resource that optimize the performance of real-time video performance. The WTRU 801 may notify the eNB 802 whether one of its video traffic flows may have suffered from an initial packet loss due to uplink congestion. The WTRU 801 may notify the eNB 802 whether one of its video traffic flows may suffer from a packet loss in a near future, for example, within a certain amount of time. A WTRU 801 may send a notification that may be specific to a data radio bearer (DRB). The notification may comprise an indication of congestion in the WTRU's buffer. Congestion in the WTRU's buffer may be based on the time of stay, such as the delay experienced. The notification may comprise an indication of the remaining time before a discard may occur for the head of queue packet. The head of queue packet may be the oldest packet in the WTRU's buffer for the concerned DRB. The notification may comprise an indication of reaching a certain threshold (e.g., configurable threshold). The notification may comprise an indication of a possible drop. The notification may comprise an indication of a drop event. The notification may comprise an indication of a report of the head-of-queue delay. The notification may comprise an indication of a report of the remaining time before a discard would occur for the head-of-queue packet (e.g. the value of the associated SDU discard timer). The notification may be triggered when the PBR for the concerned DRB is not met, for example, within a period of time. The WTRU 801 may be configured to have the notification triggered when the PBR for the concerned DRB is not met, for example, within a period of time. The WTRU 801 may include the notification in a transmission subsequent to the loss event, for example, in the first transmission following a loss event. The notification may comprise a MAC notification, for example, information included in a MAC CE. For example, a MAC CE may be an extension to a MAC Buffer Status Report. The notification may be subject to a prohibit mechanism. The prohibit mechanism may be based on a timer and/or may be specific to a data radio bearer (DRB). For example, the WTRU 801 may use the notification as a configuration aspect of the WTRU, for example, for the concerned DRB. The WTRU 801 may use the prohibit mechanism as a configuration aspect of the WTRU, for example, for the concerned DRB.

The eNB 802 may collect information from the serving WTRUs. The eNB 802 may decide how to prioritize the WTRUs in allocating the uplink grants for the WTRUs. The WTRU that may report an initial packet loss has occurred to a video traffic flow (e.g., a real-time video traffic flow) may be configured to be given a lower priority than other WTRUs. For example, the WTRU may be configured to be given a lower priority because additional packet losses to that video traffic flow with initial packet losses may cause negligible performance degradation. The eNB 802 may send a grant to the WTRU 801. The grant may include information about how much of a grant a logical channel may use. Prioritization may affect real-time video traffic and may not affect other traffic carried by the WTRUs. The WTRU 801 may be configured to ensure prioritization may affect real-time video traffic. The WTRU 801 may be configured to ensure prioritization may not affect other traffic carried by the WTRU 801. The eNB 802 may be configured to ensure prioritization may affect real-time video traffic. The eNB 802 may be configured to ensure prioritization may not affect other traffic carried by the eNB 802. The WTRU 801 may allocate the grant among transport blocks in a logical channel carrying video traffic (e.g., real-time video traffic), such as when the WTRU 801 receives the grant. Transport blocks may carry more important packets, such as IDR frames.

A WTRU 801 may receive control signaling that indicates to the WTRU 801 that it may drop a packet and/or exclude a logical channel from the Logical Channel Prioritization (LCP), for example, for a period of time. Control signaling may include a MAC CE. The WTRU 801 may determine what packet(s) to drop, for example, by utilizing information that may be provided by the control signaling. For example, the information may include a DRB identity. The information may include a type of packet using similar classification, for example, using FPI bits. For example, the WTRU 801 may drop the head-of-queue packet (e.g., the oldest packet) in the WTRU's buffer for the concerned DRB, such as when the WTRU 801 receives the control information (e.g., including a DRB identity). For example, the WTRU 801 may drop the oldest packet in the WTRU's buffer and/or for an applicable DRB. The WTRU may drop the packet that may correspond to a specific type of encoded data when the WTRU receives the control information. The control information may include a type indication. For example, the WTRU 801 may drop the oldest packet in the WTRU's buffer for the concerned DRB that corresponds to a specific type of encoded data when it receives control information. The control information may include a type indication and/or a DRB identity.

The WTRU 801 may mark the IP packet header to indicate whether a packet carries an IDR frame or whether a packet does not carry an IDR frame. The WTRU 801 may use marking at the MAC layer of the WTRU to prioritize IDR frame traffic. The eNB 802 may control the total amount of uplink resources a WTRU 801 is allocated. The WTRU 801 may not over-mark packets as being an IDR frame in an attempt to get more resources in uplink scheduling, for example, since the eNB 802 controls the total amount of uplink resources a WTRU is allocated.

An IDR frame may be included as payload of the packets in an IP flow. Packets which carry an IDR frame or which come after an IDR frame may carry an indicator which may cause a priority indicator value (e.g., FPI value) associated with the IP flow to be reset to a default value. The default value may be an original priority indicator value of the IP flow before network congestion is determined. A node may be configured to use the indicator of the IDR frame to reset the priority indicator value to a default value. For example, the node may be triggered by an IDR frame to reset the priority indicator value (e.g., to a default or original priority indicator value) of the IP packets that are positioned after the IDR frame. A video sender may indicate the IDR frame (e.g., or other important video frames) to the network by setting certain fields in the IP packet header. A node may be configured to set certain fields in an IP header. The network may translate the setting to the packets of other layers of the protocol stack, for example, the GTP-U layer whose packets may carry the priority indicator value.

The node may adjust the priority indicator value of one or more IP packets of an IP flow, for example, if network congestion is determined (e.g., inferred). The node may adjust the priority indicator value for IP packets that may be positioned before an IDR frame. One or more IP packets that may be positioned after the IDR frame may have a different priority indicator value. For example, the priority indicator value of the IP packets that may be positioned before the IDR frame may indicate a lower priority than the IP packets that are positioned after the IDR frame.

The correlation between an IDR frame and a priority indicator value may be extended to other video codecs. For example, an intra-frame in MPEG-2, MPEG-4, or the like may be used in a manner similar to the IDR frame.

A WTRU may include the priority indicator information for packets in the uplink buffer, for example, when the WTRU reports the buffer status via the BSR message. The priority indicator information may include how many of the packets there are for a priority indicator value. The WTRU may not trigger a BSR report for data associated to a priority below a threshold, for example, if the WTRU's buffer includes data at or below the threshold. For example, the WTRU may drop one or more packets. The WTRU may include a BSR in a subsequent transmission. For example, the WTRU may trigger a normal BSR without performing a SR and/or the WTRU may include a padding BSR. The eNB may not allocate resources to the WTRU, for example, if congestion occurs, such as when a packet waiting in the buffer is a low priority packet.

The video sender may provide video importance information. The video importance information may be included in the IP packet header, for example, so that the video importance information is accessible by the routers. The DSCP field and/or the IP packet extension field may be used (e.g., for IPv4).

One or more bits (e.g., the first six bits) of the Traffic Class field may serve as the DSCP indicator (e.g., for IPv6). An extension header may carry video importance information (e.g., for IPv6).

Packet mapping may be performed by table lookup. For example, a WTRU may build a table that maps the IP packet to the transport blocks.

A node may be configured to utilize Quality of Experience (QoE) for video telephony, such as real-time video applications and/or videoconferencing. Quality of Experience (QoE) may be designed and/or optimized for video telephony, such as real-time video applications and/or video-conferencing. Packet losses may be concentrated to a fraction (e.g., a small fraction of traffic flows in the event of network congestion) of real-time video traffic flows. For example, packet losses may be concentrated to a small fraction of traffic flows of real-time video traffic flows, in the event of network congestion. When a packet gets lost in a real-time video traffic flow, for example, with a successive temporal prediction video coding structure, the performance degradation due to additional packet losses (e.g., in the successive temporal prediction video coding structure) may be significantly less than that due to the first packet loss. A successive temporal prediction video coding structure may be an IPPP structure, or a Hierarchical P video coding structure, such as temporal layer 0 in Hierarchical P, etc. The overall QoE of multiple real-time video traffic flows may be optimized, for example, due to the performance degradation of additional packet losses being significantly less than that due to the first packet loss when a packet gets lost in a real-time video traffic flow with a successive temporal prediction video coding structure.

Optimizing the overall QoE of multiple real-time video traffic flows may address buffer-bloat. Buffer-bloat may be characterized by the proliferation of buffers and inflation of buffer sizes due to the availability of cheap memory and/or the increase in Internet traffic, such as increasing video telephony traffic. In buffer-bloat, buffer space may be so large that buffer overflow induced packet loss is rare and buffer occupancy is persistently large due to the explosion of Internet traffic. The occurrence of persistently full buffers may lead to increased queuing delays experienced by data packets transmitted over wireless networks.

Active queue management (AQM) may be used to address buffer-bloat. For example, AQM algorithms may be utilized to compute transmission control protocol (TCP) data packet sojourn time in a queue. A node may be configured to decide whether to keep or drop the data packet based on the computer transmission control protocol data packet sojourn time in a queue. AQM algorithms may inadequately address user datagram protocol (UDP) data packet flow generated by video telephony applications (e.g., video conferencing applications such as Skype, FaceTime, Google+ Hangout, and/or the like). AQM algorithms may inadequately provide the user of video conference applications with a sufficient Quality of Experience (QoE) due to, for example, the freezing of frames upon detecting a packet loss which occurred despite employing the AQM algorithms.

Loss concentration type of queue management may be induced when there may be multiple routers on the path of a real-time video traffic flow. Loss concentration type of queue management may be induced when there may be multiple paths between the source and destination of a real-time video traffic flow. For example, in an IP packet header, a first bit may be used to indicate to the downstream routers that a flow has experienced a packet loss. A second bit may, for example, be used to indicate to the downstream routers that video error propagation has been stopped by insertion of I frames or reference picture selection (RPS). A second bit may, for example, be used to indicate to the downstream routers that a video encoder has taken action to stop error propagation since the router received feedback on packet loss. A third bit may be used to indicate whether a packet carries an intra-coded video frame or P-frames that may impact QoE. Packet headers other than IP headers, extended packet headers, labels as and information elements (IEs) may be utilized to realize loss concentration.

Loss concentration may be partially implemented, such as where a router may not support use of an IP Option field and other signaling may allow for loss concentration. An individual router may be configured to implement loss concentration based on preservations and/or measurements performed at the router. Such techniques may allow an individual router to perform loss concentration autonomously, even in the absence of loss congestion signaling received from other routers and/or the video encoding device (e.g., in the IP or other packet headers).

A node may utilize loss concentration controlled delay (LC-Codel) to provide the maximum number of users of video conference applications with an acceptable Quality of Experience (QoE). For example, a node may utilize loss concentration controlled delay (LC-Codel) to provide the maximum number of users of video conference applications with an acceptable QoE by concentrating losses in subset of the users' video streams. LC-Codel may provide the ability to handle a mixture of TCP and real-time video flows. For example, a node utilizing LC-Codel may treat TCP flows differently from video flows. The node utilizing LC-Codel may consider the sojourn time of the de-queued packet in determining whether or to drop a packet, such as for TCP flows. The node utilizing LC-Codel may enforce loss concentration, such as for video flows. The node utilizing LC-Codel may enforce loss concentration, for example, by considering the priority of the flow to which the video packet belongs. The node utilizing LC-Codel may enforce loss concentration, for example, by considering the queuing delay created due to video flows in dropping the packet. The node utilizing LC-Codel may provide that video packets that may be dropped before enqueuing. The node utilizing LC-Codel may provide that video packets that may be dropped after dequeuing.

Packet losses may be detected at a router other than the router that caused the packet losses. This packet loss detection may be referred to herein as an open-loop solution.

One or more embodiments described herein may be applicable to packet switching devices, which may include, but are not limited to, general routers and special routers, such as, but not limited to, wireless transmit/receive units (WTRUs), a base station (e.g., eNB, Remote Radio Head, relays Stations, Femto eNBs, Pico eNB, and the like), S-GW, and/or P-GW, and video codecs.

Routers may be configured to carry real-time video traffic flows. Routers may be configured to cooperate and/or to optimize the overall Quality of Experience (QoE) of the real-time video traffic flow.

Figure 9:
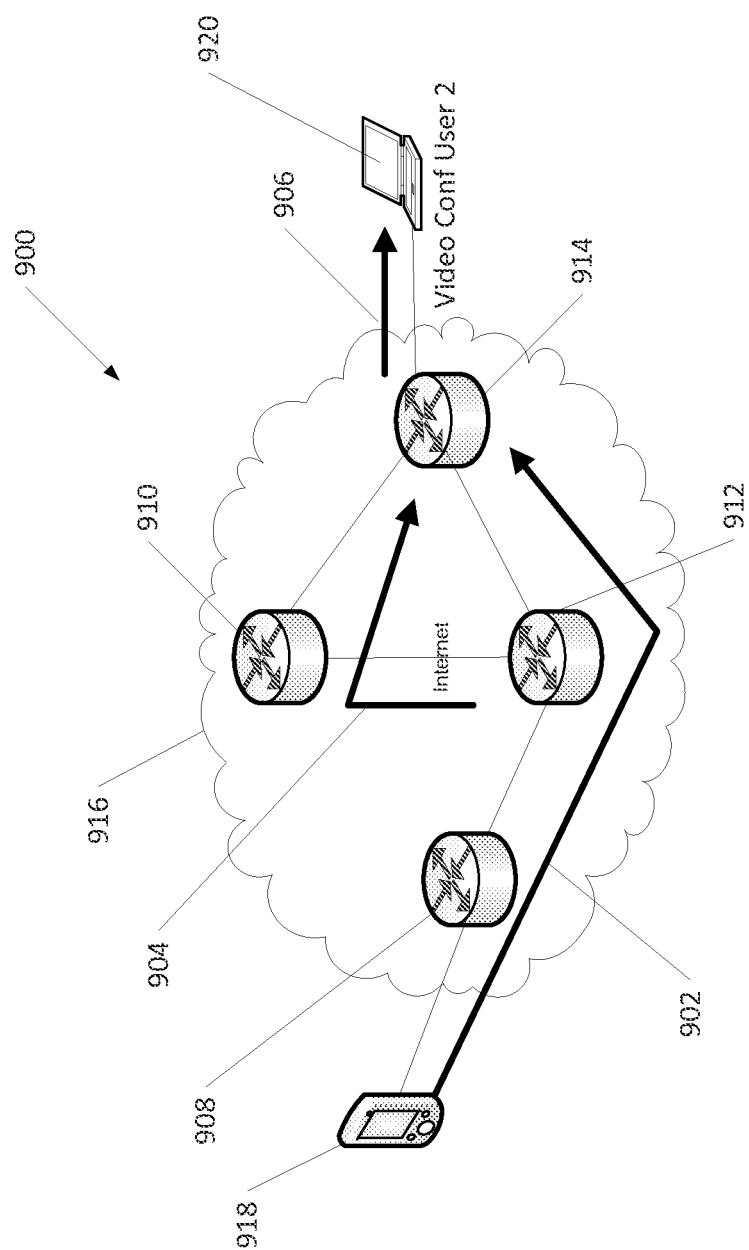
FIG. 9 is a diagram illustrating an example videoconferencing system.

FIG. 9 illustrates an example video conferencing system 900. The videoconferencing system 900 may communicate real-time video traffic. The real-time video traffic may adopt a successive temporal prediction video coding structure, such as the IPPP structure or a Hierarchical P video coding structure (e.g., temporal layer 0).

For purposes of clarity and ease of description, a single video teleconferencing session is illustrated in FIG. 9. The videoconferencing system 900 may support multiple video teleconferencing sessions that may occur simultaneously.

The video teleconferencing session illustrated in FIG. 9 may utilize multiple paths 902, 904, 906. Each path may comprise one or more routers 908, 910, 912, 914. The one or more routers 908, 910, 912, 914 may be connected to one another via a network 916, such as the Internet. Client devices, such as a WTRU 918 and a computer 920, may also be connected to the network 916.

Figure 10:
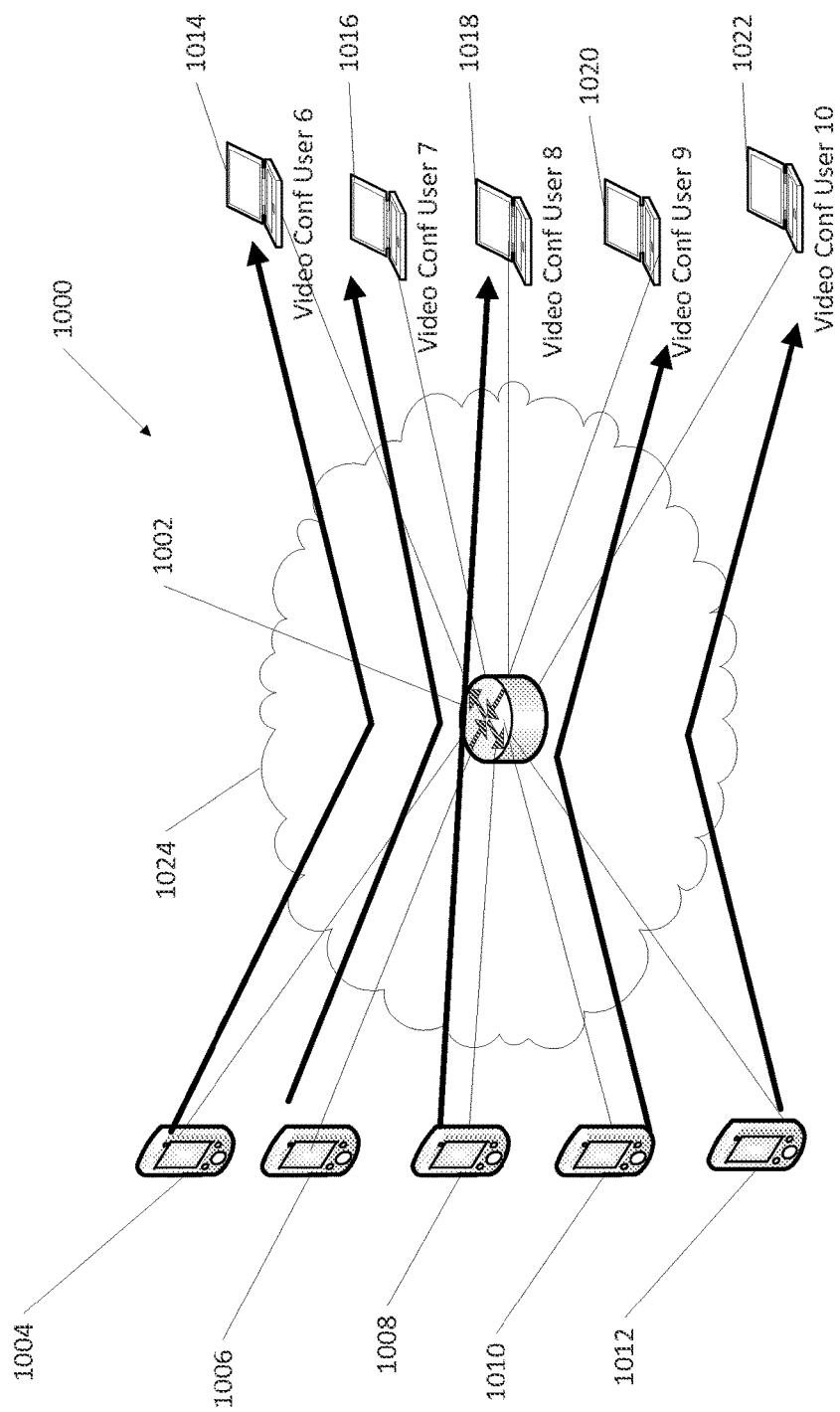
FIG. 10 is a diagram illustrating an example videoconferencing network.

FIG. 10 illustrates an example of how a videoconferencing system 1000 may appear from the perspective of a particular router 1002. The videoconferencing system 1000 may comprise additional routers that are not depicted in FIG. 10. The router 1002 may be connected to such additional routers. The router 1002 may be connected to client devices, such as WTRUs 1004, 1006, 1008, 1010, 1012 and computers 1014, 1016, 1018, 1020, 1022. The router 1002 may be connected to client devices via a network 1024, such as the Internet.

The impact of losing a packet on the quality of the recovered video may depend on the packet, on what happened to the previous packets, and/or what may happen to the future packets. A state variable may be maintained for a traffic flow of multiple real-time traffic flows, such as to optimize the QoE of the traffic flows. For example, a state variables may be maintained for each traffic flow. The video encoder may send video frames, (e.g., specialized video frames), for example, in packet loss adaptation. The video encoder may be configured to indicate to the routers for prioritized treatment of frames when sending video frames and/or specialized video frames.

A router may be configured to maintain one or more state variables for each video traffic flow. State variables for a particular video traffic flow may indicate the network events that may have occurred relative to that video traffic flow. The network events may include packet loss, excessive delay, etc. The routers may be configured to exchange information among other routers. The routers may be configured to exchange information among other routers to keep the state information consistent across routers involved. The video sender may react to network events by taking appropriate action. For example, the video sender may generate an intra-coded frame, such as in the event of packet loss. The video sender may perform reference picture selection (RPS). The video encoder may indicate the key packets conveying the event of having taken appropriate actions in response to the network event.

Performance degradation due to additional packet losses may be significantly less than performance degradation due to the first packet loss, for example, when a packet gets lost in a real-time video traffic flow, such as when the impact of packet losses on real-time video quality may be exploited. The overall QoE of multiple real-time video traffic flows may be optimized, for example when performance degradation due to additional packet losses may be significantly less than performance degradation due to the first packet loss. For example, when a video traffic flow suffers from packet losses, a router may be configured to attempt to confine future packet losses to the flow and employ a loss concentration based queue management scheme. The router may confine future packet losses to that flow. The router may avoid degrading the QoE of other flows, resulting in high QoE for the other flows.

The router may select a real-time video traffic flow that has not experienced any packet losses to drop packets, such as in the event of network congestion. The router may select at random a video traffic flow to drop packets. The router may select a video traffic flow to drop packets according to one or more rules or policies. The rules or policies may be designed to enforce certain fairness criteria. For example, the router may drop packets of a real-time video traffic flow with excessively high data rate.

A router may be configured to select a degraded video stream for dropping packets before a non-degraded video stream. A degraded packet stream may refer to a real-time video traffic flow comprising a dropped packet. For example, a degraded packet stream may be a real-time traffic flow that comprises a dropped packet preceding a refresh packet, wherein the dropped packet comprises a P-frame and the refresh packet comprises an I-frame. The router may be configured to place a priority on selecting a video traffic flow that has already experienced packet losses for dropping packets, such as to select a degraded video stream for dropping packets before a non-degraded video stream. The router using the prioritization may be configured to exploit the potentially lower QoE degradation due to additional packet losses after an initial packet loss.

Figure 11A:
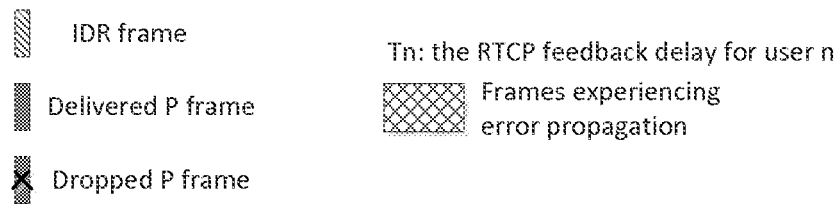
FIG. 11A is a diagram illustrating an example of loss concentration based packet dropping scheme.
Figure 11A:
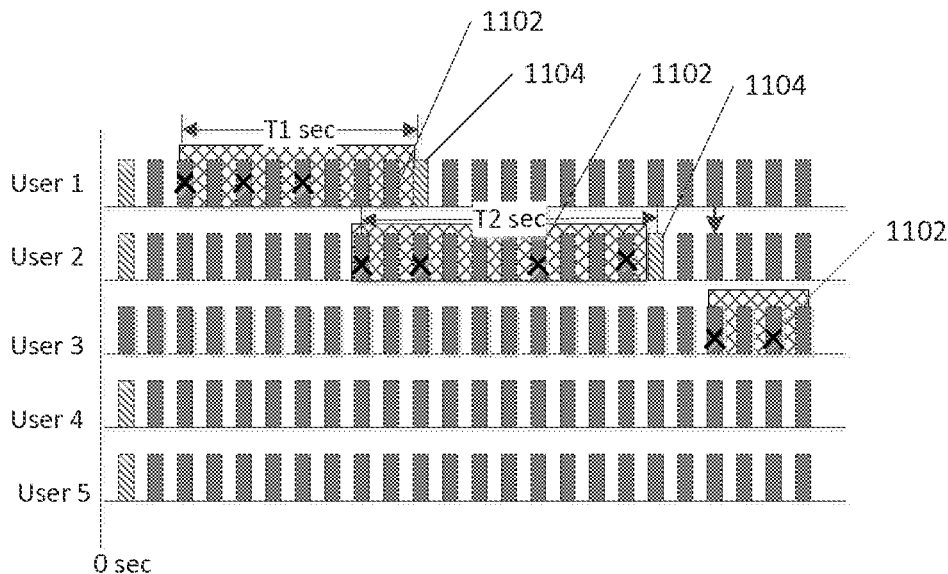
Figure 11B:
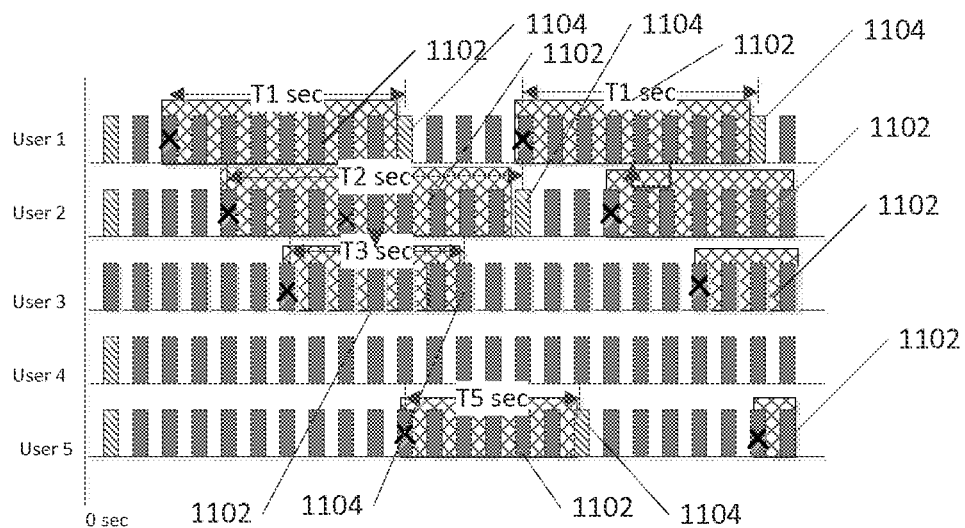
FIG. 11B is a diagram illustrating an example where packets are dropped at random.

FIG. 11A is a diagram illustrating an example of a loss concentration based packet dropping scheme. FIG. 11B is a diagram illustrating an example where packets are dropped at random. In both FIGS. 11A and 11B, frames (e.g., frame ranges) that may experience error propagation are indicated by reference numeral 1102. Instantaneous Decoder Refresh (IDR) frames 1104 may be used to stop error propagation. The number of packets dropped are the same for the loss concentration based packet dropping scheme and the random packet dropping scheme. With a loss concentration based packet dropping scheme, the total fraction of time of error propagation among users may be significantly reduced.

Loss concentration based queue packet dropping may cause a reduction in traffic loading to the system. For example, a router may use IDR frames to stop error propagation and fewer IDR frames may be generated.

A router may identify real-time video traffic flows, such as in loss concentration based queue management. For example, a router may identify real-time video traffic flows via the use of the IP 5-tuples. IP 5-tuples may comprise IP source address. IP destination address. IP source port number, IP destination number, and/or protocol type.

A number of bits, (e.g., three bits, such as bit a, bit b, and bit c), may be defined in the IP packet header. For example, the bits may be defined in the extension field of the IP packet header. The bits may be mapped to the ECN field or the DSCP field in the IP packet header. The number of bits may be defined in other types of packet headers, extension fields of a packet header, label or information element (IE). The number of bits may vary depending upon the available bit space.

A first bit a may be defined as a congestion indicator. A router may control a first bit a. The first bit a may convey information comprising whether the traffic flow has experienced packet losses. As such, the bit a may be an example of a lost packet indicator. For example, bit a may convey a value of 1 that may indicate that the traffic flow has experienced packet losses. Bit a may convey a value of 0 that may indicate that the traffic flow has not experienced packet losses. Bit a may convey information as to whether the flow experienced packet loss since the last setting of bit b. Bit a may convey information as to whether the flow experienced packet loss since the flow was first established.

A bit b may convey information comprising whether the video encoding adaptation has been performed. The video encoding adaptation may comprise generation of an IDR frame, or slice of a frame, Reference Picture Selection (RPS), etc. For example, a bit b may convey a value of 1 that may indicate that the video encoding adaptation has been performed. A bit h may convey a value of value of 0 that may indicate that the video encoding adaptation has not been performed. A bit b may convey information as to whether error-propagation mitigation has been performed. Error-propagation mitigation may comprise generation of an intra-coded slice of a frame, and/or generation of a line of intra-coded macro blocks in cyclic intra-refresh.

A bit c may convey information as to whether the packet carries an important frame or an important portion of the frame. An important frame or an important portion of the frame may comprise an IDR frame, a P frame with significant impact on error propagation, a P frame with potential to significantly impact quality of experience (QoE), an intra-coded slice of a frame, and/or a line of intra-coded macro blocks in cyclic intra-refresh. For example, a bit c may convey a value of 1 that may indicate that the packet does carry an important frame or an important portion of a frame. A bit c may convey a value of 0 that may indicate that the packet does not carry an important frame or an important portion of a frame.

A router (e.g., each router) may be configured to maintain a state variable State_k for each flow k. A router may be configured to set and/or read the bits. A router may be configured to update the state variable State_k, such as a local state variable State_k maintained by the router. A router may comprise a router on the Internet, a base station in a cellular network, a WiFi access point, and/or an S-GW and/or P-GW in an LTE/EPC network, etc. The router may perform one or more of a number of actions. The router may be configured to decide whether or not to drop a packet (e.g., packet n) based on a lost packet indicator associated with the packet. For example, the router may be configured to decide whether or not to drop the packet n if the bit a conveys a value 0, (e.g., possibly indicating that the traffic flow has not experienced packet losses), for an incoming packet n belonging to a flow k. If a router decides to drop the packet n, the router may be configured to set the state variable State_k to a value of LOSS.

A router may be configured to determine whether the video encoding adaptation has been performed on a traffic flow. For example, if bit b indicates that a video encoding adaptation has been performed, the router may be configured to set the state variable State_k to a value of NO_LOSS and the router may route packet n. If the state variable State_k has a value of LOSS, the router may be configured to set the value of the bit a to 1, such as to indicate that the traffic flow has experienced a packet loss, and the router may be configured to route the packet n. A timer may be set to make sure that the state variable State_k is not set to LOSS for more than the set value. A router may be configured to set the timer. If the value of the bit a is 1 for the incoming packet n, the router may be configured to set state variable State_k to a value of LOSS, and the router may route packet n.

For example:

```
if a = 0 in an incoming packet n belonging to flow k
    if decision is to drop packet n
        State_k = LOSS
    else if b = 1 or c=1
        State _k = NO_LOSS
        route packet n
        cancel timer T loss fb k
    else if State_k = LOSS
        set a = 1 in packet n and route it
        start timer T_loss_fb_k
    else
        route packet n
    end
else // a = 1 in an incoming packet n
    State_k = LOSS
    route packet n
end
```

A router may be configured to handle an upstream packet carrying a bit b=1 that may get lost. The router may perform one or more of a number of actions. The router may be configured to set the state variable State_k to a value of NO_LOSS when a timer expires. For example:

```
if T_loss_fb_k expires
    State_k = NO_LOSS
end
```

The value for T_loss_fb_k may be slightly greater than the packet loss feedback delay if the packet loss feedback is employed. Packet loss feedback delay may be the delay of an RTT, e.g., RTT_k for flow k, plus the processing delay at the video receiver, plus the processing delay at the video sender, and/or the like. The processing delay at the video receiver may be for generating the RTCP packet loss report and transmitting the report. The processing delay at the video sender may be for generating an IDR frame and sending a packet carrying bit b=1. To estimate RTT_k, the router may timestamp certain packets. The router may deduce RTT_k. For example, the router may timestamp the SIP INVITE message, resulting in a timestamp $t_{k,1}$. The router may generate another timestamp $t_{k,2}$, for example, when the first data packet passes through the router. The time difference $t_{k,2}-t_{k,1}$ may be used as an estimate for RTT_k plus the processing delays. T_loss_fb_k may be set equal to $2*(t_{k,2}-t_{k,1})$.

A router in the communication network may conduct deep packet inspection in parallel for RTCP packets going in the opposite direction. A router in the communication network may conduct deep packet inspection in parallel for RTCP packets going in the opposite direction. A group of routers in the communication network may conduct deep packet inspection in parallel for RTCP packets going in the opposite direction. A router may be configured to use deep packet inspection to trigger video encoding adaption, for example, if an RTCP packet for flow k is detected. If a router detects a trigger for video encoding adaption, the router may be configured to employ a timer. For example:

```
if RTCP packet for flow k detected trigger video encoding adaptation
    set a timer T_loss_adapt_k
        when T_loss_adapt_k expires, set State_k=NO_LOSS
end
```

The router may configure the value for T_loss_adapt_k to be equal to the time difference between an event of detecting the RTCP packet for flow k and an event of the first video frame related to flow k arriving at the downstream router as a result of the video adaptation. This time difference may be anywhere between a minimum delay and one RTT_k. The time difference may depend on the relative location of the router on the media path video flow k. A router may use the value of RTT_k for T_loss_adapt_k. A router may use constant delay for T_loss_adapt_k (e.g., a value greater or less than 300 ms).

The router may be configured to cancel timer T_loss_fb_k, for example, if the video encoding adaptation or error-propagation mitigation occurs (e.g., bit b=1 in the incoming packet). The router may be configured to cancel timer T_loss_fb_k, for example, if a packet carrying an important frame or an important portion of a frame arrives (e.g., bit c=1 in the incoming packet) before the feedback delay.

A router may be configured to use deep packet inspection to allow upstream routers to know if packet loss has occurred to a specific video flow or multiple video flows.

A router may make flow k low priority in queue management. The router may make flow k low priority in queue management, for example, if the state variable State_k has a value of LOSS. For example, the router may concentrate the packet losses to flow k.

A router may be configured to use various design criteria in deciding which video traffic flow may have a packet dropped. For example, a router may set a maximum duration of time $T_{max}$ for a flow that may have concentrated packet losses, for example, to offer fairness to video traffic flows. The value of $T_{max}$ may be greater than T_loss_fb_k. The router may set a maximum duration of time by maintaining a state variable $T_{loss\_k}$ for a flow k that has suffered packet losses. If $T_{loss\_k}$ is greater than or equal to $T_{max}$, a router may stop concentrating packet losses to flow k and the router may select a different flow j for receiving concentrated packet losses. The router may select flow j, which may be different from flow k, on a round robin basis.

An example of a video sender may be a WTRU that is connected to the Internet. The video sender may perform a number of actions, such as setting the bit a to a value of 0 for outgoing packets. If the video sender receives an indication of prior packet loss, the video sender may trigger a video encoding adaptation. The video encoding adaptation may include, for example, generating an IDR frame, a Reference Picture Selection update, and/or reducing the bit rate of encoded video. The video sender may be configured to start a timer. The video sender may set the bit b to a value of 1 for the next packets the video sender may send before the timer expires. The video sender may set the bit c to a value of 1 for packets that may carry an IDR frame. When the timer expires, the video sender may set the bit b to a value of 0 for subsequent packets. The video sender may be configured to receive an indication of packet loss. The video sender may observe the packet loss rate for the opposite direction. The opposite direction may be the same direction of the packet loss report. A low packet loss rate observed for the opposite direction is low may indicate that the network capacity is higher than the video sending rate. If the video sender has not received an indication of a packet loss for an extended period of time and the packet loss rate observed for the opposite direction is low, a video sender may perform a video encoding adaptation. For example, the video sender may increase the bit rate of the encoded video.

A video sender may conduct video encoding adaptation. For example, a video sender may perform the following:

```
set a = 0 for outgoing packets
if sender receives an RTCP packet indicating prior packet loss
    trigger video encoding adaptation (e.g., generation of an IDR frame,
    Reference Picture Selection update, and/or reduce the bit rate of encoded
    video)
        start a timer T
        set b = 1 in the next packets to be sent before the timer expires
        set c = 1 for packets among the next packets above that carry the IDR
    frame
        after the timer expires, set b = 0 for the next packets
else if sender has not received an RTCP packet indicating a prior packet
loss for a period of time T_good and the packet loss rate in the opposite
direction is low, do some video encoding adaptation (e.g., increase the bit
rate of the encoded video)
end
```

The video sender may be configured to perform error-propagation mitigation. Error-propagation mitigation may comprise the generation of an intra-coded slice of a frame or the generation of a line of intra-coded macro blocks m cyclic intra-refresh. For example, the video sender may perform the following:

```
set a = 0 for outgoing packets
if sender performs error-propagation mitigation /* generation of an IDR frame, Reference
Picture Selection update, reduce the bit rate of encoded video*/
    start a timer T
    set b = 1 in the next packets to be sent before the timer expires
    set c = 1 for packets among the next packets above that carry an important frame
    or an important portion of a frame
    after the timer expires, set b = 0 for the next packets
end
```

$T_{good}$ may be a period of time in which the capacity of the path from the video sender to the receiver is good. If the packet loss rate in the opposite direction is low, then the video sender may send a loss report in the opposite direction. The loss report may indicate that the packet is unlikely to be dropped on its way to the video sender.

The video receiver may send an RTCP packet loss report to the video sender, for example, if a gap in the RTP sequence number is detected. The RTCP packet loss report may, for example, be a picture loss indication (PLI) packet or slice loss indication (SLI) packet. For example:

---
if a gap in the RTP sequence number is detected
    send an RTCP packet loss report back to the video sender
end
---

The video receiver may send the RTCP packet back to the video sender, for example, if the amount of RTCP traffic does not exceed a predetermined fraction of the total amount of traffic in the communication network.

Figure 12:
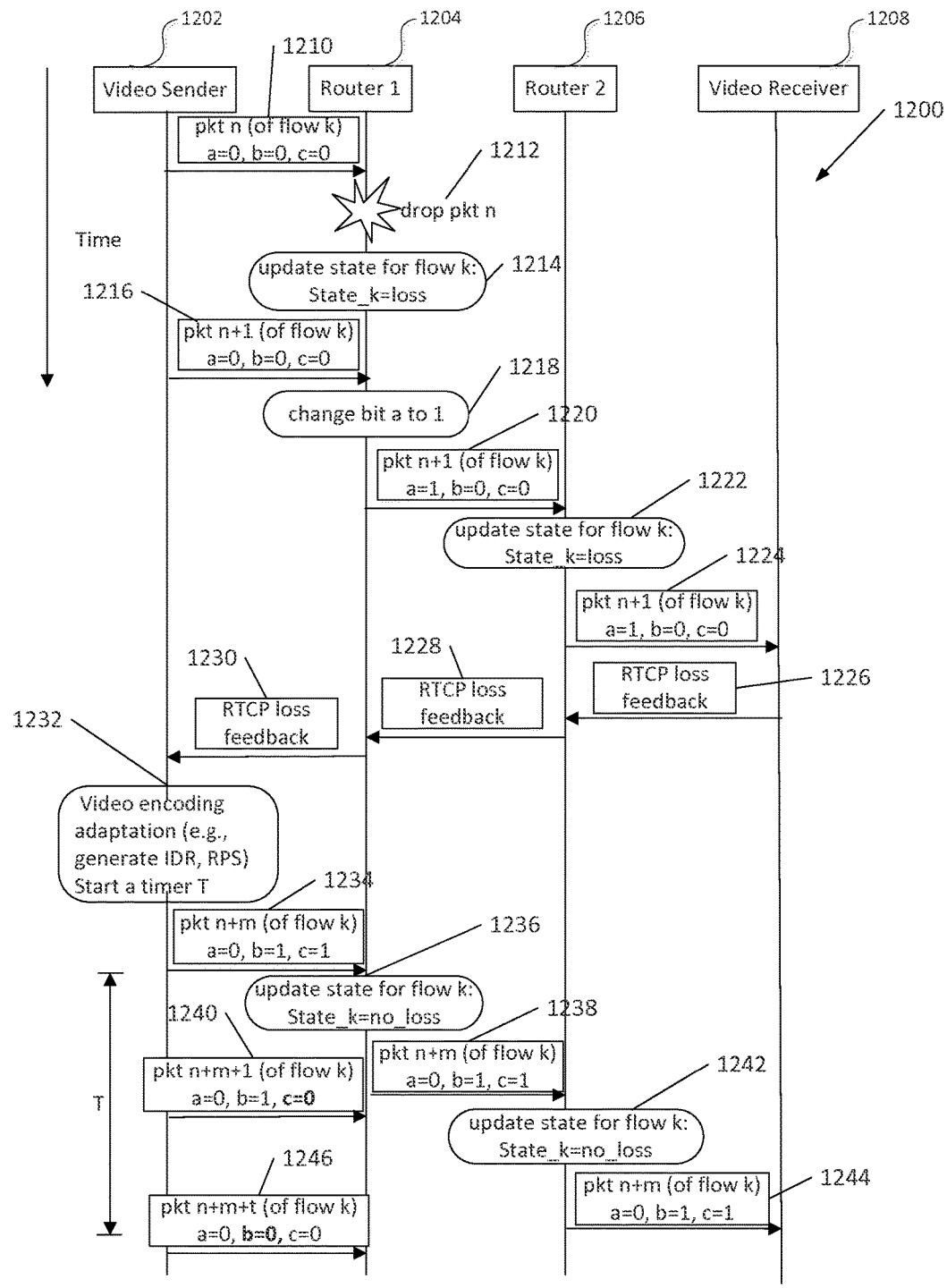
FIG. 12 is a diagram illustrating an example call flow for loss concentration based queue management.

FIG. 12 is a diagram illustrating an example call flow for nodes, such as video sender, routers, and a video receiver implementing loss concentration based queue management for real-time video applications, such as video teleconferencing. A node may comprise a processor configured to receive a first real-time video traffic flow. A state variable may be associated with the first real-time video traffic flow at the node. The first real-time video traffic flow may comprise a plurality of packets. Each packet may comprise a lost packet indicator (e.g., the bit a). For example, at 1210, the video sender 1202 may send a packet n of flow k to the router 1204, and the a, b, and c bits may have values of 0.

A node may be configured to drop a first packet in the first real-time video traffic flow. A node may be configured to update the state variable associated with the first real-time video traffic flow at the node to indicate the dropped packet. For example, at 1212, the router 1204 may drop packet n. A node may be configured to update the lost packet indicator for a second packet in the first real-time video traffic flow based on the dropped packet. For example, the router 1204 may update the state for flow k at 1214, such that State_k may have a value of LOSS. At 1216, the video sender 1202 may send a packet n+1 of flow k to the router 1204. The a, b, and c bits may have values of 0. The video sender 1202 may be unaware that the packet n was dropped. At 1218, the router 1204 may change the value of the a bit to 1 to indicate that the packet n was dropped at 1212.

A node may be configured to receive a second real-time video traffic flow. A state variable may be associated with the second real-time video traffic flow at the node. The second real-time video traffic flow may comprise a plurality of packets and each packet may comprise a lost packet indicator. A node may comprise a processor configured to compare the state variable of the first real-time video traffic flow with the state variable of the second real-time video traffic flow. The state variable of the second real-time video traffic flow may not indicate a dropped packet. The node may be configured to determine to drop a packet of the first real-time traffic flow (e.g., as opposed to dropping a packet of the second real-time traffic flow) based on the state variable of the first real-time video traffic flow indicating the dropped packet.

A node may comprise a processor configured to determine that a third packet of the first real-time video traffic flow comprises a refresh frame. The node may comprise a processor configured to update the state variable associated with the first real-time video traffic flow at the node based on determining the third packet of the first real-time video traffic flow comprises a refresh frame. The node may comprise a processor configured to update the lost packet indicator for the third packet of the first real-time video traffic flow based on determining the third packet of the first real-time video traffic flow comprises a refresh frame. The node may comprise a processor configured to determine that the third packet of the first real-time video traffic flow comprises a refresh frame comprises the processor configured to determine a bit in a packet header of the third packet indicates that the third packet comprises a refresh frame and determine that the third packet of the first real-time video traffic flow comprises a refresh frame. The refresh frame may comprise a partial refresh frame. The third packet may comprise an I-frame.

The node may comprise a processor configured to send the second packet of the first real-time video traffic flow to a second node. For example, at 1220, the b and c bits may have values of 0 and the a bit may have a value of 1 when the packet n+1 is sent from the router 1204 to the router 1206. The router 1206 may update the state for flow k at 1222, such that State_k may have a value of LOSS.

The node may be configured to use the state variable to concentrate packet losses on a degraded packet stream. An FPI may comprise a lost packet indicator.

The first packet of the first real-time video traffic slow may comprise a P-frame. The second packet of the first real-time video traffic slow may comprise a P-frame.

The node may comprise a processor configured to update the lost packet indicator for the second packet in the real-time video traffic flow based on the dropped packet and the determination that the second packet does not comprise a refresh frame. The lost packet indicator may comprise a bit in a packet header of the packet. For example, the lost packet indicator may instruct the second node to update a state variable associated with the first real-time video traffic flow at the second node. For example, at 1224, the router 1206 may send the packet n+1 of flow k to the video receiver 1208. The b and c bits may have values of 0 and the a bit may have a value of 1. The video receiver 1208 may send RTP Control Protocol (RTCP) loss feedback to the router 1206 at 1226. The RTCP loss feedback may be sent to the router 1204 at 1228 and to the video sender 1202 at 1230. Video receiver 1208 may, for example, consider the congestion indicator bit (e.g., a=1) of the incoming packet n+1 when formulating RTCP loss feedback at 1226. The congestion indicator bit may allow the video receiver 1208 to infer that an earlier packet has been dropped rather than delayed in the network. When the video receiver 1208 infers that an earlier packet has been dropped rather than delayed in the network, the video receiver 1208 may generate the RTCP loss feedback at 1226, in response to the video receiver 1208 receiving an incoming packet with a=1. When the video receiver 1208 infers that an earlier packet has been dropped rather than delayed in the network, the video receiver 1208 may generate the RTCP loss feedback at 1226 and the video receiver 1208 may not wait for a timeout associated with the earlier packet to determine that the earlier packet had been lost.

At 1232, the video sender 1202 may perform a video encoding adaptation or adaptations. For example, the video sender 1202 may generate an IDR. The video sender 1202 may update RPS. The video sender 1202 may start a timer T.

At 1234, the video sender 1202 may send a packet n+m of flow k to the router 1204. The a bit may be reset to a value of 0, and the b and c bits may be set to a value of 1 to indicate that a video encoding adaptation has been performed and that the packet includes, for example, an IDR frame.

The router 1204 may update the state for flow k at 1236 based on the new value of the a bit, e.g., 0, such that State_k may have a value of NO_LOSS. At 1238, the router 1204 may send the packet n+m of flow k to the router 1206. When the packet n+m is sent from the router 1204 to the router 1206 at 1238, the b and c bits may have values of 1 and the a bit may have a value of 0.

At 1240, the video sender 1202 may send a packet n+m+1 of flow k to the router 1204. The a bit may have a value of 0. The b bit may have a value of 1 to indicate that a video encoding adaptation has been performed. The video encoding adaptation may be IDR insertion or RPS selection. The c bit may have a value of 0 to indicate that the packet n+m+1 may not include an IDR frame or a frame that might significantly impact QoE.

At 1242, the router 1206 may update the state for flow k based on the value of the a bit such that State_k may have a value of NO_LOSS. The router 1206 may send the packet n+m of flow k to the video receiver 1208 at 1244. The a bit may have a value of 0. The b bit may have a value of 1 to indicate that a video encoding adaptation has been performed. The c bit may have a value of 0 to indicate that the packet n+m+1 may not include an IDR frame.

At 1246, the video sender 1202 may send a packet n+m+T of flow k to the router 1204. As with the packet n+m+1, the a and c bits may have values of 0. Because a video encoding adaptation may not have been performed on the packet n+m+T, (e.g., a video encoding adaptation may not have been recently performed), the b bit may also have a value of 0. The c bit may be used to indicate an important P frame.

A node may comprise a processor configured to update the state variable based on a preconfigured set of conditions. The node may comprise a processor configured to select a condition from the prefigured set of conditions, compare the selected condition against a preconfigured threshold, determine if the selected condition exceeds the preconfigured threshold, and upon determining that the selected condition exceeds the preconfigured threshold, update the state variable. The node may comprise a processor configured to determine to drop the first packet of the first real-time video traffic flow according to a preconfigured set of rules.

The node may be a router, a WTRU, and/or an eNB.

Figure 13:
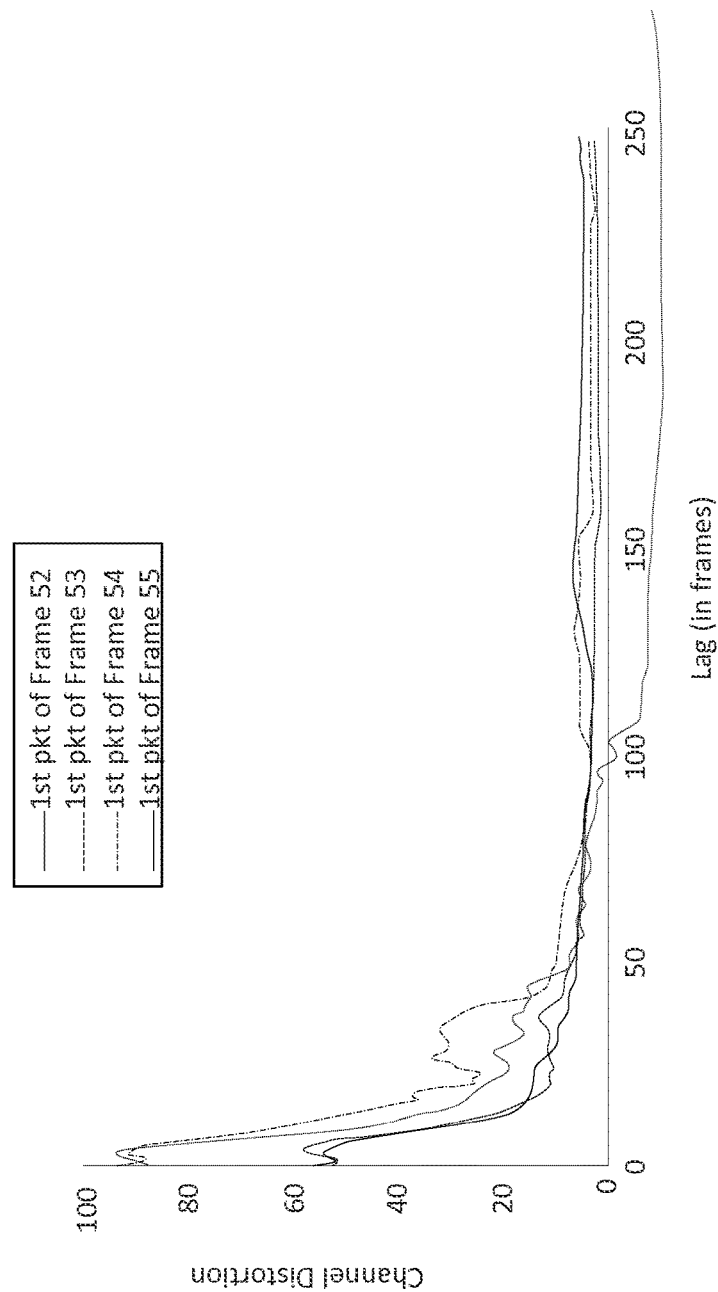
FIG. 13 is a graph illustrating an example effect of losing a video frame on a channel distortion of subsequent video frames.

FIG. 13 is a graph illustrating an example effect of losing a video frame on a channel distortion of subsequent video frames for an example IPPP video encoding structure. The effect of losing a video frame on a channel distortion of subsequent video frames may depend on the initial channel distortion and the rate of decay or time constant. The initial channel distortion may be on the lost frame itself. If the effect of losing a video frame on a channel distortion of subsequent video frames is above a certain threshold, the router (e.g., an eNB, an Access Point of a Wi-Fi network, a router in the core Internet) may set the c bit to have a value of 1. Otherwise, a router may set the c bit to have a value of 0.

An example router configuration as shown in FIG. 10 was simulated. The router may drop n packets at a time instant, for example, due to congestion. The router may confine the packet losses to a user or flow within a RTCP delay of P frames or distribute the packet losses to users or flows.

Figure 14:
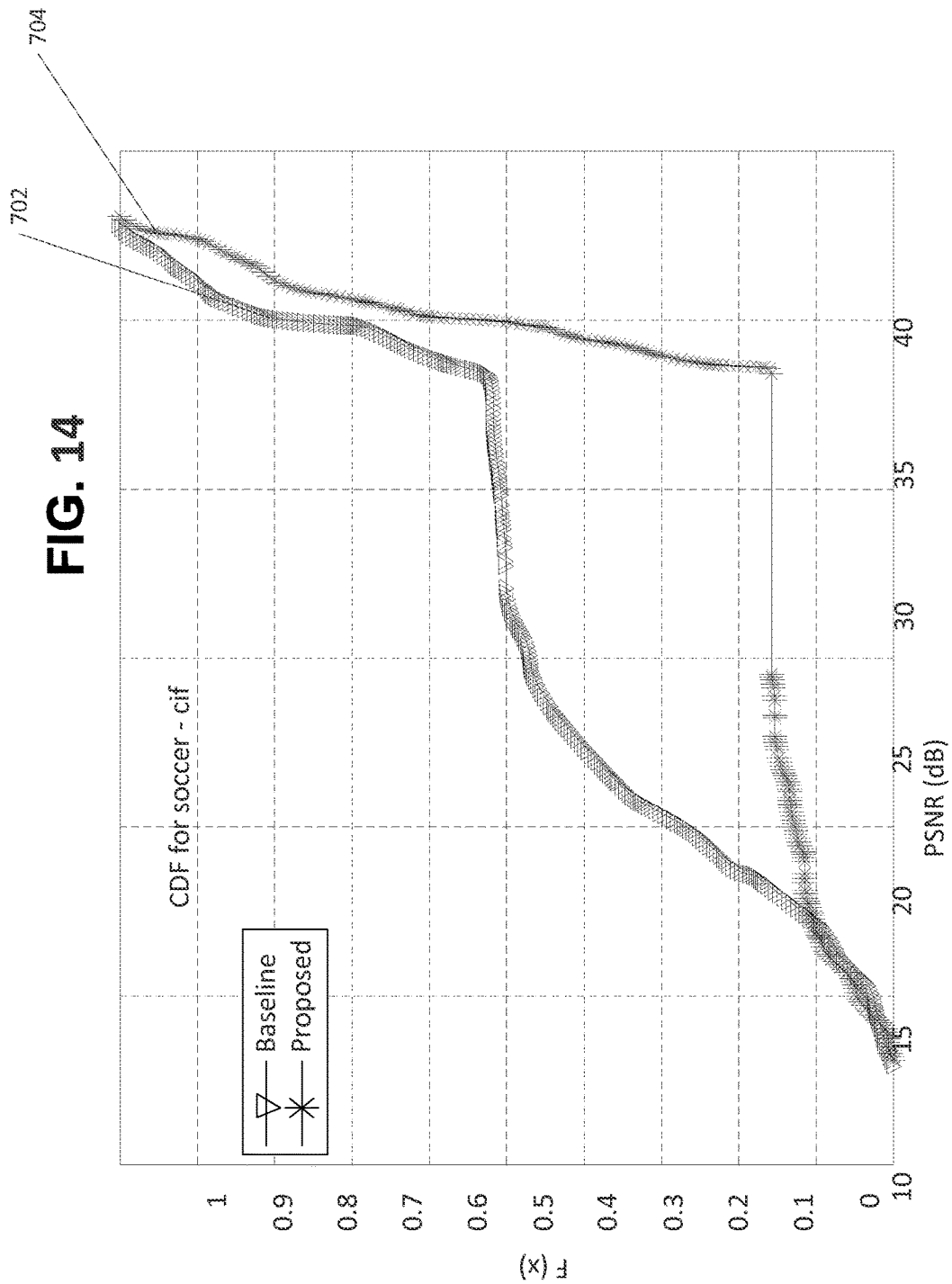
FIG. 14 is a graph illustrating an example cumulative distribution function (CDF) of a peak signal-to-noise ratio (PSNR) for an example sequence.
Figure 15:
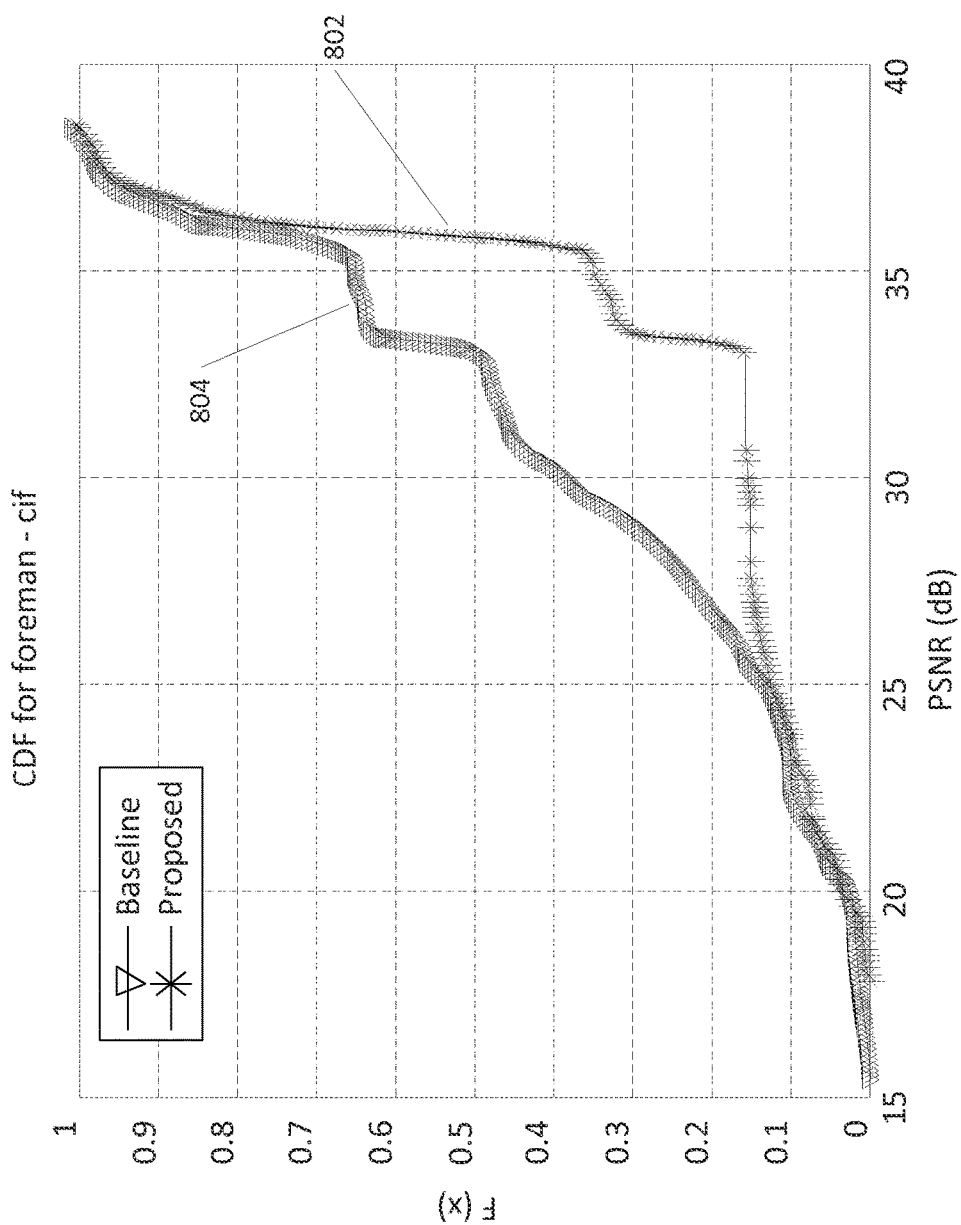
FIG. 15 is a graph illustrating an example cumulative distribution function (CDF) of a peak signal-to-noise ratio (PSNR) for another example sequence.

FIGS. 14 and 15 illustrate example cumulative distribution functions (CDFs) of peak signal-to-noise ratios (PSNRs) for two example video sequences for which the simulation of FIG. 10 was performed.

As depicted in FIGS. 14 and 15, the router dropped n=5 packets in a time instant and that there were N=5 flows. The curves 1402 and 1402 depict example simulated results of confining packet losses to a user or flow within a RTCP delay of P=30 frames. The curves 1404 and 1404 depict example simulated results of distributing packet losses to users or flows.

As illustrated in FIGS. 14 and 15, confining packet losses to a user or flow within a RTCP delay of P frames may produce better performance than distributing packet losses to users or flows. For example, the average PSNR improvement for the proposed scheme may be 5 dB for the video sequence, for example as depicted in FIG. 14, while it may be 2.3 dB for the video sequence, for example as depicted in FIG. 15.

The processes and instrumentalities described herein may apply in any combination, may apply to other wireless technology, and for other services (e.g., not limited for proximity services).

A node may comprise a processor configured to receive a first real-time video traffic flow. A state variable may associated with the first real-time video traffic flow at the node. The state variable may indicate packet loss. The node may comprise a processor configured to receive a second real-time video traffic flow, wherein a state variable is associated with the second real-time video traffic flow at the node, and wherein the state variable indicates no packet loss. The node may comprise a processor configured to determine to drop a packet of the first real-time video traffic flow or a packet of the second real-time video traffic flow. The node may comprise a processor configured to compare the state variable of the first real-time video traffic flow with the state variable of the second real-time video traffic flow. The node may comprise a processor configured to determine to drop the packet of the first real-time traffic flow based on the state variable of the first real-time video traffic flow indicating packet loss. The node may comprise a processor configured to mark the dropped packet of the first real-time video traffic flow to indicate the packet was dropped. A node may comprise a WTRU, a router, a eNB, a network entity or user equipment.

A WTRU, for example, may be configured to refer to an identity of the physical device. A WTRU may be configured to refer to the user's identity. The user's identity may comprise subscription related identities, such as MSISDN, SIP URI, etc. A WTRU may be configured to refer to application-based identities. Application-based identities may comprised user names that may be used per application.

A WTRU may be configured to add loss concentration to an active queue management (AQM) algorithm. The WTRU may be configured to produce an output and/or decision of the AQM algorithm. The output and/or decision of the AQM algorithm may be evaluated against the goal of loss concentration. The WTRU may be configured to evaluate the output and/or decision of the AQM against the goal of loss concentration. The evaluation may include, for example, an assessment on when a data packet may be dropped from the buffer. The WTRU may be configured to assess when a data packet may be dropped from the buffer.

Figure 16:
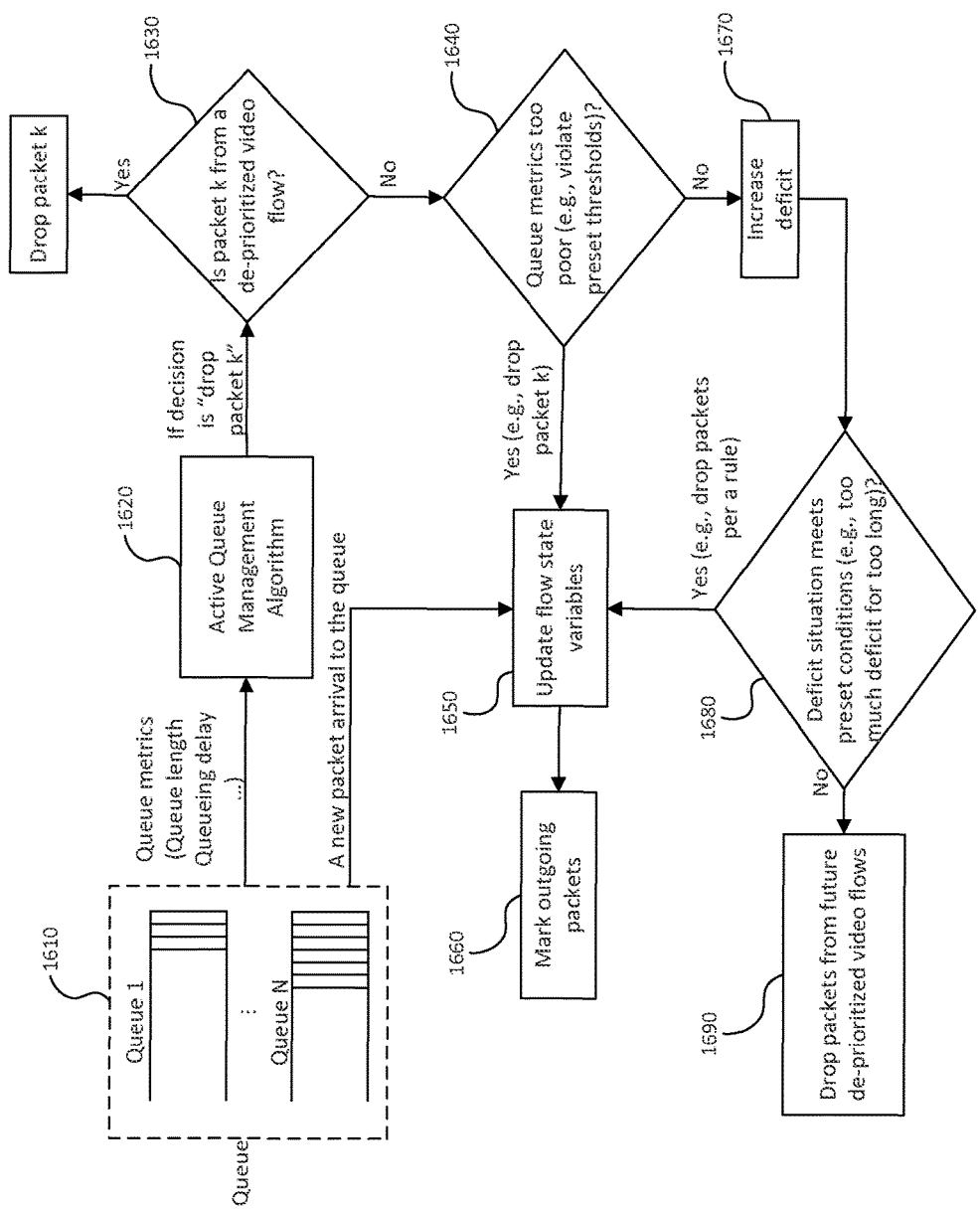
FIG. 16 is an example flow diagram illustrating adding loss concentration to an active queue management algorithm.

FIG. 16 is an example flow diagram illustrating adding loss concentration to an active queue management algorithm. In FIG. 16, a queue 1610 may consist of multiple smaller queues (e.g., Queue 1 . . . Queue N). Each queue may, for example, service particular types of packets with certain Quality of Service (QoS) requirements. For example, queue 1610 comprises multiple queues that may be implemented in one or more routers distributed throughout a wireless network. An active queue management (AQM) algorithm 1620 may be coupled to the output of the queue. A node may be configured to couple an AQM to the output of the queue. A node may be configured to couple loss concentration to the output of the AQM algorithm 1620, queue 1610, and/or the output of 1630/1640/1650/1660/1670/1680/1690. Loss concentration may include one or more combinations of the following: determining if a packet k is from a de-prioritized video flow 1630, determining if queue metrics exceed a predetermined criteria (e.g., exceed a pre-set threshold value) 1640, updating state variables 1650, marking outgoing packets 1660, increasing/incrementing a deficit value 1670, determining if a deficit situation meets a predetermined condition (e.g., too large a deficit for too long) 1680, and/or dropping packets from a future de-prioritized video flow 1690.

In FIG. 16, a node may be configured to feed queue metrics into the AQM algorithm 1620. Queue metrics may comprise queue length, queuing delay, etc. The AQM algorithm 1620 may receive the queue metrics. At 1620, the node may be configured to utilize an AQM algorithm to decide to drop a packet k. If packet k is dropped, the node may be configured to determine if packet k originated from a de-prioritized video flow at 1630. If the node determined packet k originated from a deprioritized video flow, the node may be configured to drop packet k. If the node determined that packet k did not originate from a deprioritized video flow, the node may be configured to determine whether queue metrics are too poor at 1940. Queue metrics may be too poor if the queue metrics violate preset thresholds. If the node determines the queue metrics are too poor at 1640, the node may be configured to drop packet k. If the node determines the queue metrics are too poor at 1640, the node may update the state variables at 1650. If the node determines the queue metrics are too poor at 1640 and the node updates the state variables at 1650, the node may mark outgoing packets at 1660. If the node determines the queue metrics are not too poor at 1640, the node may be configured to increase deficit at 1670.

If the node increases deficit, the node may be configured to determine if the deficit situation meets preset conditions at 1680. Preset conditions may include too much deficit for too long. If the node determines that the deficit situation meets preset conditions 1680, the node may be configured to drop packet k. If the node determines that the deficit situation meets preset conditions 1680, the node may update the state variables at 1650. If the node determines that the deficit situation meets preset conditions 1680 and the node updates the state variables at 1650, the node may mark outgoing packets at 1660. If the node determines that the deficit situation meets preset conditions 1680, the node may be configured to drop packets according to a set of rules. For example, the rule may be set up to drop real-time video packets that enter the queue regardless of whether the flows are de-prioritized. If the node determines that the deficit situation does not meet preset conditions at 1680, the node may be configured to drop packets from future de-prioritized video flows at 1690. If the deficit situation does not meet a predetermined condition and the node decides to drop future packets from de-prioritized real-time video flows, the deficit may be brought toward zero.

The queue 1610 may feed a new packet arrival to the queue at 1652. The node may be configured to update the flow variables of the new packet arrival to the queue at 1650. For example, the node may be configured to update the flow variables by way of the values of bits, bit a, bit b, bit c carried in the newly arrived packet. The node may be configured to mark outgoing packets at 1660 of the new packet arrivals to the queue. For example, the outgoing packets may be marked to indicate to a downstream router whether a flow has been de-prioritized. The a bit may be set to one to indicate to a downstream router that a flow has been de-prioritized.

A node may comprise a processor configured to receive a plurality of real-time video traffic flows. A state variable may be associated with each real-time video traffic flow at the node. Each real-time video traffic flow may comprise a plurality of packets. Each packet may comprise a lost packet indicator. The node may comprise a processor configured to determine that a lost packet indicator of a first packet of a real-time video traffic flow of the plurality of real-time video traffic flows indicates packet loss. The node may comprise a processor configured to update the state variable associated with the real-time video traffic flow at the node based on the lost packet indicator of the first packet to indicate packet loss. The node may comprise a processor configured to direct a subsequent packet loss to the real-time video traffic flow based on the state variable associated with the real-time video traffic flow indicating packet loss. The node may comprise a processor configured to determine that a third packet comprises a refresh frame. The node may comprise a processor configured to update the state variable based on determining that the third packet comprises a refresh frame. The node may comprise a processor configured to determine that the lost packet indicator of a second packet does not indicate packet loss.

Short-term loss concentration and congestion control may be utilized to handle unfairness. A node configured to utilize short-term loss concentration and congestion control may provide fairness in end-to-end congestion by marking real-time video packets or flows in accordance with an explicit congestion notification (ECN). A sender in such an ECN may be a sender of RTP packets carrying an encoded media stream. A sender may be capable of changing how the media transmission may be performed. For example, a sender may be capable of changing how the media transmission may be performed by varying the media coding or packetization. The sender may be one endpoint of an ECN control loop. An ECN receiver may be defined as a receiver of RTP packets with the intention to consume the media stream. The ECN receiver may send RTCP feedback on the received stream. The receiver may be the other endpoint of the ECN control loop. Senders and receivers of packets may, for example, be specific routers, groups of routers, the routers disposed in one or more communication networks, nodes, and/or the like.

A node may comprise a processor configured to receive a real-time video traffic flow comprising a plurality of RTP packets. A state variable may be associated with the real-time video traffic flow at the node. The node may comprise a processor configured to determine a sequence number of a first RTP packet of the real-time video traffic flow. The node may comprise a processor configured to determine a sequence number of a second RTP packet of the real-time video traffic flow. The node may comprise a processor configured to detect a gap in sequence numbers between the first RTP packet and second RTP packet. The node may comprise a processor configured to update the state variable associated with the real-time video traffic flow based on the detection of the gap. The node may comprise a processor configured to send a report to the sender of the real-time video traffic flow. The report may indicate a gap in sequence numbers between the first RTP packet and second RTP packet of the real-time video traffic flow.

A node may be configured to mark packets. A node may be configured to mark packets to notify the senders and receivers of packets to reduce or increase sending rates of specific data flows to alleviate congestion. Senders and receivers of packets may be specific routers, groups of routers or routers located in the communication network, nodes, and/or the like. A node may be configured to mark packets to provide instructions to senders and/or receivers to temporarily reduce or increase sending rates of specific data flows to alleviate congestion. A node may be configured to mark packets to provide instructions to senders and/or receivers to reduce or increase sending rates of specific data flows to alleviate congestion for a predetermined time range.

When a router encounters congestion, the router may be configured to start dropping packets from one or multiple real-time video flows. The router may mark the ECN bits of the other real-time video flows. For example, the router may set an explicit indication in a packet header (e.g., the two least significant bits of the DiffServ field of an IP packet header to a value of 11). A receiving router, upon receiving the packet with the explicated indication indicating ECN bits marked (e.g., IP packet with the value of 11 in the DiffServ field), may respond to the sender of the packet with the explicit indication indicating ECN bits marked. For example, the receiving router may be configured to respond to the sender by sending, to the sender, a real-time transport protocol (RTP) control protocol (RTCP) packet, such as the ECN feedback packet. The router may be configured to create ECN feedback report. The router may create ECN feedback reports to send early feedback packets to reduce the feedback delay, such as in response to an explicit indication in the RTCP packet or a RTP. The router may create ECN feedback reports to send early feedback packets to reduce the feedback delay, such as to extended audio video profile for RTCP feedback (AVPF) transport-layer ECN Feedback Packet. RTCP feedback (AVPF) transport-layer ECN Feedback Packet may be an indication in a format (FMT) field of a value, such as 8 to indicate that feedback control information (FCI) includes an ECN feedback report. The router may create an ECN feedback report in accordance with computer program instructions to create an ECN feedback report in a sender or receiver. Computer program instructions may include program instructions tangibly stored in read only memory or random access memory of a router. The router may create an ECN feedback report in accordance with computer program instructions upon one or more triggering events. The one or more triggers may comprise exceeding a set threshold number of dropped real-time video flows or the dropping of specifically identified video flows originating from specifically identified sources.

Figure 17:
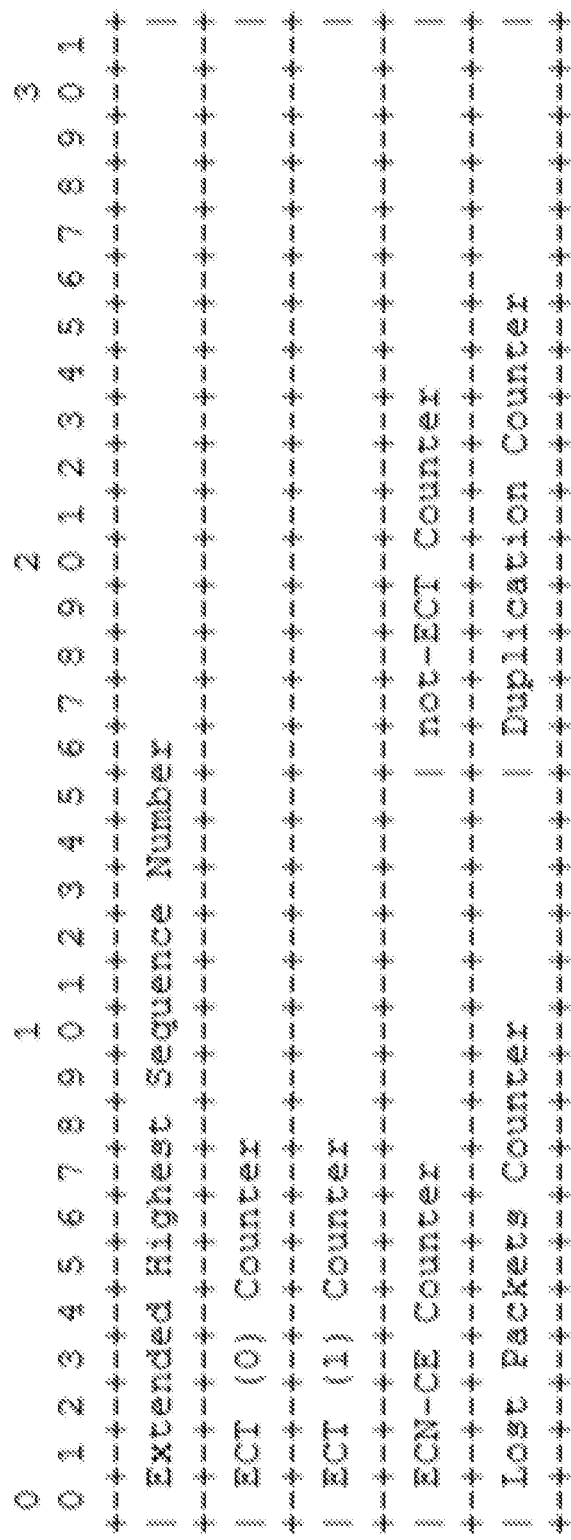
FIG. 17 is a diagram of an example format of an explicit congestion notification (ECN) feedback report which may be transmitted to senders and receivers in a communication network.

FIG. 17 is an illustration of an example format of an explicit congestion notification (ECN) feedback report which may be transmitted to senders and receivers in a communication network. As shown in FIG. 17, the ECN feedback report format may comprises an extended highest sequence number (EHSN) field. ECN-capable transport (ECT) (0) Counter field, ECT (1) Counter field, ECN-congestion experience mark (ECN-CE) Counter field, non-ECT Counter field, Lost Packet Counter field, and a Duplication Counter field. An ECT may be a transport flow where both the sender and receiver are ECN-capable hosts. For example, packets may be sent by an ECN-capable transport marked as ECT (0) or ECT (1) on transmission. Non-ECT packets may be packets that may not be sent by an ECN-capable transport. Non-ECT packets may not be ECN-CE marked.

The EHSN field may, for example, be a 32-bit extended highest sequence number received by the router (e.g., as defined by RFC 35550). The EHSN may indicate the highest RTP sequence number to which the report relates.

The ECT (0) Counter field may, for example, be a 32-bit cumulative number of RTP packets with ECT (0) received from a Synchronization source (SSRC). The SSRC may be the source of a stream of RTP packets that may be identified by a 32-bit numeric SSRC identifier carried in a RTP header. The SSRC may not be dependent upon the network address. The ECT (1) Counter field may, for example, be a 32-bit cumulative number of RTP packets with ECT (1) from the SSRC.

The ECN-CE Counter field may be a cumulative number of RTP packets received from the SSRC, for example, since the receiver joined the RTP session that was ECN-CE marked. The ECN-CE Counter field may include ECN-CE marks in any duplicate packets. For example, the receiver may keep track of the value the cumulative number of RTP packets received Counter field using a local representation that is at least 32 bits. The local representation may include the 16 bits with the least significance. The ECN-CE Counter field may wrap if more than 65,535 ECN-CE-marked packets have been received.

The non-ECT Counter field may be a cumulative number of RTP packets received from the SSRC that had an ECN field value of non-ECT, for example, since the receiver joined the RTP session. The receiver may keep track of the value of cumulative number of RTP packets received using a local representation. The local representation may be at least 32 bits. The local representation may include the 16 bits with the least significance. The non-ECT Counter field may wrap if more than 65.535 non-ECT packets have been received.

The Lost Packets Counter field may be a cumulative number of RTP packets that the receiver expected to receive, minus the number of packets it actually received that are not a duplicate of an already received packet from this SSRC since the receiver joined the RTP session. The packets that arrive late may not be counted as lost. For example, the receiver may keep track of this value using a local representation that is at least 32 bits and may include the 16 bits with the least significance. In other words, the Lost Packets Count field may wrap if more than 65,535 packets are lost.

The Duplication Counter field may be a cumulative number of RTP packets received that may be duplicates of an already received packet from the SSRC. The Duplication Counter field may be a cumulative number of RTP packets received that may be duplicates of an already received packet from the SSRC since the receiver joined the RTP session. For example, the receiver may keep track of the value of the Duplication Counter field using a local representation. The local representation may be at least 32 bits. The local representation may include the 16 bits with the least significance. The Duplication Counter field may wrap if more than 65,535 duplicate packets have been received.

The EHSN field, ECT (0) Counter field, ECT (1) Counter field, ECN-CE Counter field, non-ECT Counter field, Lost Packet Counter field, and Duplication Counter field in the ECN Feedback Report may be unsigned integers in network byte order. Each ECN Feedback Report may correspond to a single RTP source (e.g., SSRC). A node may be configured to report multiple sources by including multiple ECN Feedback Report packets in a compound RTCP packet.

The counters may be initiated to 0 for each subsequent SSRC received. The counters may be initiated to 0 to enable detection of ECN-CE marks, or packet loss, on the initial report from a specific participant.

A node may utilize loss concentration based controlled delay (LC-Codel) which may be an example of how loss concentration may be added to an AQM algorithm. A router, for example, may be configured to utilize LC-Codel when there is a mixture of transmission control protocol (TCP) and real-time video flows encountered at the router. A router may use LC-Codel to treat TCP flows differently from real-time video flows. For TCP flows, the router may use LC-Codel to consider the sojourn time of the dequeued packet in determining whether to drop a packet. For video flows, the router may use LC-Codel to enforce loss concentration, such as by considering the priority of the flow associated with the video packet. For video flows, the router may use LC-Codel to enforce loss concentration, such as by considering the queuing delay created due to video flows in dropping the packet.

A router may drop Real-Time (RT) video packets. A router may drop RT video packets before enqueuing and/or after dequeuing. Embodiments described herein may illustrate examples (e.g., example algorithms) that address when video packets are dropped before enqueuing. Embodiments (e.g., and algorithms) described herein may be extended to address when video packets are to be dropped after dequeuing.

A router may use LC-Codel to address congestion occurring at a single router and/or occurring at multiple routers. The router may use LC-Codel to handle how the losses are confined to specific flows to enforce loss concentration. The router may use LC-Codel to handle how packets are dropped to control the queuing delay.

A router may de-prioritize a flow or a subset of flows, for example, when the router experiences congestion. The router may drop packets from the de-prioritized flow(s). The router may drop packets from the de-prioritized flow until a packet including an intra-frame refresh (e.g., or other video refresh frame) is received. When the router receives the packet including an intra-frame, the router may be configured to stop de-prioritizing the flow. The router may be configured to determine whether the flow is de-prioritized. The router may be configured to determine whether the received Internet protocol (IP) packet includes an intra-refresh frame.

The router may maintain a state variable for a video flow, for example, to determine whether or not the flow is de-prioritized. The router may maintain a state variable for a video flow that traverses the router. For example, routerstate [j]ϵ{De-prioritized, non-Deprioritized} may denote the state for video flow j. The sender and/or video encoder may indicate the state variable information by setting a bit in the IP packet, for example, to determine whether the received Internet protocol (IP) packet includes an intra-refresh frame. The bit may be mutually agreed upon by the sender and the router. For example, the bit (e.g., bit b) may be a part of the IP options field. The router may be configured to not drop the packet comprising the intra-frame refresh, for example, as the router may be triggered by the packet including an intra-frame refresh to stop error propagation.

A router may de-prioritize one or more video flows at any instant. If only one flow is de-prioritized at any instant, the router may be configured to utilize LC-Codel. For example, a video flows may be in a non-deprioritized state. If the router decides to drop a packet and if there are no flows that are de-prioritized currently, the router may be configured to drop a packet from the video flow that is in a non-deprioritized state. The router may be configured to de-prioritize the flow to which this packet belongs. If the router determines that more packets should be dropped, the router may drop packets from the flow until the router encounters a packet that is part of the intra-frame refresh. When the router encounters a packet that is part of the intra-frame refresh, the router may be configured to set the flow back to the non-deprioritized state. The router may prioritize and de-prioritize flows similarly when a subset of flows may be de-prioritized at any instant. A router may use a standard IP 5-tuple to determine a received IP video packet association with a flow. A standard IP 5-tuple may comprise source address, destination address, source port number, destination port number, and protocol number.

The router may utilize LC-Codel to control queuing delays. The router may utilize LC-Codel to control queuing where there is a mixture of video, such as real-time video, and TCP flows. For example, the router may utilize LC-Codel to drop TCP packets after dequeuing. The router may utilize LC-Codel to drop one or more video packets before enqueuing. The router may utilize LC-Codel to increment the 'deficit' on the number of video packets which are determined to be dropped. A router may be configured to drop a number of incoming packets belonging to de-prioritized video flows equal to the 'deficit' value before enqueuing. Using deficits to drop packets before enqueueing may be applied to dropping video packets after dequeuing.

Figure 18:
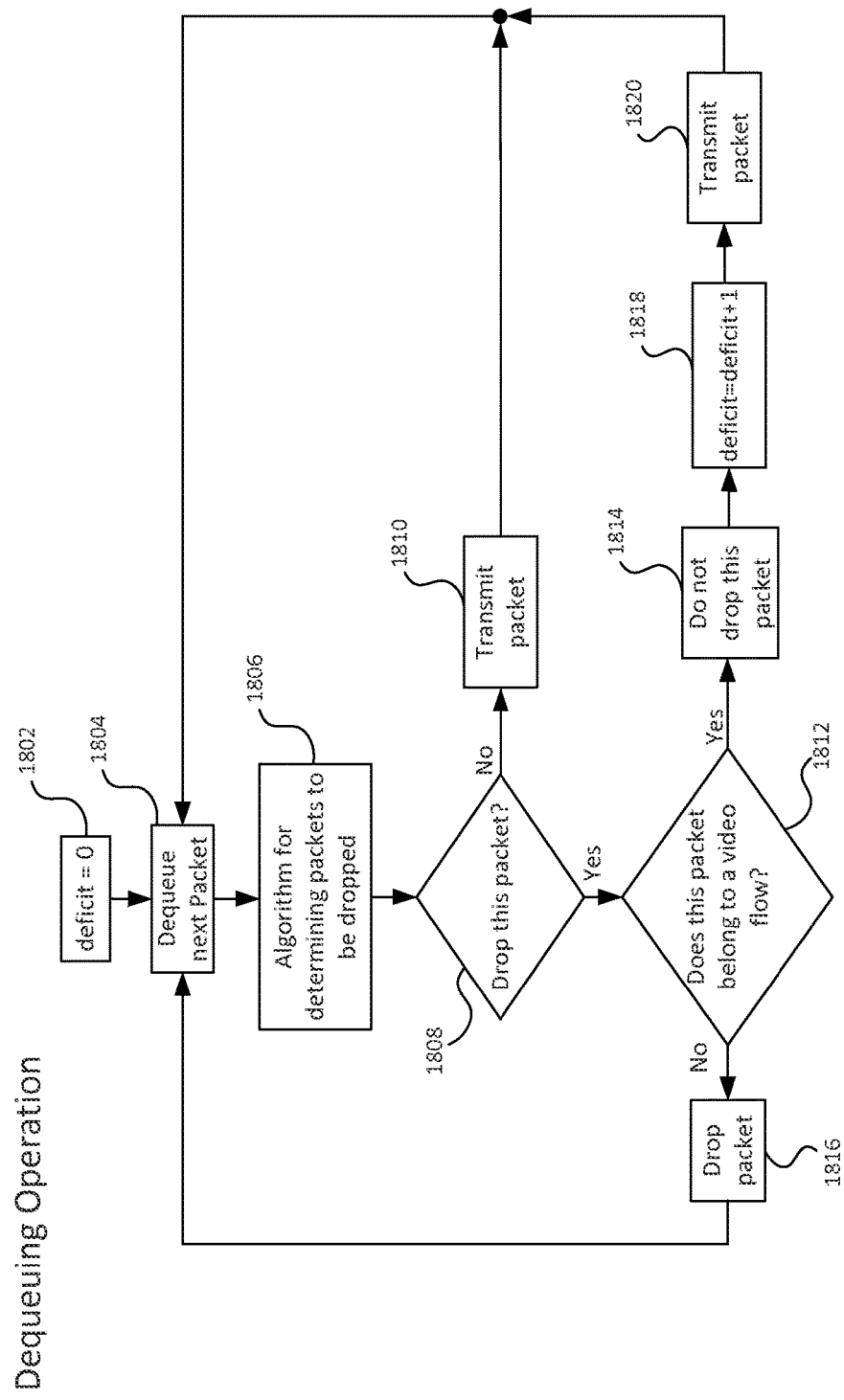
FIG. 18 is a flow diagram of an example of the LC-Codel dequeuing operation.

FIG. 18, is an example flow diagram of the LC-Codel's dequeuing operation. In FIG. 18, the router is configured to utilize LC-Codel's dequeuing and initialize with a deficit counter set to an initial value 0 at 1802. The router may be configured receive the next packet to be dequeued at 1804. The router may be configured to utilize the LC-Codel at 1806 to compute the packet sojourn time (e.g., a TCP data packet sojurn time) in the queue. Based on this computed value from 1806, the router may decide whether to keep or drop the data packet at 1808. If the router determines to keep the packet, at 1810, the router may transmit the packet. With respect to video packets, the router may be configured to increment the deficit count for packets rather than drop the packets. The amount of deficit may denote the backlog of video packets that may be dropped from video flows before the packets are enqueued at the buffer, so as to maintain the queuing delay. At 1812, if the router determines to drop the packet in 1808, the router may utilize the LC-Codel to determine whether the video packet is associated with a video flow. If the packet is not associated with a video flow, the router may drop the packet at 1816. If the packet is associated with a video flow, the router may determine the packet may not be dropped at 1814. If the router determines not to drop the packet, the router may increment the deficit by one at 1818. The router may transmit the packet at 1820.

A router may be configured to determine whether an IP packet is associated with a video flow by inspecting a Differentiated Services Code Point (DSCP) field. A router may be configured to determine whether an IP packet is associated with a video flow by deep packet inspection.

Figure 19:
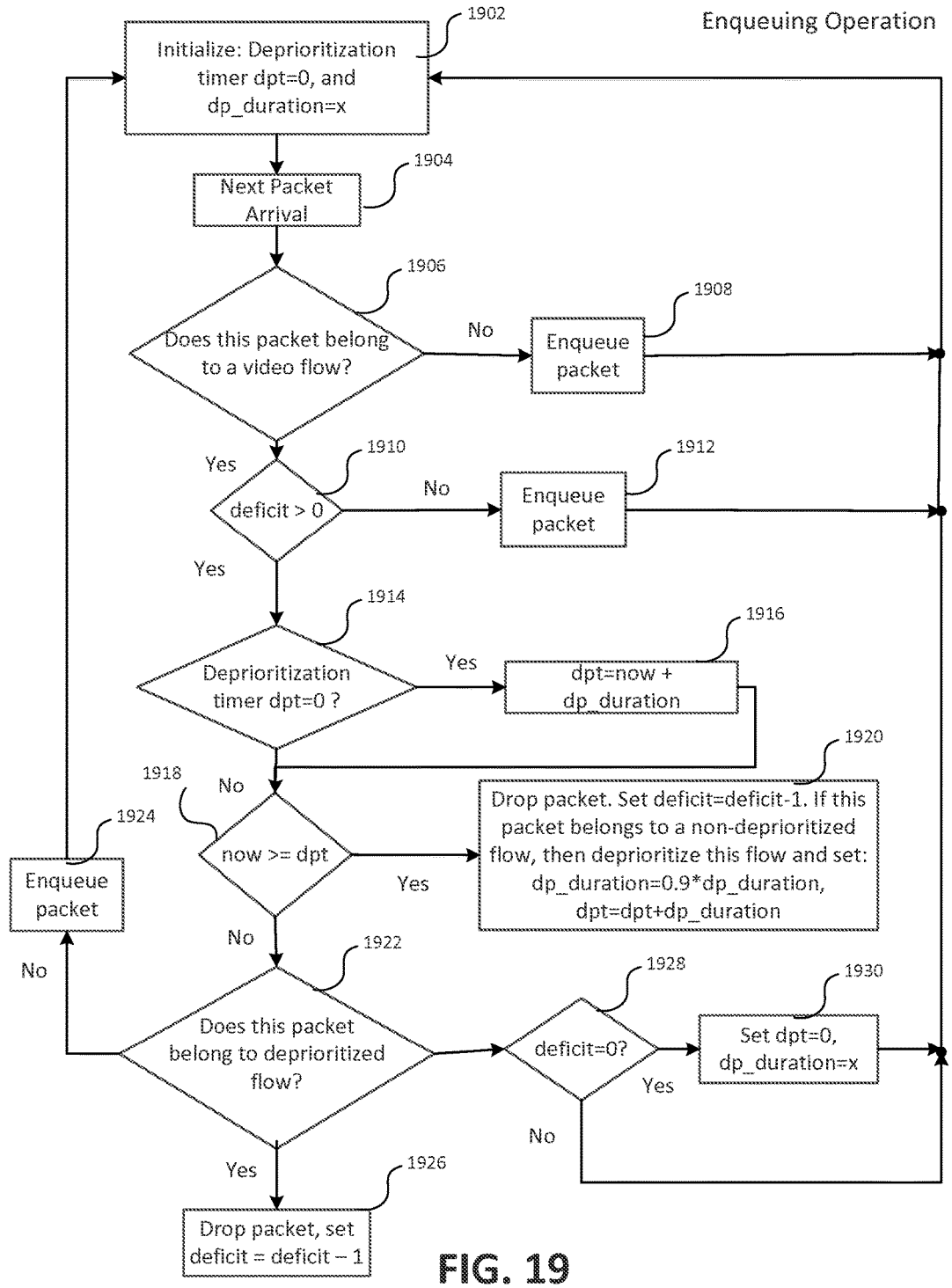
FIG. 19 is a flow diagram of an example of the LC-Codel enqueuing operation.

FIG. 19 is an example flow diagram of the LC-Codel's enqueuing operation. As shown in FIG. 19, the router may initialize LC-Codel enqueuing with a deprioritization timer (dpt=0) and a deprioritization duration (dp_duration=x where x may, for example, be a value greater or less than 50 milliseconds and/or a value greater or less than 300 millisecond) starting value at 1902. The deprioritization duration denotes the time duration between de-prioritizing new video flows. The deprioritization timer may keep track of the time instants at which new video flows may be deprioritized based on the deprioritization duration. The deprioritization duration may decrease exponentially if, for example, the deficit does not go to zero after a sufficient time has elapsed.

In 1904, the router may receive a next packet. At router may examine the new packet using the enqueuing operation. The enqueuing operation may determine whether the packet is associated with a video flow at 1906. In response to determining that the packet is not associated with a video flow, the enqueuing operation may enqueue the packet at 1908. If the packet is associated with a video flow, the deficit value of the packet is compared to a pre-determined value, such as 0, at 1910. If the detected deficit value is not greater than the pre-determined value, the enqueuing operation enqueues the packet at 1912. If the detected deficit value is greater than the pre-determined deficit value, the enqueuing operation determines if the deprioritization timer has elapsed at 1914.

If the deprioritization timer has elapsed, then the deprioritization timer is set to the current time value and is added to the deprioritization duration value at 191 and a comparison is made to determine if the current time is less than or equal to the deprioritization timer at 1918. If the current time is greater than or equal to the deprioritization timer, the packet is dropped at 1920. When the packet is dropped at 1920, the deficit=deficit−1. If it is determined that the packet belongs to a non-deprioritized flow, the flow is deprioritized and the deprioritization duration value is set to a value multiplied by the previously set deprioritization duration value (e.g., 0.9*dp_duration) at 1920. The deprioritization timer value is a value which includes both the deprioritization timer value and deprioritization duration value (e.g., dpt=dpt+dp_duration). At 1928, the enqueuing operation may check to determine if the deficit is equal to zero. In response to determining that the deficit value is zero, the deprioritization timer and deprioritization duration value are reset at 1930.

If the current time is less than the deprioritization timer, then the enqueuing operation determines whether the packet is associated with a deprioritized flow at 1922. If the packet is not associated with a deprioritized flow, then the packet is enqueued at 1924. If the packet is associated with a deprioritized flow, then the packet is dropped and the deficit is set to equal deficit−1 at 1926. The enqueuing operation mat check to determine if the deficit is equal to zero at 1928. In response to determining that the deficit value is zero, the deprioritization timer and deprioritization duration value are reset at 1930.

Video packets may be dropped from de-prioritized flows to null out the deficit during the congestion cycle. The deficit may have been created during the dequeuing operation. The router may configure the enqueuing operation to de-prioritize video flows more and more aggressively, for example, when a preset time duration has elapsed and the deficit has not been nulled out yet. For example, the router may deprioritize one video flow to begin. If after a preset time duration the deficit is still non-zero, the router may deprioritize a second new video flow, making the total number of de-prioritized video flows equal to two. If the deficit stays greater than zero for an extended period of time, the router may de-prioritize additional video flows (e.g., more aggressive de-prioritization). The router may be configured to bring the deficit to zero faster by de-prioritizing more video flows. Depriorizing more video flows may have a detrimental effect on the video quality. The router may configure the enqueuing operation to make tradeoffs between congestion control (e.g., de-prioritizing more video flows) and video quality.

Figure 20:
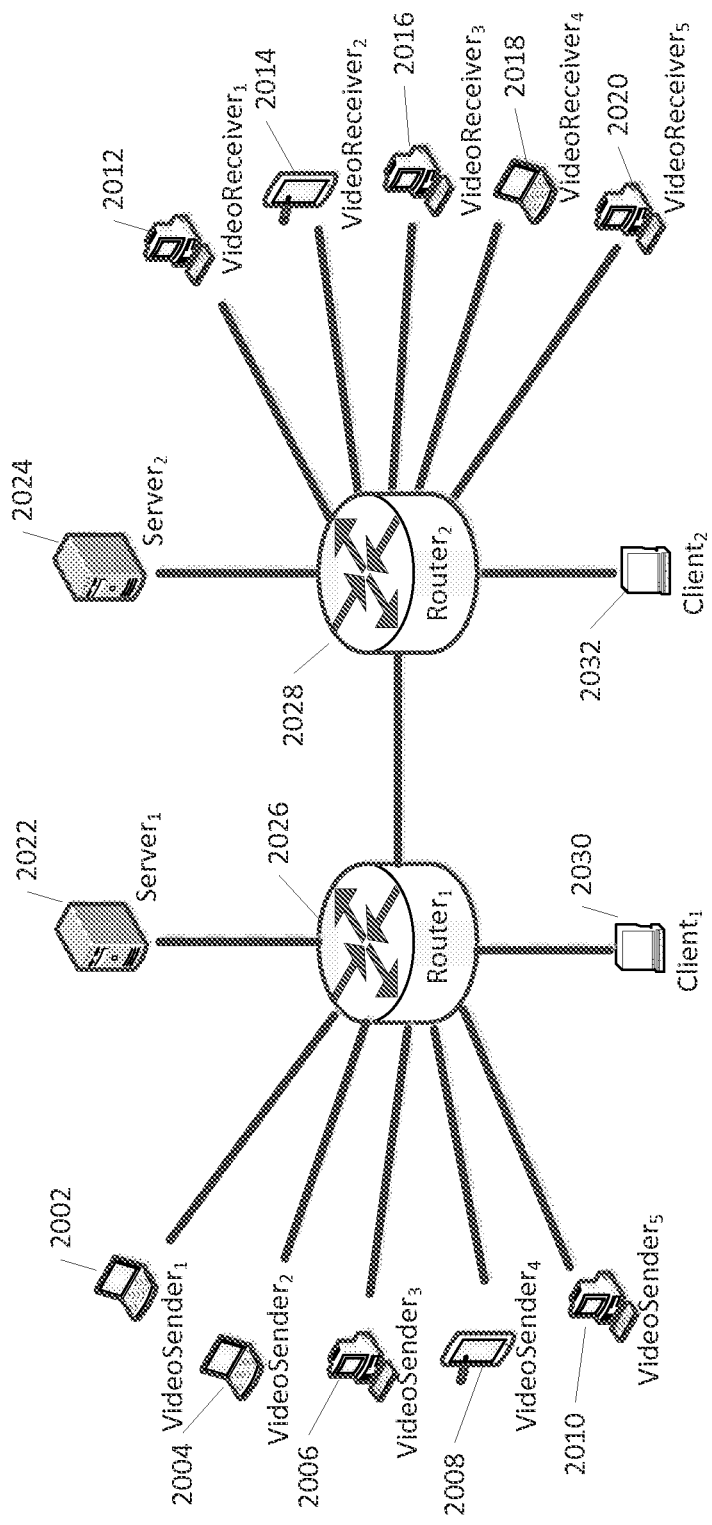
FIG. 20 is a diagram of an example of an LC-Codel employed in a dumbbell network topology with video traffic and background TCP traffic which includes both single and double congested routers.

FIG. 20 is a diagram of an example of an LC-Codel employed in a dumbbell network topology with video traffic and background TCP traffic including both single and double congested routers. Simulations were performed in a network simulator of dumbbell network topology and the results are displayed in FIG. 20. FIG. 20 illustrates the performance of example embodiments of the LC-Codel.

In FIG. 20, there are five video senders (VideoSender$_i$, i=1, 2, . . . 5) 2002, 2004, 2006, 2008, 2010. The video senders 2002, 2004, 2006, 2008, 2010 may be configured to transmit video telephony traffic that passes through two routers (Router$_1$ and Router$_2$) 2026, 2028 to their respective receivers (VideoReceiver$_i$, i=1, 2, . . . 5) 2012, 2014, 2016, 2018, 2020. The are two background TCP flows (Client$_i$-Server$_i$, i=1,2) 2030 to 2020 and 2032 to 2024, one across each router 2026, 2028. The background TCP flows may run file transfer protocol (FTP) upload and download applications. Connected links in the topology shown in FIG. 12 may be point-to-point protocol (PPP) SONET OC3 with a capacity of 148.81 Mbps. The link delay for TCP links (Client$_i$-Router$_i$ 2030 to 2022, and Router$_i$-Server$_i$, i=1, 2 2032 to 2024) may be 5 ms, inter-router link delay (Router$_1$-Router$_2$) may be 5 ms, (VideoSender$_i$-Router$_1$ i=1, 2 . . . 5) and (Router$_2$-VideoReceive$_j$ j=1, 2 . . . 5) and links may have a delay of 10 ms. The parameter 'x' (e.g., initialization of 'dp_duration') may be set to 100 ms. The remaining parameters, such as packet drop probabilities and delay parameters, may be set to predetermined values.

Video senders may transmit video sequences of a 10 second duration encoded in IPPP format at a rate of 30 fps. For the single bottleneck scenario at Router$_1$ 2026, the simulation setting may be configured such that: the packet processing rate of Router$_1$ 2026 and Router$_2$ 2028 are 6×10$^3$ packets/sec and 10$^5$ packets/second respectively; the background FTP application across Router$_1$ 2026 (Clien$_1$-Server$_1$ 2030 to 2022) uploads and downloads files with exponentially distributed file size of mean 5×10$^5$ bytes with inter-request time exponentially distributed with mean 33 ms for a duration of 4 sec; the FTP application across Router$_2$ 2028 (Client$_2$-Server$_2$ 2032 to 2024) downloads files with an exponentially distributed file size of mean 2.5×10$^3$ bytes with inter-request time exponentially distributed with mean 3.4 ms for a duration of 4 sec. For a two congested router case, the simulation settings may be configured such that: the packet processing rate of both routers is 6×10$^3$ packets/second and the background FTP application across Router$_1$ and Router$_2$ uploads and downloads files with an exponentially distributed file size of mean 3.5×10$^5$ bytes with inter-request time exponentially distributed with mean 33 ms for a duration of 4 seconds.

For video flows, the router may choose the percentage of freeze time to be the performance metric to be consistent with the behavior of contemporary video telephony systems, while the router may choose throughput for TCP flows. Timeliness of packet delivery at the video receivers may be taken into account. A router may utilize a constant play-out delay model that may provide that a video frame-k available at the receiver for display at time (t$_k$+h), where t$_k$ represents the time at which the last packet of frame-k was transmitted at the video sender, and h represents the play-out delay. Packets of frame-k may arrive at the receiver before time (t$_k$+h) to avoid a frame freeze. If a packet belonging to frame-k arrives after (t$_k$+h), and before time $$\left(t_k + h + \frac{d}{2}\right)$$

(where d is the inverse of the video frame rate), one-frame freeze may occur. One freeze frame may occur when the packet may not be useful for displaying frame-k. The packet may be useful for decoding future frames, for example, provided packets of future frames arrive on time, and the packet may not be considered lost. If a packet belonging to frame-k, arrives after time $$\left(t_k + h + \frac{d}{2}\right),$$

the packet may be considered lost. The play-out delay, h may be set to 267 ms.

TABLE 1

Example of Performance for a Single Congested Router

| Scheme | Freeze duration (%) | Mean freeze duration (frames) | TCP throughput reduction compared to Codel (%) | Packet Loss Rate (%) | | |
|---|---|---|---|---|---|---|
| | | | | Delay Violation | At Router | Total |
| DropTail | 39.8 | 9.6 | 0.86 | 31.4 | 0 | 31.4 |
| Codel | 33.55 | 5.6 | 0 | 0 | 2.43 | 2.43 |
| LC-Codel | 12.95 | 5.6 | 1.7 | 0 | 2.59 | 2.59 |

Table 1 and Table 2 show examples of the performance of difference queue management schemes, including an example of the LC-Codel, when video senders transmit the 'Racehorse' video sequence in the presence of highly congested background TCP traffic for the single and double congested router cases, respectively. A router may utilize LC-Codel to provide enhanced Quality of Education (QoE) to video flows in providing shorter percentage of freeze durations, with negligible impact on the TCP flows.

TABLE 2

Example of Performance for two Congested Routers

| Scheme | Freeze duration (%) | Mean freeze duration (frames) | TCP throughput reduction compared to DropTail (%) | Packet Loss Rate (%) | | |
|---|---|---|---|---|---|---|
| | | | | Delay Violation | At Router | Total |
| DropTail | 55.6 | 12.6 | 0 | 51.03 | 0 | 51.03 |
| Codel | 41.45 | 6.1 | 0.63 | 0 | 3.64 | 3.64 |
| LC-Codel | 16.05 | 6.2 | 0.29 | 0 | 3.81 | 3.81 |

As shown in Tables 1 and 2, packet losses may occur in the DropTail scheme due to delay bound violation. Packet losses may not occur at the router, which may be the typical 'bufferbloat' scenario observed in the Internet today. Under high network loading. DropTail may fail to deliver a significant fraction of packets within the time bound. A router utilizing Codel and LC-Codel may experience packet losses at the routers so as to maintain low queueing delay and enable delivery of packets in a timely manner. The gains in LC-Codel as compared to Codel are due to LC-Codel being able to concentrate packet losses, while Codel drops packets randomly to flows incurring more freeze occurrences. Though the packet loss rate for DropTail may be much higher than Codel, the freeze duration for DropTail may not compare negatively to Codel. DropTail may drop packets in a bursty manner, which reduces the freeze duration. The difference between DropTail and LC-Codel is that while DropTail does bursty packet drops in the high delay regime, LC-Codel concentrates packet losses in the low delay regime, which is primarily the regime of interest for video telephony applications.

Figure 21:
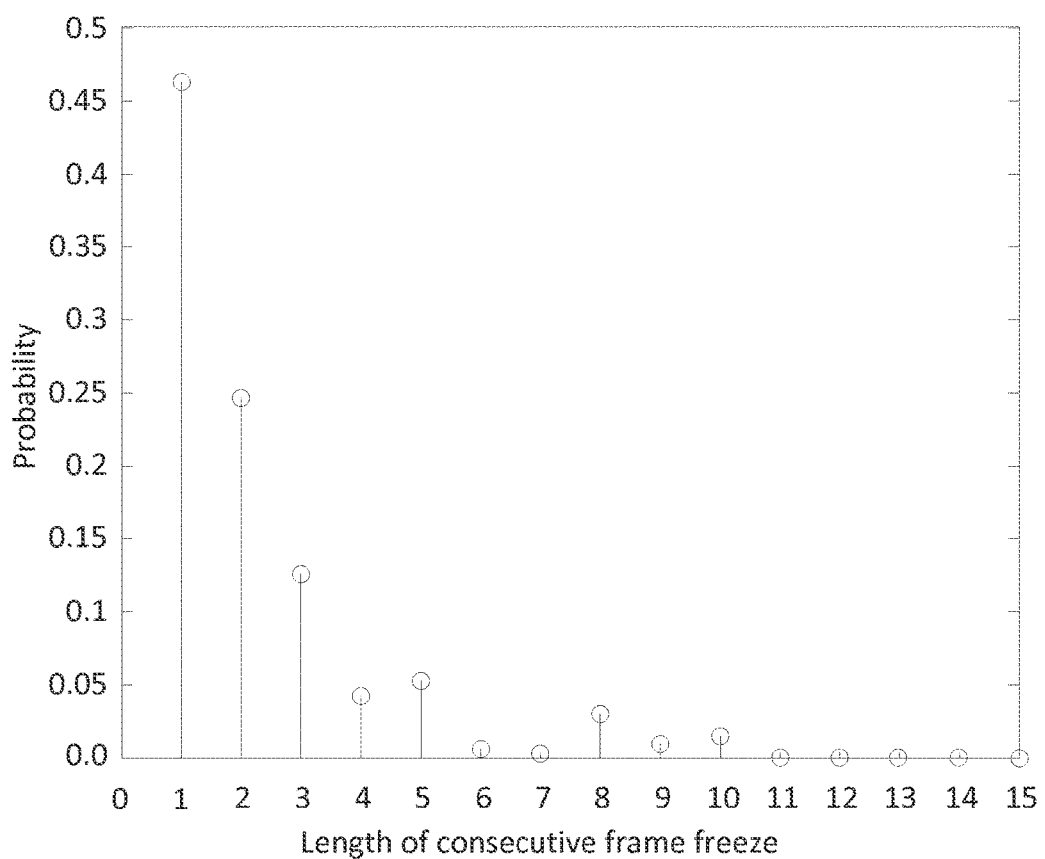
FIG. 21 is a diagram of an example of the conditional distribution on the length of consecutive frame freeze FIG. 22 a diagram of an example of real-time video traffic employing the LC-Codel in a network simulator.

FIG. 21 is a diagram of an example of conditional distribution on the length of consecutive frame freeze. Single-frame freezes of consecutive frames may occur when packets of a frame arrives after ($t_k$+h) and before time $$\left(t_k + h + \frac{d}{2}\right).$$

Single-frame freezes of consecutive frames may lead to frame freeze of longer duration. Single-frame freezes of consecutive frames may be similar to a packet loss effect that leads to frame freeze of longer durations. FIG. 21 depicts the conditional distribution on the length of consecutive frame freeze for the single router congested scenario of Table-1 for the DropTail that may be conditioned on the occurrence of single-frame freeze event.

The LC-Codel results shown in Table 1 and Table 2 may focus on high congestion. LC-Codel may be configured to perform active queue management in other congestion regimes. As congestion decreases, DropTail handling of congestion may improve traffic in a wireless network. DropTail handling of congestion may cause the delay induced packet losses to decreases with reduced loading. Table 3 and Table 4 illustrate examples of the performance of the LC-Codel for a single congested router scenario (at $Router_1$) where the congestion level for Table 3 is higher than Table 4. The simulation settings for Table 3 and Table 4 are as follows: the packet processing rate of $Router_1$ and $Router_2$ are $6 \times 10^3$ packets/sec and $10^5$ packets/second respectively; the background FTP application across $Router_1$ ($Client_1$-$Server_1$) uploads and downloads files with an exponentially distributed file size of mean $3.5 \times 10^5$ bytes for Table 3 (and $2.75 \times 10^5$ bytes for Table 4), with inter-request time exponentially distributed with a mean of 33 ms for a duration of 4 seconds and the FTP application across $Router_2$ ($Client_2$-$Server_2$) downloads files with an exponentially distributed file size of mean $2.5 \times 10^3$ bytes with inter-request time exponentially distributed with a mean of 3.4 ms for a duration of 4 seconds.

TABLE 3

Example of performance for a single congested router for reduced loading-1

| Scheme | Freeze duration (%) | Mean freeze duration (frames) | TCP throughput reduction compared to DropTail (%) | Packet Loss Rate (%) | | |
|---|---|---|---|---|---|---|
| | | | | Delay Violation | At Router | Total |
| DropTail | 20.85 | 7.2 | 0 | 12.7 | 0 | 12.7 |
| Codel | 27.91 | 5.3 | 2.4 | 0 | 1.97 | 1.97 |
| LC-Codel | 11.14 | 5.3 | 0.67 | 0 | 2.18 | 2.18 |

TABLE 4

Example of performance for single congested router for reduced loading-2

| Scheme | Freeze duration (%) | Mean freeze duration (frames) | TCP throughput reduction compared to Codel (%) | Packet Loss Rate (%) | | |
|---|---|---|---|---|---|---|
| | | | | Delay Violation | At Router | Total |
| DropTail | 8.96 | 6.5 | 3.4 | 4.58 | 0 | 4.58 |
| Codel | 24.27 | 5.4 | 0 | 0 | 1.74 | 1.74 |
| LC-Codel | 9.95 | 5.5 | 2 | 0 | 1.79 | 1.79 |

System parameters may be taken into consideration in Table 1 through Table 4. System parameters may comprise the target-delay and/or play-out delay which may be used to indicate the maximum delay the receiver can tolerate in displaying video frames in real-time. Target-delay may be used for marking packets if the queueing delay exceeds a value. Play-out delay may be used to indicate the maximum delay the receiver may tolerate in displaying video frames in real-time. Target-delay may be less than play-out delay. Packet loss may not occur, for example, when the queuing delay is less than target-delay.

The routers may experience higher delay induced packet loss when utilizing DropTail than the packet loss the routers would experience utilizing Codel/LC-Codel. The routers may experience higher delay induced packet loss when utilizing DropTail, for example, when the queuing delay is greater than play-out delay for extended periods of time. The performance of LC-Codel may be significantly better than the others.

A router utilizing Codel/LC-Codel may experience packet loss (e.g., non-zero freeze durations), for example, when queuing delay is greater than the target delay and queuing delay less than play-out delay. A router utilizing DropTail may not experience any packet lost, for example, when queuing delay is greater than the target delay and queuing delay less than play-out delay.

A router may utilize LC-Codel to implement loss concentration. For example, the router may use instructions to maintain a state variable indicating whether or not a flow has been deprioritized. For example, the router may be configured to change the state to deprioritized upon detecting a packets loss. The router may be configured to returned the state variable to a non-deprioritized state upon receiving an indication that a video frame refresh packet has been routed for the flow. A video frame refresh packet may comprise an IPPP structure, or a Hierarchical P video coding structure, such as temporal layer 0 in Hierarchical P, etc. For example, a router may implement LC-Codel as follows:

```
Let the video flows be numbered 1,2 ... N
//flows are not initially de-prioritized
Let routerstate[i]← TRUE, ∀i = 1,2, . . N .
Obtain a new IP video packet to be enqueued. Read 'bitA' of the IP packet from the IP
options field
Set, fnum← Flow number of the received packet
// stop de-prioritizing 'fnum' if bitA is set.
if bitA==1 then
        Do not drop this packet. Routerstate[fnum]←TRUE.
        Go to above step of obtaining a new IP video packet to be enqueued
endif
if (bitA==0) and (packet may be dropped) then
    if (routerstate[i]==TRUE ∀i = 1,2, . . N) then
        // fnum may be the first flow to be de-prioritized
        Drop this packet. Set routerstate[fnum]← FALSE
        Go to above step of obtaining a new IP video packet to be enqueued
    endif
        if (routerstate[fnum]==FALSE) then
            // this flow is de-prioritized already
            Drop this packet. Go to above step of obtaining a new IP video packet to be enqueued
        else
            // this packet does not belong to de-prioritized flow
            Do not drop this packet. Go to above step of obtaining a new IP video packet to be
enqueued
        endif
endif
``` routerstate[i]∈{TRUE, FALSE} may denote the state that the router maintains for flow i, bitA=1 may denote the bit that is set by the video sender to indicate that the packet is a part of an I-frame.

A router may utilize LC-Codel when communicating with multiple routers. For example, the router using LC-Codel may use the following algorithm to inform other routers that a flow has been deprioritized:

```
Let the video flows be numbered 1,2 ... N and S_i ⊂ {1,2, . N} denote the de-prioritized
flows for router-i
For the received IP packet, let j denote its flow number.
//Router upading its state based on 'bitB'
if bitB==1 then
        routerstate[j]←FALSE
endif
//Router passing its flow information through bitB
```

```
if j ∈ S_f and the packet is not dropped then
    Set bitB=1 and enqueue this packet.
endif
``` bitB may denote the bit set by the router to indicate that the packet belongs to a de-prioritized flow, so that the downstream routers may be made aware of the information. routerstate[i]∈(TRUE, FALSE) may denote the state that the router maintains for flow i.

A router's utilizing of LC-Codel may be simulated in a network simulator, such as OPNET, to observe the handling of real-time video traffic in a typical wireless network. A simulator may be used to simulate real time video transmission. The video sequence may have an IPPPP structure. Other configurations are possible that may allow for video sequences to be implemented for other video formats.

The video sender may transmit packets in a sequential manner, beginning from frame 0 until the end of the sequence. The video receiver may send a real-time transport protocol control protocol (RTCP) feedback (e.g., for the lost packets) to the video sender. Upon receiving the RTCP feedback from the receiver, the video sender may insert an instantaneous decoder refresh (IDR) from the next frame in its transmission sequence and continue its transmission.

Figure 22:
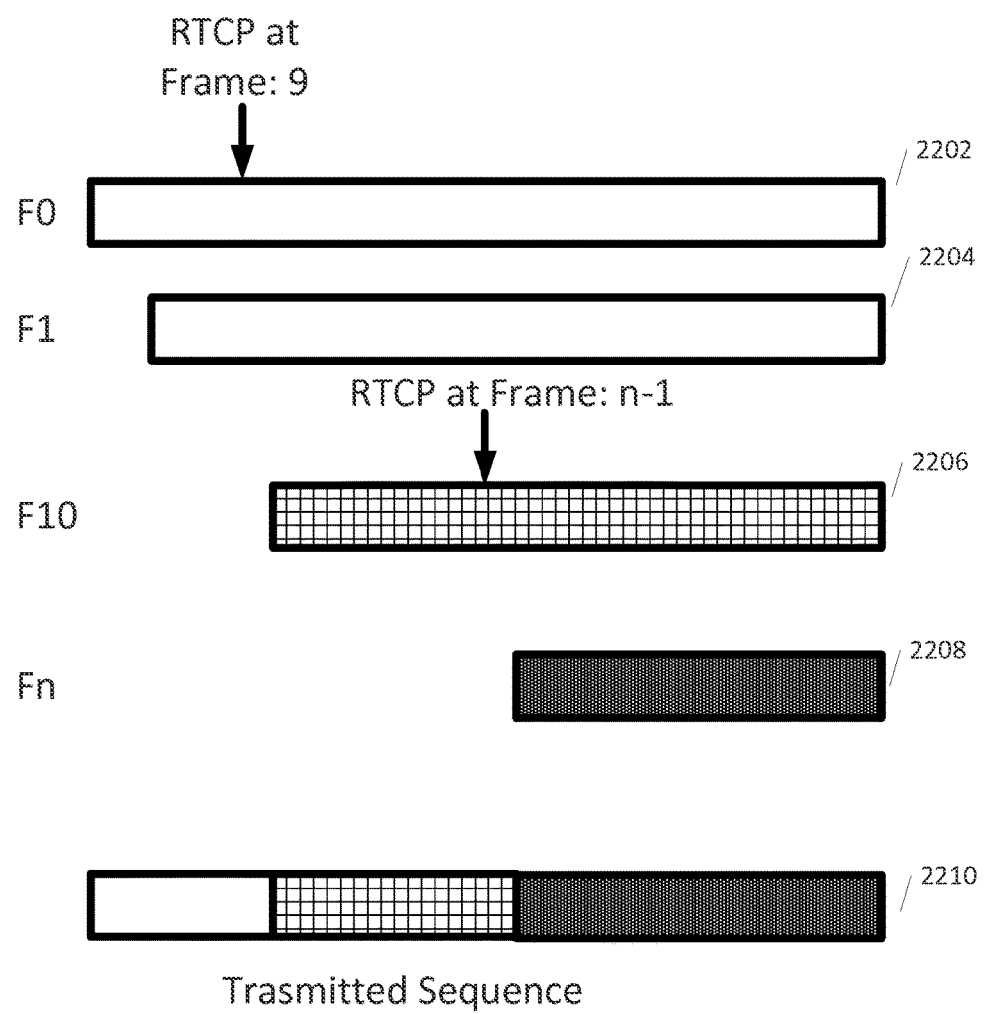

FIG. 22 is a diagram of an example of real-time video in a network simulator utilizing LC-Codel. In FIG. 22, Fx may denotes the video that may be encoded beginning from frame x to the end of the sequence. For example, F0 2202 may denote the video encoded for the complete video sequence beginning from frame 0 being and I frame, with the remaining frames comprising P frames. F10 2206 may denote the video sequence encoded beginning from frame 10 until the end of sequence, with frame 10 being an I frame and the remaining frames comprising P frames. The Fx values may be pre-encoded or computed up front in a single operation. The sizes of the frames and/or packets may be analyzed at various pre-determined time intervals.

In FIG. 22, the video sequence F0 may be transmitted. At frame 9 of video sequence, F0 a RTCP may be received. Video sequence F0 may not finish transmitting until frame 9. From frame 10 onwards, a switch may be made to the video sequence F10 2206. The first frame in F10 2206 (e.g., frame #10) may be an I frame and the remaining frames may be P frames. Switching from video sequence F0 to video sequence F10 may cause the insertion of an I frame when the video sender receives a RTCP. The complexity (e.g., storage of pre-encoded video sequences, search for the desired pre-encoded video sequence) may be linear in the number of frames. The storage in memory of the sizes of packets and the possible frame sequences (Fn, n∈N in FIG. 12) may be allowed. The sequence may be switched when RTCP feedback is received.

A router may employ the controlled delay active queue management (Codel) algorithm to realize loss concentration. A router may utilize the Codel algorithm to take care of the 'parameter tuning' in one or more AQM algorithms. A router may utilize the Codel algorithm to allow for the possibility of controlling video packet drops to realize loss concentration. Some AQM algorithms, such as the DropTail (DT) algorithm and random early detection (RED) algorithms, may not be as good as Codel for the realization of loss concentration. A router may experience difficulty configuring parameters of the RED algorithm. A router may experience difficulty controlling queuing delays when utilizing the DT algorithm, for example, when a router is endowed with an unlimited size buffer. A router may have difficulty dropping packets from one or more subsets of flows when congestion occurs when utilizing DT.

Figure 23:
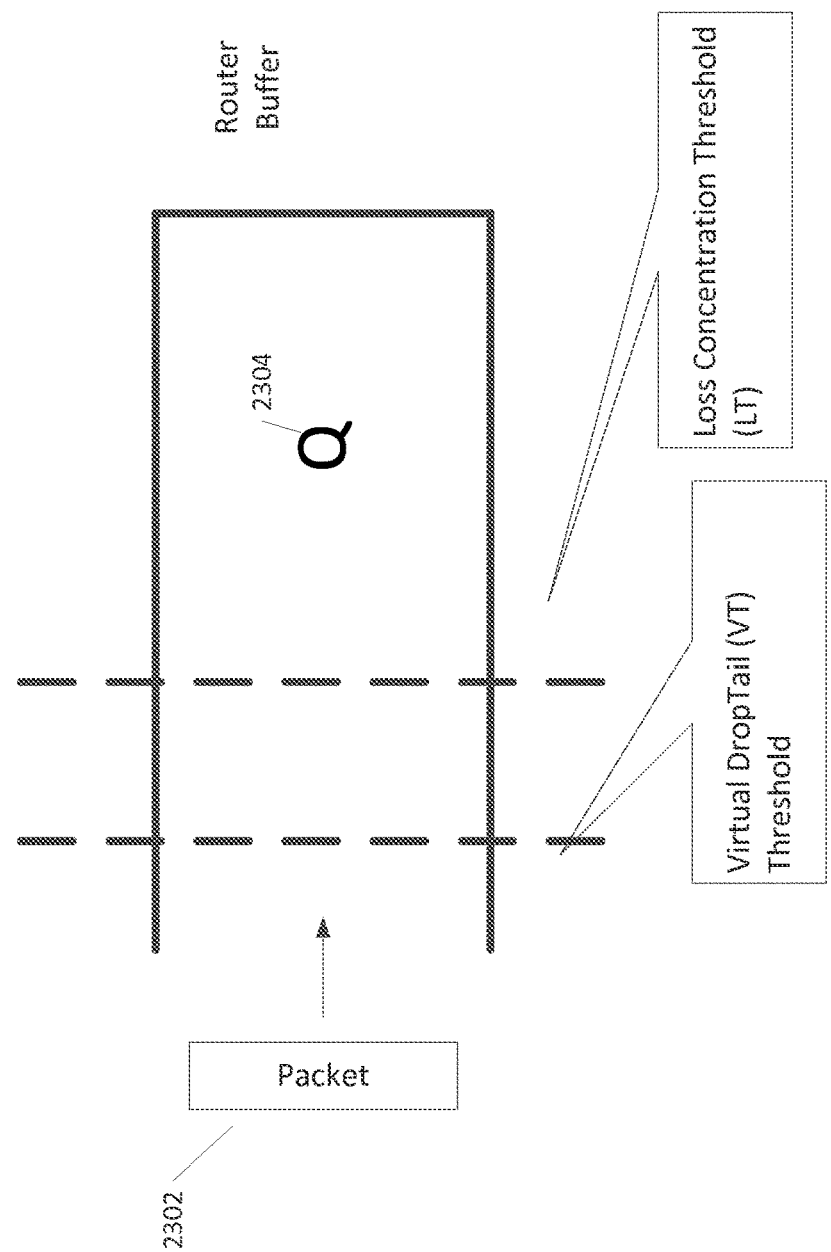
FIG. 23 is a diagram of an example of a queue configured to approximate characterization of loss concentration using the DropTail (DT) algorithm.

FIG. 23 is a diragram of an example queue configured to approximate characterization of loss concentration using the DropTail (DT) algorithm. As shown in FIG. 23, a router buffer may have one or more thresholds, for example, a loss concentration threshold (LT) and a virtual droptail threshold (VT). The VT may represent a predetermined virtual threshold (e.g., 95% of the actual buffer size or some other predetermined percentage). The LT (e.g., 90% of the actual buffer size or some other predetermined percentage) may indicate the predetermined threshold to trigger loss concentration. As shown in FIG. 23, an incoming packet 2302 may be poised to be enqueued in the buffer. Q 2304 may represent the queue length which may, for example, take into account the incoming packet about to be enqueued.

A router utilizing a DT to enforce loss concentration may, for example, be configured to provide that if Q>LT, then the router may drop incoming packet if it belongs to de-prioritized video flow. A router utilizing a DT to enforce loss concentration may, for example, be configured to provide that if Q>LT, then the router may not drop the incoming packet if the incoming packet belongs to non-video flows or non-de-prioritized video flows. A router may be configured so that loss concentration is triggered by starting to drop packets from de-prioritized video flows before the queue length reaches the virtual threshold.

A router utilizing a DT to enforce loss concentration may, for example, be configured to provide that if Q>VT, then the router may drop the incoming packet if it belongs to non-video flows or if the incoming packet belongs to de-prioritized video flows. A router utilizing a DT to enforce loss concentration may, for example, be configured to provide that if Q>VT, then the router may not dropped if the incoming packet belongs to non-de-prioritized video flows or if the incoming packet is an RTCP packet. A router may be configured so that loss concentration is enforced by dropping packets from de-prioritized video flows and not dropping packets from non-de-prioritized video flows. A router may be configured to treat non-video packets in the usual manner. A router may be configured to not drop RTCP packets to make sure that the video sender get the loss information.

A router employing DT may drop video packets that belong to de-prioritized flows earlier than the router may drop non-video packets, such as when Q>LT. When Q>VT, a router may be incentivize to non-deprioritized video flows.

Figure 24:
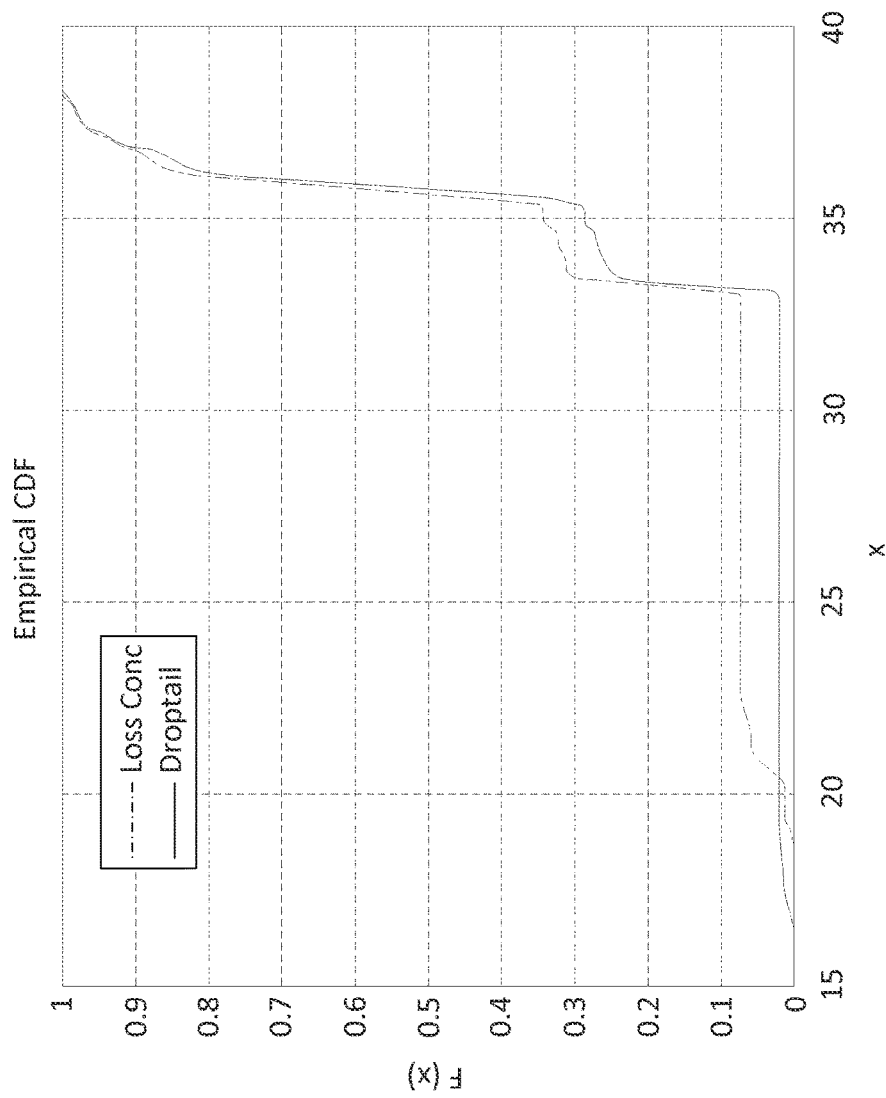
FIG. 24 is a graph of an example of the CDF of the peak signal-to-noise ratio (PSNR) of DT

FIG. 24 is a graph of an example CDF of the peak signal-to-noise ratio (PSNR) of DT. In FIG. 24, the DT may be a virtual DT (e.g., DropTail) where a packet is dropped if Q>VT and loss concentration is enforced. In FIG. 24, the average PSNR gain may be 0.8 dB.

A router, a group of routers, or a network of routers such as the internet may utilize partial implementation of loss concentration. For example, it may not be possible to add loss concentration as a new feature to routers (e.g., all routers) on the paths of real-time video applications. For example, some routers may not support the use of the IP option field used for carrying bits (e.g., bits a, b, c), and may drop packets that use the IP option field. One or more routers not configured to use the bits may make the coordination among routers in a wireless network more challenging.

For example, one or more routers may individually enforce loss concentration without coordination (e.g., not use the bits such as a, b, c). Lack of coordination among routers may result in less performance gain. One or more routers not configured to use the bits may be similar to updating state variables when a new packet arrives at 1652, as shown in FIG. 16. For example, no upstream information may be added to the communication between routers in FIG. 16 since the new packet does not carry the bits, such as bits a, b and c. The router may not employ state variables to mark outgoing packets at 1660.

A node may comprise a processor configured to receive a real-time video traffic flow. A state variable may be associated with the real-time video traffic flow at the node. The state variable may indicate a loss state for the real-time video traffic flow at the node. The node may comprise a processor configured to determine a round trip time (RTT) of the real-time video traffic flow. The node may comprise a processor configured to change the state variable associated with the real-time video traffic flow to indicate a no loss state based on the RTT. The RTT may be a predetermined value. The RT may be estimated based on a transmission control protocol (TCP) connection between a source and a destination of the real-time video traffic flow. The RTT may be determined by constructing a lower bound of the RTT using a queueing delay.

In the absence of coordination from the video sender and other routers, a router may implement loss concentration without the use of signaling being exchanged between routers that indicate a flow's status (e.g., the a, b, and/or c bits). For example, a router may be configured to transition the state (e.g., State_k) of a flow from loss to no_loss based on observations of traffic flows without receiving explicit signaling in IP or other headers. For example, a router may not know how long a flow should be in the state of loss. A router may be configured to estimate the round-trip time (RTT) of a flow. If the router can identify a TCP connection between the source and the destination of the real-time video flow, the router may utilize passive estimation of TCP RTTs to estimate the RTT of the real-time traffic flow. The router may use the RTT to determine the amount of time a given flow may remain in a given state (e.g., prioritized, deprioritized, etc.). For example, when a router may be unable to estimate RTT and/or if a current estimate is unavailable, the router may be configured to employ a pre-determined constant value (e.g., 100 ms), which may be close to the average RTT seen on the Internet.

A router may use the queueing delay observed locally to construct a lower bound of the RTT. The router may use the lower bound to produce part of the gain that would be possible with an accurate value for the RTT. The router may utilize and execute computer instructions tangibly stored in storage medium to estimate the value of the RTT.

A router may be configured to infer real-time video traffic by analyzing the traffic characteristics. A router may be configured to use information derived from analysis of the traffic characteristics. A router may be configured to use available information which is not encrypted. For example, if encryption is enabled with respect to the media payload such as Secure Real-time Transport Protocol (SRTP) profile, and not enabled for the remaining parts of a packet received by the router, a router may readily know whether the media is real-time video. A router may determine that the encrypted media is real-time video. A router may determine that the encrypted media is real-time video for example, because, with SRTP, the real-time transport protocol (RTP) packet header is not encrypted. The payload type (PT) field carried in the same packet may indicate what kind of media is carried by the RTP packet. The router may be configured to read the PT field carried in the packet to determine the media carried by the RTP packet. The router may be configured to apply loss concentration, for example, if the media type indicates video because it may be likely to be real-time video.

A router may not be able to look into the encrypted RTP packets and determine whether the packet carries real-time video traffic, for example, if encryption is done over the entire RTP packet, such as using transport layer security (TLS). A router may analyze the traffic pattern with side information about the protocols being used. For example, if UDP packets carry audio and/or real-time video, a router may be configured to identify the IP packets with the protocol field indicated as UDP and with the payload encrypted. The protocol field may indicate the type of transport protocol being used. Among the UDP packets, a router may be configured to identify flows that consist of packets approximately 20 milliseconds apart. A router may be configured to deduce that the flows are most likely audio flows. The router may be configured to deduce that the remaining flows are most likely real-time video flows. The router may identify which flows are audio flows and which flows are real-time video flows. The router may be configured to apply, for example, loss concentration based AQM on the identified real-time video flows. UDP packets may carry other types of traffic, such as, real-time gaming, remote procedure calls, domain name service traffic, etc. Configuring or adapting a router may take into consideration additional parameters reflecting application-specific traffic characteristics attributable to, for example, characteristics of real-time gaming, remote procedure calls, domain name service and the like.

The number of bits may be defined in a variety of packet headers, an extension field in a variety of packet headers, a Label, or in an Information Element (IE). The number of bits defined may depend on the available bit space in the variety of packet headers, extension field in the variety of packet headers. Label or in IE. Bits (e.g., bits a, b, c) may be carried in packets other than IP packets. Bits a, b, c may be carried in IP packets, for example, by using the Option field of an IP packet. Routers may not support the use of the Option field. Routers may drop IP packets using the Option field. A router may be configured to read bits in modified or extended packet IP headers, another type of packet header, Label or IE.

For example, one or more routers may be configured to read an RTP packet header using a RTP packet header extension. A router configured to read an RTP packet header using an RTP packet header extension may not drop the IP packets. To enable loss concentration, one or more predetermined routers on the path of the real-time video flow may be modified. For example, a base station or node (e.g., evolved Node B, Remote Radio Head, Femto eNB, Pico eNB, relay station, or an Access Point in a WiFi or WiMax wireless communication network and the like), may be configured as routers to look into the RTP packet header to read, get, or modify the bits found in an RTP packet header extension.

A router may be configured to read the bits (e.g., bits a, b, c) carried in a multiprotocol label switching (MPLS) packet header (or Label).

Figure 25:
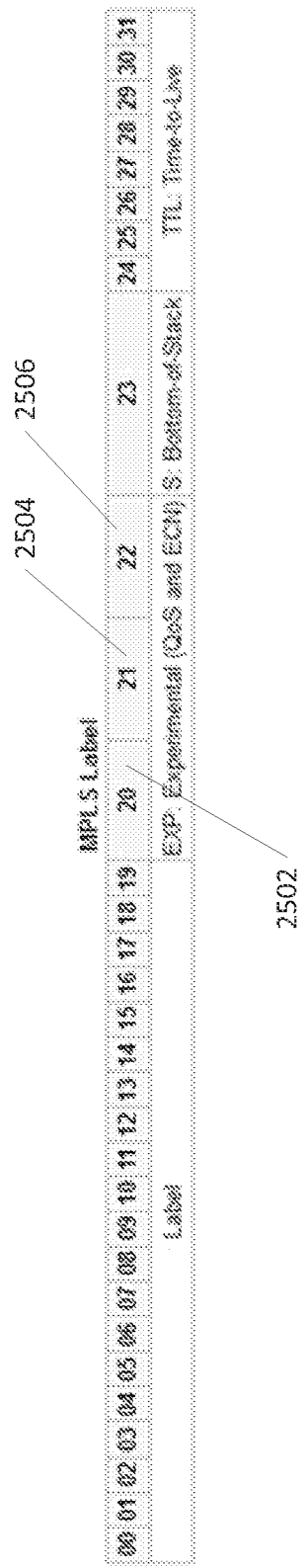
FIG. 25 is a diagram of an example MPLS Label configured to carry bits (e.g., bits a, b, c).

FIG. 25 is a diagram of an example of a MPLS Label configured to carry bits (e.g., bits a, b, c). As shown in FIG. 25, bits 20 2502, 21 2504, and 22 2506 are marked experimental and may be used to carry three bits such as bits a, b, c.

A router may detect packet losses other than the packet loss that caused the initial packet loss. A router may be configured to use a bit (e.g., bit a) to inform downstream routers that packet losses have occurred to a real-time video flow which may, for example, then be de-prioritized at the downstream routers. Downstream routers may not be configured to use explicit signaling with bits. A downstream router may infer that a flow has experienced packet losses without relying on explicit signaling (e.g., bit a) from an upstream router. For example, the downstream router may inspect the sequence numbers of the RTP packets. If the router detects a gap (e.g., "open loop"), the router may conclude that the flow to which the RTP packets belong has suffered packet losses. The router may de-prioritize the flow that experienced packet loss if that flow has not be de-prioritized yet.

Figure 26:
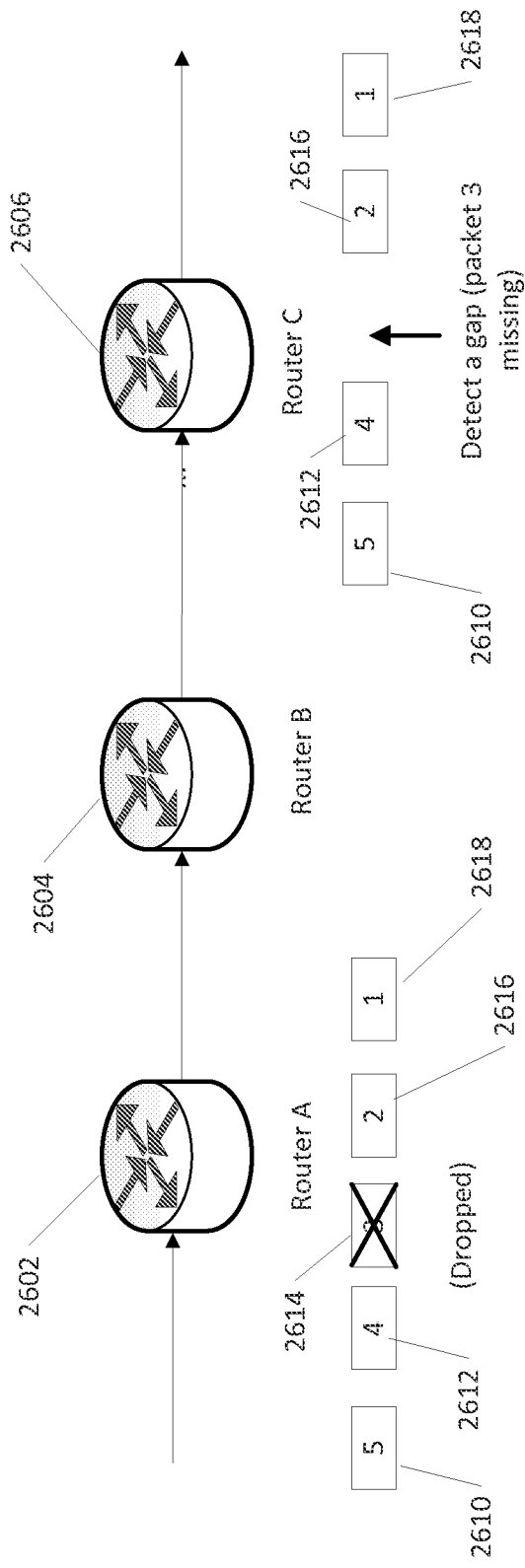
FIG. 26 is a diagram of an example detection of an open loop scenario by a downstream router.

FIG. 26 is a diagram of an example of detection of an open loop scenario by a downstream router. As shown in FIG. 26, Router A 2602 may not be loss concentration capable. Router A 2602 may drop packet 3 2614 which is part of a video packet flow (e.g., a video packet flow which additionally comprises packets 1 2618, 2 2616, 4 2612, and 5 2610). Downstream router, Router C 2606, may detect a gap in the sequence number. Router C 2606 may determine that packet loss has occurred to that video packet flow. Router C 2606 may be configured to respond to the packet loss by de-prioritizing that video packet flow for some time, for example, an RTT. Router C 2606 may be capable of explicit signaling (e.g., using the bits a, b, c). If Router C 2606 is capable of explicit signaling, Router C 2606 may set one or more signaling bits (e.g., may set "a=1") on one or more packets of a video flow in response to detecting a gap in the sequence numbers of the video flow. A routers which are not loss concentration capable (e.g., Router A 2602) may interwork gracefully with routers which are loss concentration capable (e.g., Router C 2606), where the loss concentration capable routers may or may not be capable of explicit signaling of loss concentration related parameters.

A router may utilize loss concentration and congestion control to handle excessive unfairness in end-to-end congestion in the short term. A router may utilize loss concentration and congestion control to concentrates packet loss to a subset of flows. Although loss concentration may be characterized as fair in the long-term (e.g., in terms of effect on round-trip delay time (RTD) or round-trip time (RTTs)), the impact may result in unfairness in end-to-end congestion in the short term. For example, a router may implement end-to-end congestion control in some real-time video applications (e.g., WebRTC) where the sender may infer network congestion by observing packet losses. As a result, users whose packets are dropped may keep reducing their sending rates, whereas the other users whose packets are not dropped would not reduce their sending rates, resulting in excessive unfairness in the short term in performing congestion control.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

What is claimed:

1. A node comprising a processor configured, at least in part, to:
   receive a first real-time video traffic flow, wherein a state variable is associated with the first real-time video traffic flow at the node, and wherein the first real-time video traffic flow comprises a plurality of packets and each packet comprises a lost packet indicator, wherein the lost packet indicators of the packets of the first real-time video traffic flow indicate whether the first real-time video traffic flow has experienced a packet loss;
   receive a second real-time video traffic flow, wherein a state variable is associated with the second real-time video traffic flow at the node, and wherein the second real-time video traffic flow comprises a plurality of packets and each packet comprises a lost packet indicator, wherein the lost packet indicators of the packets of the second real-time video traffic flow indicate whether the second real-time video traffic flow has experienced a packet loss;
   drop a first packet in the first real-time video traffic flow;
   update the state variable associated with the first real-time video traffic flow at the node to indicate the dropped first packet; and
   update the lost packet indicator for a second packet in the first real-time video traffic flow based on the updated state variable that indicates the dropped first packet.

2. The node of claim 1, wherein the processor is configured to:
   compare the state variable of the first real-time video traffic flow with the state variable of the second real-time video traffic flow, wherein the state variable of the second real-time video traffic flow does not indicate a dropped third packet in the second real-time video traffic flow; and
   determine to drop a fourth packet of the first real-time video traffic flow based on the state variable of the first real-time video traffic flow indicating the dropped first packet.

3. The node of claim 1, wherein the processor is configured to:
   determine that a third packet of the first real-time video traffic flow comprises a refresh frame;
   update the state variable associated with the first real-time video traffic flow at the node based on determining the third packet of the first real-time video traffic flow comprises the refresh frame; and
   update the lost packet indicator for the third packet of the first real-time video traffic flow based on determining the third packet of the first real-time video traffic flow comprises the refresh frame.

4. The node of claim 3, wherein the processor configured to interpret a bit in a packet header of the third packet indicates that the third packet comprises the refresh frame and determine that the third packet of the first real-time video traffic flow comprises the refresh frame.

5. The node of claim 3, wherein the refresh frame comprises a partial refresh frame.

6. The node of claim 3, wherein the third packet comprises an I-frame.

7. The node of claim 1, wherein the processor is configured to:
send the second packet of the first real-time video traffic flow to a second node, wherein the lost packet indicator of the second packet instructs the second node to update the state variable associated with the first real-time video traffic flow at the second node.

8. The node of claim 1, wherein the state variable associated with the first real-time video traffic flow is used by the node to concentrate packet losses on a degraded packet stream.

9. The node of claim 1, wherein a flow priority indicator (FPI) comprises the lost packet indicator for the second packet.

10. The node of claim 1, wherein updating the lost packet indicator for the second packet in the first real-time video traffic flow based on the updated state variable that indicates the dropped first packet comprises determining that the second packet does not comprise a refresh frame and updating the lost packet indicator for the second packet in the first real-time video traffic flow based on the updated state variable and the determination that the second packet does not comprise the refresh frame.

11. The node of claim 1, wherein the lost packet indicator of the second packet comprises a bit in a packet header of the second packet.

12. The node of claim 1, wherein the processor is configured to update the state variable associated with the first real-time video traffic flow based on a preconfigured set of conditions.

13. The node of claim 12, wherein the processor is configured to select a condition from the prefigured set of conditions, compare the selected condition against a preconfigured threshold, determine if the selected condition exceeds the preconfigured threshold, and upon determining that the selected condition exceeds the preconfigured threshold, update the state variable associated with the first real-time video traffic flow.

14. The node of claim 1, wherein the node is a router, wireless transmit/receive unit (WTRU) or evolved Node B (eNB).

15. The node of claim 1, wherein the processor is configured to determine to drop the first packet of the first real-time video traffic flow according to a preconfigured set of rules.

16. A node comprising a processor configured, at least in part, to:
receive a first real-time video traffic flow, wherein a state variable is associated with the first real-time video traffic flow at the node and wherein the state variable associated with the first real-time video traffic flow at the node indicates packet loss;
receive a second real-time video traffic flow, wherein a state variable is associated with the second real-time video traffic flow at the node, and wherein the state variable associated with the second real-time video traffic flow at the node indicates no packet loss;
compare the state variable associated with the first real-time video traffic flow indicating packet loss with the state variable associated with the second real-time video traffic flow indicating no packet loss; and
determine to drop a packet of the first real-time video traffic flow based on the state variable associated with the first real-time video traffic flow indicating the packet loss.

17. The node of claim 16, wherein the processor is configured to compare the state variable associated with the first real-time video traffic flow with the state variable associated with the second real-time video traffic flow upon determining to drop the packet of the first real-time video traffic flow.

18. The node of claim 16, wherein the processor is configured to:
mark a packet subsequent to the dropped packet of the first real-time video traffic flow to indicate the packet was dropped.

19. A node comprising a processor configured, at least in part, to:
receive a plurality of real-time video traffic flows, wherein a state variable is associated with each real-time video traffic flow at the node, and wherein each real-time video traffic flow comprises a plurality of packets and each packet comprises a lost packet indicator, wherein the loss packet indicators of the packets of the real-time video traffic flows indicate whether the respective real-time video traffic flow has experienced a packet loss;
determine that a lost packet indicator of a first packet of a real-time video traffic flow of the plurality of real-time video traffic flows indicates that the real-time video traffic flow has experienced a packet loss;
update a state variable associated with the real-time video traffic flow at the node based on the lost packet indicator of the first packet to indicate that the real-time video traffic flow has experienced the packet loss; and
direct a subsequent packet loss to the real-time video traffic flow based on the updated state variable associated with the real-time video traffic flow indicating the packet loss.

20. The node of claim 19, wherein the processor is configured to:
determine that a third packet of the real-time video traffic flow comprises a refresh frame; and
update the state variable associated with the real-time video traffic flow based on determining that the third packet comprises the refresh frame.

21. The node of claim 20, wherein the processor is configured to determine that a lost packet indicator of a second packet of the real-time video traffic flow does not indicate the packet loss, wherein the second packet arrives after the first packet and before the third packet.

* * * * *